(12) United States Patent
Koh

(10) Patent No.: US 12,423,553 B2
(45) Date of Patent: Sep. 23, 2025

(54) RFID ARRANGEMENT, PIECE OF JEWELRY, LOCAL SENDING ARRANGEMENT, AND METHODS

(71) Applicant: EXPERLOOP TECHNOLOGY PTE. LTD., Singapore (SG)

(72) Inventor: Thong Hee Koh, Singapore (SG)

(73) Assignee: Experloop Technology Pte. Ltd., Singapore (SG)

( * ) Notice: Subject to any disclaimer, the term of this patent is extended or adjusted under 35 U.S.C. 154(b) by 0 days.

(21) Appl. No.: 18/685,990

(22) PCT Filed: Aug. 25, 2022

(86) PCT No.: PCT/IB2022/057950
§ 371 (c)(1),
(2) Date: Feb. 23, 2024

(87) PCT Pub. No.: WO2023/026221
PCT Pub. Date: Mar. 2, 2023

(65) Prior Publication Data
US 2024/0428039 A1    Dec. 26, 2024

(30) Foreign Application Priority Data

Aug. 25, 2021  (SG) ............................ 10202109315R
Sep. 23, 2021  (HK) ............................ 32021039246.2
(Continued)

(51) Int. Cl.
G06K 19/077    (2006.01)
A44C 19/00     (2006.01)

(52) U.S. Cl.
CPC ........ *G06K 19/07762* (2013.01); *A44C 19/00* (2013.01)

(58) Field of Classification Search
CPC .............. G06K 19/07762; A44C 19/00; G06Q 2220/00; G06Q 30/018
See application file for complete search history.

(56) References Cited

U.S. PATENT DOCUMENTS

2003/0156033 A1     8/2003  Savage et al.
2006/0022056 A1*    2/2006  Sakama ........... G06K 19/07771
                                              235/492
(Continued)

FOREIGN PATENT DOCUMENTS

CN     102332106 B    1/2014
DE     19824643       11/1999
(Continued)

OTHER PUBLICATIONS

Koh, Thong Hee; International Preliminary Report on Patentability for PCT/IB2022/057950, filed Aug. 25, 2022, mailed Feb. 27, 2024, 7 pgs.
(Continued)

*Primary Examiner* — Matthew Mikels
(74) *Attorney, Agent, or Firm* — Taylor Duma LLP

(57) ABSTRACT

The invention relates to an RFID arrangement comprising an RFID tag and a housing at least partially enclosing the RFID tag, wherein the RFID tag has a first contact and a second contact, and wherein the first contact is electrically connected to the housing. The invention relates further to a corresponding piece of jewelry, to corresponding methods, and to a corresponding local sending arrangement.

3 Claims, 34 Drawing Sheets

(30)  Foreign Application Priority Data

Figure 1:
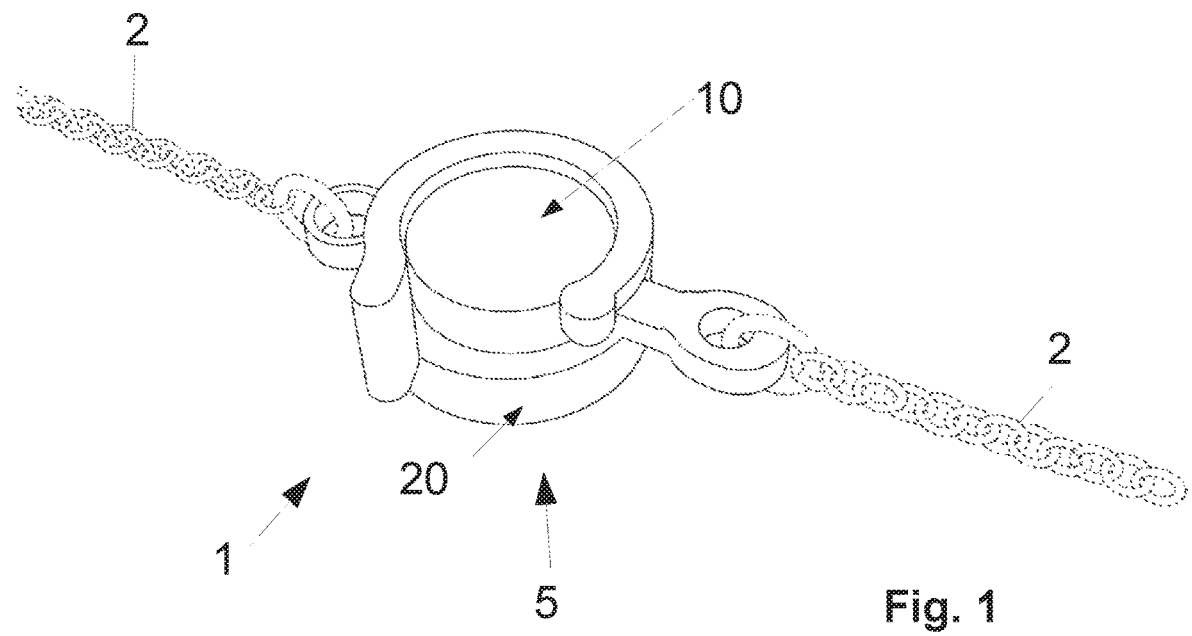

Jan. 27, 2022 (SG) .......................... 10202200857R
Mar. 2, 2022 (SG) .......................... 10202202115W

(56)  References Cited

U.S. PATENT DOCUMENTS

| | | |
|---|---|---|
| 2010/0038426 A1 | 2/2010 | Casden |
| 2010/0112964 A1 | 5/2010 | Yi et al. |
| 2014/0102136 A1 | 4/2014 | Warren |
| 2019/0244071 A1 | 8/2019 | Grove et al. |
| 2019/0387849 A1 | 12/2019 | Huynh |
| 2020/0004415 A1* | 1/2020 | Warren .................. G06F 3/162 |

FOREIGN PATENT DOCUMENTS

| | | |
|---|---|---|
| DE | 19832671 | 1/2000 |
| NL | 9100176 | 3/1992 |

OTHER PUBLICATIONS

Koh, Thong Hee; International Search Report and Written Opinion for PCT/IB2022/057950, filed Aug. 25, 2022, mailed Nov. 14, 2022, 10 pgs.

Experloop Technology Pte. Ltd.; Office Action for Taiwanese patent application No. 111132140, mailed May 21, 2024, 40 pgs.

\* cited by examiner

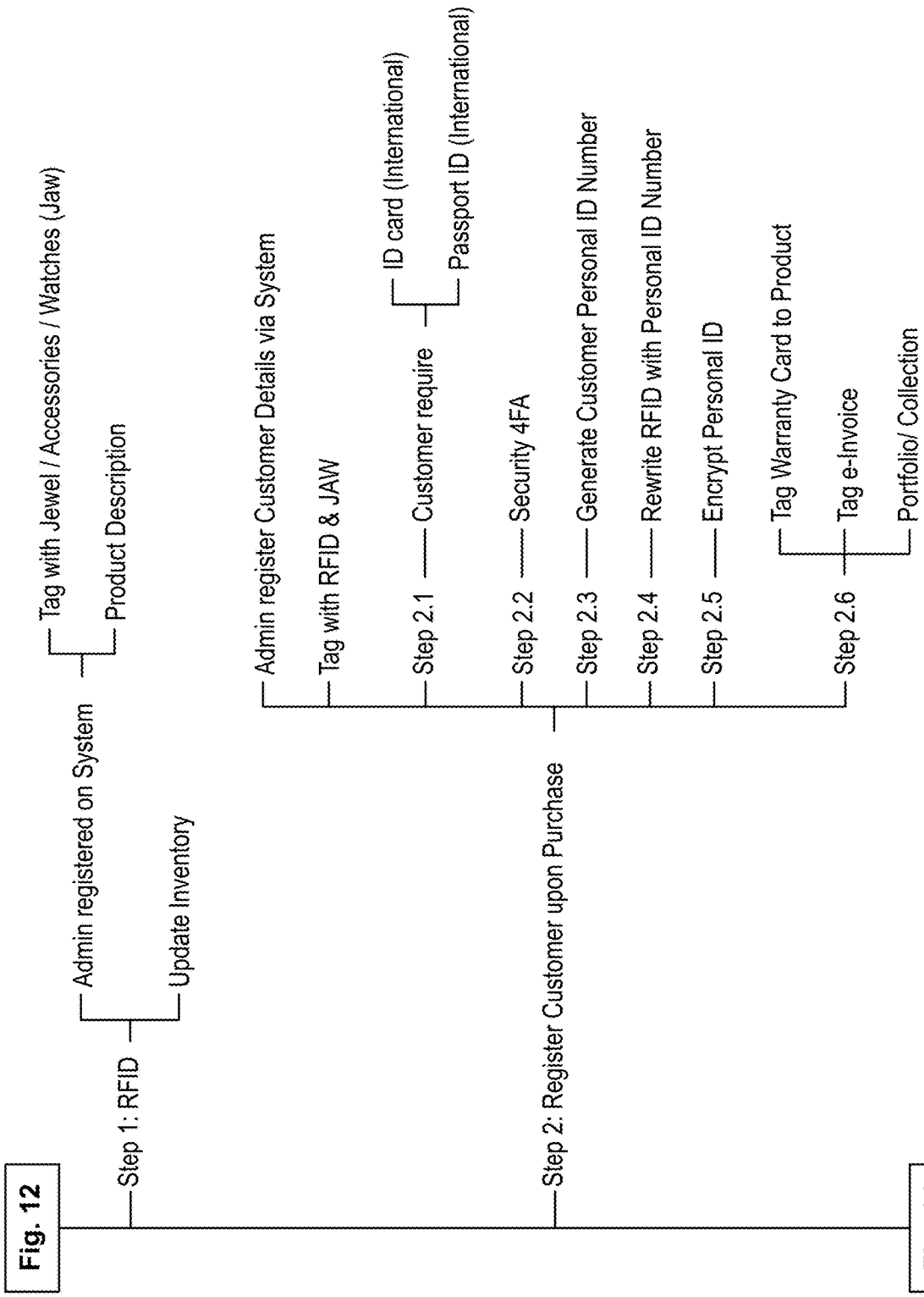

Fig. 13

Step 3: Customer download clasp Mobile App
- Fill in Personal Details — Medical Report — Level 2 Information
- Show JAW & RFID Records (Purchase Portfolio)
- Save Payment Details (Optional) — Apply 4FA with Admin via System
  - Facial Recognition
  - Voice Recognition
  - PIN
  - Finger Print
- Customer can input Company Profile with Image & Youtube link
- Customer Profile to include hobbies
- Customer can select what they are looking for by entering details such as product categories, — Without product catalog colour and materials
- Customer can input personal details
  - Food Allergies
  - Favourite Drinks
  - Health record Report Lost/Theft
- Step 1: customers login Mobile App
- Step 2: Select Lost JAW
- Step 3: Report Lost / Theft
- Step 4: Notify Providers
- Step 5: Notify Customer via Mobile App, when item found by Admin

Fig. 14

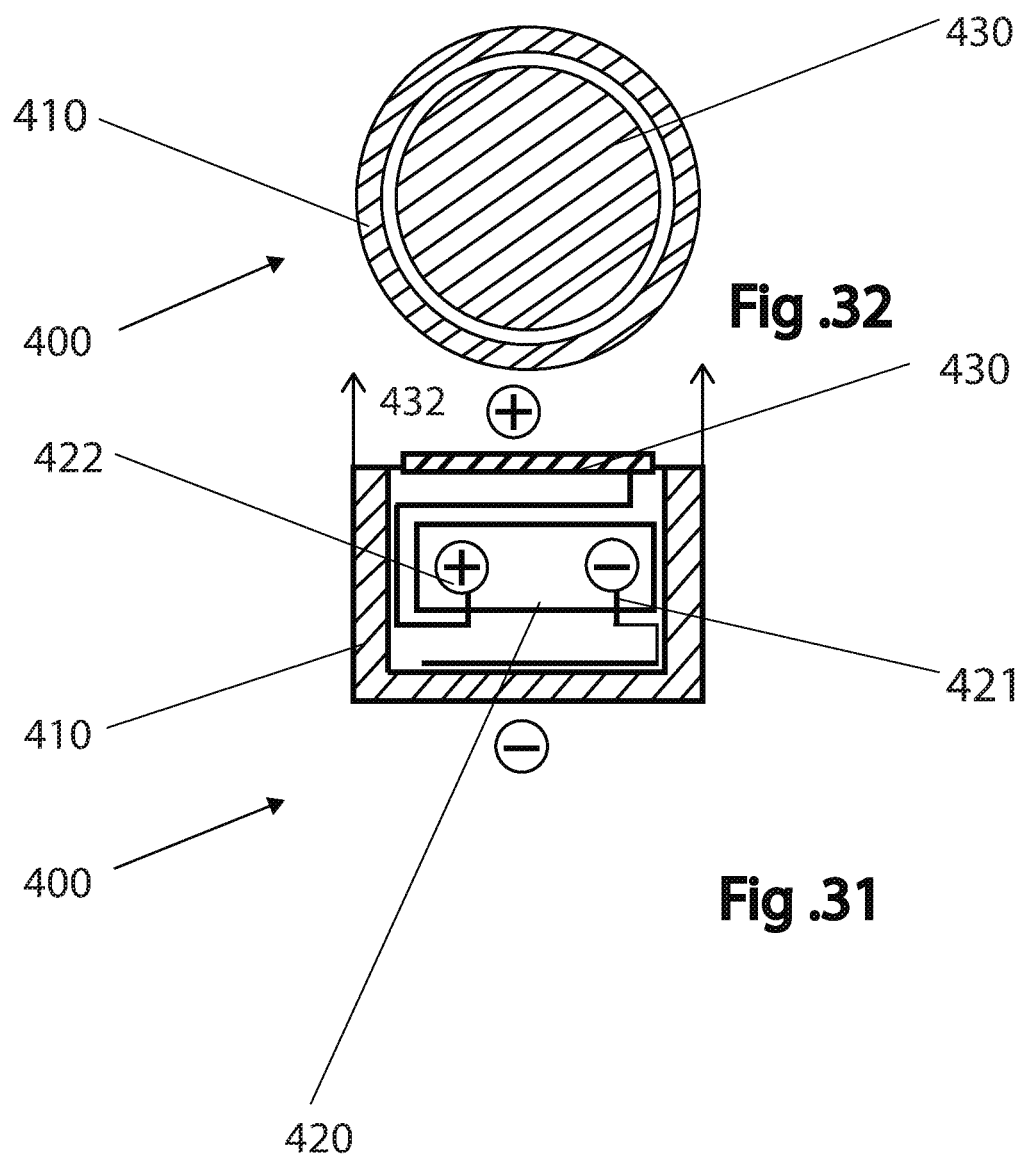

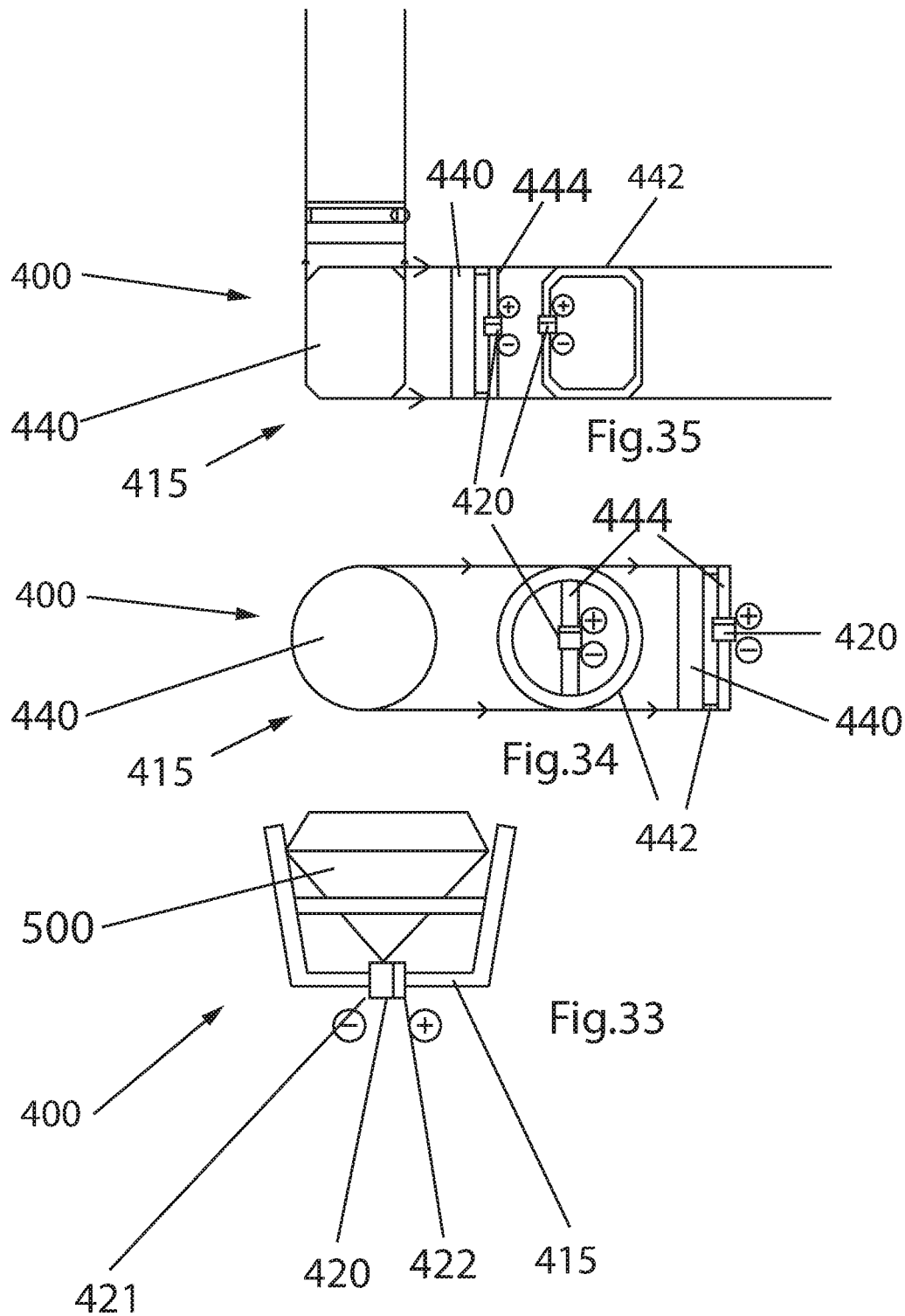

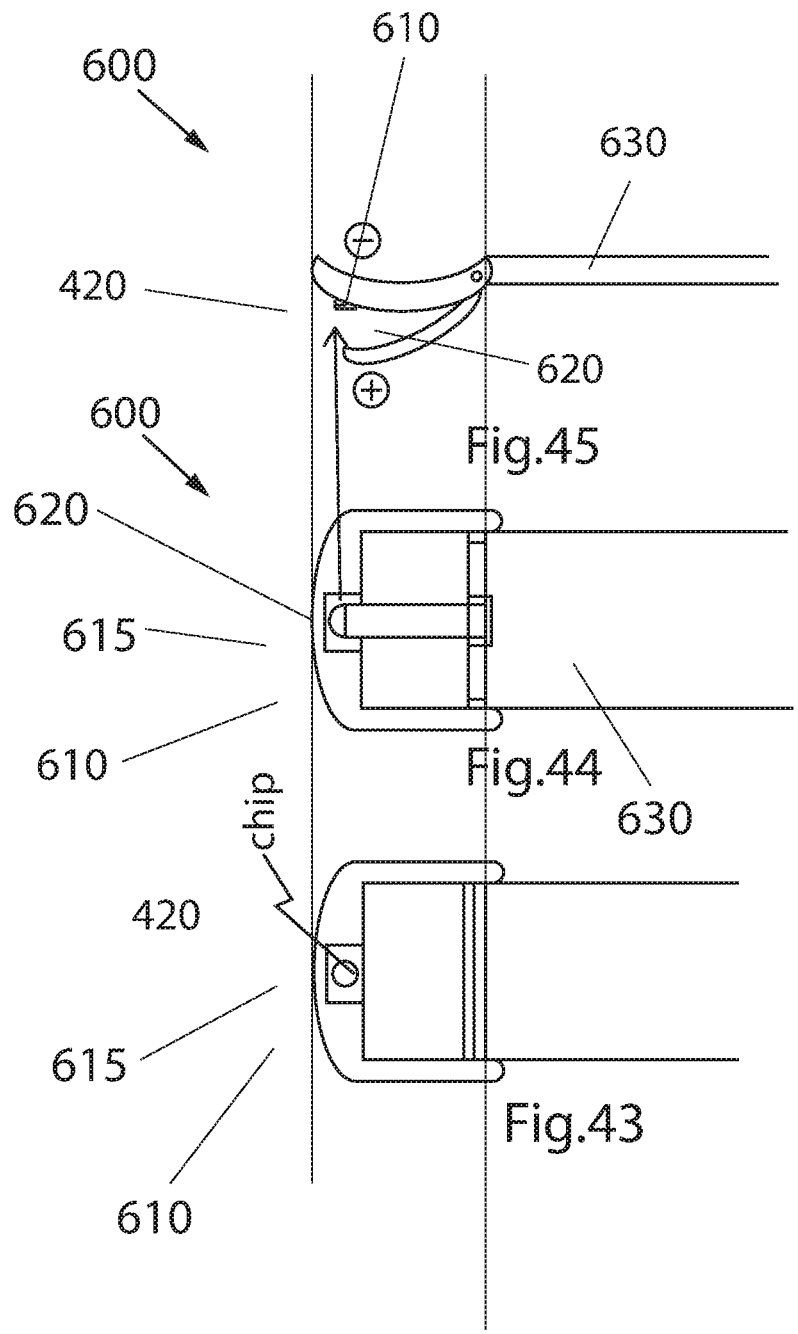

RFID ARRANGEMENT, PIECE OF JEWELRY, LOCAL SENDING ARRANGEMENT, AND METHODS

The application relates to a clasp, a piece of jewelry, methods, a readout device, a cloud storage and/or blockchain system, a personal identification device, a wearable device, a buckle, an RFID arrangement, and to a local sending arrangement.

A piece of jewelry may, for example, be a necklace or a bracelet. Such pieces of jewelry are typically embodied such that they can be secured to a wearer and can also be released. For that purpose, pieces of jewelry may have a clasp.

It is an object to provide for a clasp that is alternative or better compared with known solutions. It is also an object to provide for a piece of jewelry comprising such a clasp.

The application relates to a clasp, comprising a first element and a second element. The first element has a protrusion, and the second element has a clearance for receiving the protrusion of the first element such that the first element is rotatable with respect to the second element. The first element has an arm, and the second element has a gap, wherein the arm engages the gap when the first element is rotated with respect to the second element into a closed state. The first element is removable from the second element when the arm does not engage the gap.

This allows for a simple design of a clasp. The two elements may be separated from each other in an open state. They may be securely connected in a closed state. The closed state may be reached easily by engaging the protrusion with the clearance and by rotating the arm such that it engages the gap. By doing the opposite, e.g., rotating in the opposite direction and removing the first element from the second element, the clasp may be put in a state in which the two elements are separate from each other. For example, a wearer may put a necklace comprising such a clasp around her neck when the two elements are separate from each other. Then, the clasp may be brought into the closed state as described, and the necklace is secured to the wearer.

When the arm engages the gap, this may also be denoted that the arm goes through and/or is partially inside the gap.

The arm may especially protrude from a central part or main part of the first element from which also the protrusion protrudes. Such a main part may provide for a form fit with the second element, providing a secure connection of the two elements.

According to a possible implementation, the protrusion has a circular cross section. It may also have a cylindrical shape. This allows for easy rotation of the first element relative to the second element.

According to a possible implementation, the clearance has a circular cross section. It may also have a cylindrical shape. This also allows for easy rotation of the first element relative to the second element, especially in combination with a circular or cylindrical protrusion. If both the protrusion and the clearance have circular cross sections, this allows for a definition of the rotatability of the two elements relative to each other that is independent of a current rotation angle.

If the clearance mates the protrusion, this allows for an easy fit of the elements to each other. Mating may especially mean that there is no, or at least almost no, slackness between the protrusion and the clearance when the protrusion is received in the clearance.

Especially, the gap can be defined between a cantilever and a main part of the second element. The main part may especially comprise the clearance. The cantilever may especially protrude from a wall that is part of the second element.

The cantilever may be at least slightly deformable, which can be used in order to provide for a retaining functionality as described below. The main part of the second element may provide for a base of the second element and even of the entire clasp. It may provide for stability and define, for example, a surface on which the clasp may lay on an underground. The clearance may be provided in the main part so that forces entering from the first part are, at least partially, absorbed by the robust main part.

According to a possible implementation, the gap has, at an end at which the arm enters the gap from an open state, a retaining element, the retaining element releasably retaining the arm in the gap. Thus, an inadvertent release can be prevented, especially by a form fit between the gap and the arm and by additional form fits that may be provided between the first element and the second element, especially a form fit that is achieved by receiving the protrusion in the clearance.

If the retaining element is embodied as a sphere partially closing an entry of the gap, this allows for a smooth passing of the arm and for an easy manufacturing of the retaining element by forming processes, along with securely retaining the arm in the gap.

The retaining element may especially be positioned at a free end of the cantilever. Thus, a certain resiliency of the cantilever may be used for releasably securing the arm in the gap. The free end may especially be an end opposite to an end at which the cantilever is secured to the rest of the second element, for example to a wall.

Especially, the first element may be not removable from the second element when the arm engages the gap. Thus, an inadvertent removing can be prevented. A form closure between the arm and the gap can be used.

The first element can have a first loop for securing another element, for example a chain or another part of a piece of jewelry. The first loop may comprise a first hole, in which another element can be secured by form fit.

The second element can have a second loop for securing another element, for example a chain or another part of a piece of jewelry. The second loop may comprise a second hole, in which another element can be secured by form fit.

A form fit for securing another element like a chain to a loop may simply extend a means for securing chain elements to securing the chain to the clasp.

In other words, a loop allows for easy attachment of a chain.

According to a possible implementation, the first element and/or the second element comprise are magnetic element so as to attract each other by magnetic force. For example, one element or both of the first and second elements may comprise a magnetic element, which may especially be a permanent magnet. For example, a neodymium magnet can be used as magnetic element. Magnetic elements help securing the two elements to each other, especially when coming from an open state. The magnetization may especially be such that the two elements are automatically brought into a correct orientation relative to each other.

In a specifically advantageous implementation, both the first element and the second element each have a respective magnetic element. This can provide for helping a user to bring both elements in a correct position for securing them together. However, it is also possible that only one of the first and second element has a magnetic element that is a permanent magnet. A magnetic field of such a magnetic element may interact with the other element that may be fully or partially made of a magnetically active material, for example a diamagnetic material. This may lead to a magnetically attracting effect between the two elements. However, it may be harder or impossible to implement an attracting force between the two elements that automatically helps to bring the two elements in a correct orientation.

Especially, the first element may comprise a first magnetic element forming the protrusion. Especially, a part of the first magnetic element may form the protrusion. Another part may be secured in a main part of the first element. The first magnetic element may especially have a cylindrical or disc shape.

Especially, the second element may comprise a second magnetic element being positioned in the clearance. Especially, the second magnetic element may have a cylindrical or disc shape that mates the clearance. Thus, the clearance can be partially filled with the magnetic element, while the rest of the clearance may be left to receive the protrusion.

These implementations allow for an advantageous reception of the magnetic elements such that they attract each other in a way that the first element and the second element are automatically brought into the correct orientation.

The first element and/or the second element may be fully or partly made of gold, silver, metal, or metal alloy. These materials may provide for a good matching to common materials used in jewelry fabrication. Especially, all but a respective magnetic element can be made of such a material. However, also other materials may be used.

According to a possible implementation, the second element has a wall encompassing a segment of a circle and laterally securing the first element when the protrusion is received in the clearance. This helps stabilizing the elements. It can also prevent the first element from inadvertently being released from a position in which the protrusion is received in the clearance.

The clasp may comprise an identification tag in the first element, the second element, or between the first element and the second element. Such an identification tag may, for example, be embodied as an RFID (radio frequency identification) tag or as a nanotech structure. It can especially have a unique ID for identifying the clasp. This can ensure traceability and identifiability of a specific clasp. It may, for example, be used for inventory control and as a personal ID. It is also possible that more than one such identification tags are used. For example, such an RFID tag can be used as described elsewhere herein. Reference is made to the plurality of different implementations.

The application relates further to a piece of jewelry, especially a necklace or bracelet, comprising a clasp as described herein. With regard to the clasp, all embodiments disclosed herein can be applied. Disclosed advantages of the clasp also apply for the piece of jewelry.

The piece of jewelry may comprise at least one chain being attached to the first element and/or to the second element of the clasp. Such a chain may, for example, be used to secure gems and/or may be used as a design element itself. Especially, the chain may be secured to loops with their holes as described herein.

The clasp, the first element, and/or the second element can be made partly or entirely of several materials, among them gold and silver, as well as from alloys with these materials, that can also comprise other materials such as copper. It is also possible to make these from a polymer, such as plastic, or from wax. A wax model can then be easily used in a cast or molding method for producing multitudes of the clasp, the first element, and/or the second element from metals or precious metals.

The application relates further to a method for retrieving user-related information, to a method for performing a payment process, to a method for providing user-related information, to a readout device, to a cloud storage system, to a personal identification device, and to a wearable or handheld device.

In many situations, it can be preferable to have user-related data readily available. For example, payment information is typically needed after dining in a restaurant. Another example is a conference, where conference participants can benefit from knowing who has similar interests. In case of a pandemic, the system can be used to update or inform those in the same cluster.

It is an object to provide for methods in the context of user-related data, user interaction or inventory control that are alternative or better compared with known solutions. It is also an object to provide for a readout device, a cloud storage system, system, an identification device, and to provide for a wearable or handheld device.

The application relates to a method for retrieving user-related data from a cloud storage system, the method comprising the following steps:

reading out an identification number from an RFID tag,
providing a variable, a content of the variable indicating a type of user-related data, preferably using an interface device,
sending a request comprising the identification number and the content of the variable to the cloud storage system, and
receiving user-related data from the cloud storage system, the user-related data preferably being based on the identification number and the content of the variable.

With such a method, a wearable or handheld device can be used in order to retrieve data based on an identification number stored in an RFID tag. The wearable or handheld device may, for example, be a piece of jewelry, a clasp, a watch, a mobile phone or another device that can easily be held by, or secured to, a human being.

The RFID tag may especially be secured in a wearable device, for example in a clasp, another piece of jewelry, a watch, wrist band or a piece of clothing.

The variable may be implemented as an electronic variable. It may comprise several bits that define its content. The content may be indicative for a type of user-related data. Each specific bitstring may be indicative for a specific type.

The type of user-related data typically defines which user-related data is requested. Typical examples are given below. Different types may be made available to serve different situations.

The request may, for example, be sent using the Internet and may especially be sent using a wireless and/or wire-bound connection. The cloud storage system can be a database or similar system located anywhere on the internet, especially being configured to be accessible by a device performing the method.

According to a possible implementation, the content of the variable and/or the type may be provided by a device performing the method. Especially, the type may be set by such a device, for example by preprogramming or by a functionality of the device identifying a location or another parameter and setting the type based thereon. Providing the type, or a corresponding content of the variable, may define which user-related content is to be retrieved.

According to a possible implementation, the content of the variable and/or the type may be provided by user input. Especially, the device performing the method may be configured to ask for the user input and to retrieve the user input. A display or a touch-screen may be used for that purpose. However, also other means of input may be used.

When the type is out of a first group of types, only the identification number and the type may be sent to the cloud storage system. This allows defining a group of types, wherein types being part of this group do not need additional security measures. For example, simple user data or information about the wearable device may be part of this first group.

When the type is out of a second group of types, at least one security information may be obtained and may be sent in addition to the identification number and the type to the cloud storage system. This allows defining a group of types, wherein types being part of this group need additional security measures. For example, payment information or medical information may be part of the second group.

It may be implemented that obtaining security information comprises taking a fingerprint, and the security information may comprise information regarding the fingerprint. Thus, a fingerprint may be used as a readily accessible security feature. A fingerprint reader may be used for that purpose. A reference fingerprint may be stored in the cloud storage system for identifying if the user of the RFID tag is authorized.

Additionally or alternatively, obtaining security information may comprise taking a speech record, and the security information may comprise information regarding the speech record. Thus, a microphone or another device may be used in order to record a speech sample of a user. The speech may be used by the cloud storage system to compare with a stored voice sample and to identify if the user of the RFID tag is authorized.

Taking a speech record may be generalized to voice recognition. In general, where a speech record is mentioned, also the general term voice recognition can be used. Voice recognition may especially comprise checking and/or evaluating tone and/or timing identity. Corresponding references can be stored for comparison.

Additionally or alternatively, obtaining security information may comprise taking a picture of a face, and the security information may comprise information regarding the picture of a face. Thus, face recognition may be used to identify an authorized user. For example, a movement of an eyebrow or another face identification means can be used.

It should especially be noted that face recognition is not limited to recognition of a static face, or a static picture of a face. It can also mean face motion recognition, wherein a face can be observed for a specific duration and a motion of the face can be recognized. For example, a person can be required to perform a certain task with his face, and the corresponding movement or change of the face can be recognized. Corresponding references can be stored for comparison.

Especially, face recognition can be used in combination with voice recognition. Especially, it can be implemented that authorization of a task like using payment details is only allowed if both face recognition and voice recognition yield a positive result.

Additionally or alternatively, obtaining security information may comprise inputting a code, and the security information may comprise information regarding the code. For example, the code may be a PIN number or an alphanumerical code. A reference code may be stored in the cloud storage system and may be used in order to identify an authorized user.

A possible type may be ownership information. For example, a user's name or address may be part of the ownership information. The ownership information may be part of the first group, so that no specific security measures are required.

A possible type may be medical information. For example, medications or blood group may be part of the medical information. The medical information may be part of the second group, so that additional security measures are required.

A possible type may be meet and greet information. For example, a name, an affiliation, or a purpose for visiting a conference or an exhibition may be part of the meet and greet information. The meet and greet information may be part of the first group, so that no specific security measures are required.

A possible type may be personal preference information. For example, a meat or wine preference, food allergies, preferred colors of clothes, or preferred materials can be part of the personal preference information. Thus, a waiter may be readily informed about what food to offer. Likewise, a shop owner may be readily informed about which clothes to offer. The personal preference information may be part of the first group, so that no specific security measures are required.

A possible type may be payment information. For example, banking or credit card details may be part of the payment information. Especially, such payment information may be used for payment in a restaurant, a shop or online purchase. The payment information may be part of the second group, so that specific security measures are required.

The possible types may be combined in a specific implementation.

The received user-related data may be presented on a screen of a device performing the method. This may allow the data to be readily accessed by the user of the RFID device or another person like a waiter or shop owner. For example, the device may be configured to read out the identification number, to send the request to the cloud storage system, to receive the user related data, and/or to present the data on a display or screen.

The method may be performed in a mobile electronic device, a tablet, or a stationary electronic device. A mobile electronic device may, for example, be a mobile phone or a specific device used for payment or other purposes. A tablet may especially be a larger portable device with a large screen. A stationary electronic device may be positioned at a shop or restaurant entrance to allow user identification and retrieving of preferences or other user-related data.

The application also relates to a device, for example a mobile electronic device, a tablet, a stationary electronic device, or a mobile phone for performing a method as disclosed herein. The application also relates to a non-transitory computer-readable medium comprising program code that cause a processor to perform a method as disclosed herein. With regard to the method, all variations as disclosed herein can be applied. The device may be a readout device as defined elsewhere herein.

Especially, the RFID tag may be a passive RFID tag. Thus, no energy consumption is needed by the RFID tag. The passive RFID tag may be read out by radio waves emitted by a readout device. It does not need a separate power source.

The application further relates to a method for performing a payment process, the method comprising the following steps:

reading out an identification number from an RFID tag secured in a wearable or handheld device, setting a content of a variable for defining a type of user-related data to be payment data, requesting security information, obtaining security information, sending a request comprising the identification number, the content of the variable, and the security information to a cloud storage system, receiving user-related data being payment data from the cloud storage system, and performing the payment process using the payment data.

This method allows for a specific payment process that is very easy to perform, as payment data can be retrieved from the cloud storage system and can be readily made available based on the automatic read out RFID tag. No credit card, coins or the like is needed. The security information ensures that only an authorized user, i.e., the owner of a wearable comprising the RFID tag, may initiate the payment process.

With regard to the method for performing a payment process, reference is made to the statements given above with regard to the method for retrieving user-related data, which can be readily applied.

Especially, the security information may be a fingerprint, a voice record, a picture of a face, or a code. Reference is made to the statements given above.

The payment process may be a process of paying a bill, for example in a shop or a restaurant or online purchase. It may also be a process of retrieving money at an ATM or similar device.

According to a preferred implementation, the method may further comprise a step of selecting which kind of security information should be requested. This gives the user a choice and gives him the possibility to select the security information that is most suitable in the specific case. For example, a face picture or a code may be chosen in a noisy environment, while speech recognition may be selected by a person whose face is covered by a mask.

The selecting may be performed by user input. For example, respective buttons may be pressed on a touch screen display.

The selecting may alternatively or additionally be performed automatically based on an amount to be paid, a location, a venue, and/or based on other information. For example, a device operated in a shop, or a restaurant may require a specific security information, for example a fingerprint, if the amount to be paid is larger than a threshold.

Especially, the payment data may be based on the identification number. Specifically, the cloud storage system may generate the payment data based on the identification number.

The application further relates to a method for providing user-related information to a person, the method comprising the following steps:

reading out an identification number from an RFID tag secured in a wearable or handheld device, setting a content of a variable for defining a type of user-related data to be meet and greet information or personal information, sending a request comprising the identification number and the content of the variable to a cloud storage system, receiving user-related data from the cloud storage system, and presenting the user-related data on a display and/or sending the user related data to another electronic device.

This method can easily provide information to a person. The person may be the user or may be another person. For example, the person may be a waiter in a restaurant or may be a shop owner or shop employee who needs information about a customer entering the shop.

With regard to that method, reference is made to the details and variants described above, which may be readily applied.

The application further relates to a personal identification device, comprising a tag holder for mechanical connection with a wearable or handheld device, and an RFID tag being mechanically connected with the tag holder, wherein the RFID tag has stored, or is configured to store, an identification number.

Such a personal identification device may be used in order to provide an RFID tag, especially in a wearable or handheld device. The RFID tag may be used in connection with the method as described above. It may uniquely identify its wearer.

According to an implementation, the tag holder may be fully or partially made of a precious metal. This allows high resistance against corrosion. However, also other methods may be used.

The RFID tag may have a round, rectangular, or square shape. That may fit in respective openings or recesses of wearables or handheld devices. The shape may be seen in a cross section. However, also other shapes may be used.

The RFID tag may have a diameter of at least 0.5 mm or 1 mm and/or of at most 4 mm or 4 cm. Such sizes fit in typical wearables or handheld devices and provide the required functionality.

If the RFID tag is round or at least substantially round, the RFID tag may preferably have a diameter of 1 mm or 1.5 mm or 3 mm. It may also be smaller or larger.

If the tag holder forms an antenna or an antenna amplifier for the RFID tag, the signal of the RFID tag may be amplified and may thus be easier read out. The tag holder may thus provide an additional functionality.

The application further relates to a wearable device, comprising a fastening structure for fastening the wearable device to a human body, and a personal identification device as described herein.

With regard to the personal identification device, all embodiments and variants as disclosed herein can be applied.

The wearable device may have a specific functionality, like a watch, and furthermore may be used to identify the user. Especially, the methods described herein may be used for that purpose.

The wearable device may be a mechanical watch. The RFID tag may, for example, be embodied in a clockwork of the watch. This makes an unauthorized exchange very complicated and secures integrity of the RFID tag with the watch. The RFID tag may also be secured to other mechanical parts, for example a watch strap clip, clasp, spectacle frame, wristband or mobile phone.

The wearable device may be a piece of jewelry. For example, it may be a necklace, an earring, a bracelet, a chain, a pendant, a brooch, a ring, or a clasp. It may hold a gemstone, for example a diamond. Especially, the RFID tag may be positioned under a gemstone setting, which protects the RFID tag against unauthorized exchange.

The wearable device may be a clasp. A clasp may be used to releasably secure two ends of a chain or other long flexible element to each other. A possible implementation is given elsewhere herein. All variations can be applied.

The tag holder may be soldered, lasered, glued or inlayed in between material in the wearable device. This provides for a secure connection between the RFID tag and the rest of the wearable or handheld device.

The invention relates further to a readout device, comprising an RFID reader being configured to read out an identification number from an RFID tag, and an interface device being configured for
- providing a variable, the content of the variable indicating a type of user-related data using an interface device,
- sending a request comprising the identification number and the content of the variable to a cloud storage system, and
- receiving user-related data from the cloud storage system, the user-related data being preferably based on the identification number and the content of the variable.

The readout device can especially be configured and/or used to perform a method as described herein.

The readout device can typically send an interrogating signal to the RFID tag via an antenna, and the tag typically responds with its unique information. Especially, the readout device can be configured to read out a passive RFID tag.

Passive RFID tags primarily operate at three frequency ranges:
Low Frequency (LF): 125-134 kHz
High Frequency (HF): 13.56 MHz
Ultra High Frequency (UHF): 856 MHz to 960 MHz Near-field communication (NFC) devices operate at the same frequency (13.56 MHz) as HF RFID readers and tags. The standards and protocols of the NFC format is based on RFID standards outlined in ISO/IEC 14443, FeliCa, and ISO/IEC 18092. These standards deal with the use of RFID in proximity cards.

NFC devices can read passive NFC tags, and some NFC devices are able to read passive HF RFID tags that are compliant with ISO 15693. The data on these tags can contain commands for the device such as opening a specific mobile application.

The identification number stored in an RFID tag can be used to be linked with a specific person, who may be called the keyholder. The seller of a device comprising such an RFID tag, for example a clasp, may pair the identification number with a specific person.

Typical RFID tags can hold up to 16 digits.

The invention relates further to a readout device, comprising an RFID reader and an interface device, the readout device being configured to perform a method as disclosed herein. Especially, all methods and its variants disclosed with respect to reading out from an RFID tag and interacting with a cloud storage system or another device may be implemented.

The invention relates further to a cloud storage system, the cloud storage system being configured to
- receive a request comprising an identification number and a variable, the content of the variable indicating a type of user-related data, and
- send user-related data depending on the identification number and the content of the variable.

Such a cloud storage system may especially interact with a readout device as disclosed herein. The user-related data may be sent to the readout device or other device from which the request was received. The cloud storage system may especially be used in a method as disclosed herein. Reference is made to the statements given elsewhere herein. All variations can be applied. Especially, it may be possible to access the cloud storage system using standard internet access.

The cloud storage system may further be configured to receive security information, to compare the security information with stored reference data, and to send user-related data only if the security information corresponds to the stored reference data.

This can implement the security functionality disclosed elsewhere herein. Especially, the disclosed types of security features may be implemented.

The invention relates further to a method for inventory control of a personal identification device, the method comprising the following steps:
- writing an inventory control number in an RFID tag, and
- tracking the personal identification device using the inventory control number.

Thus, the inventory control number can be used in order to give a company the possibility to identify stored items and to keep track of the inventory. Especially, inventory control may be performed before sale.

The inventory control number may be read out from the RFID tag each time an inventory should be determined. This can be done by a readout device accessing information stored on the RFID tag.

The invention relates further to a method for forgery control and/or theft control of a wearable device, the method comprising the following steps:
- reading out an identification number from an RFID tag of the wearable device,
- comparing the identification number to a reference dataset, and
- indicating forgery if the identification number does not correspond to the reference dataset, or indicating theft if the reference dataset indicates that the identification number corresponds to a stolen device.

Especially, a cloud storage and/or a blockchain system may be used when performing such a method. A readout device may read out the identification number and send it to the cloud storage and/or blockchain system for further processing.

The invention relates further to a method for providing an electronic invoice for a wearable device, the method comprising the following steps:
- reading out an identification number from an RFID tag of the wearable device,
- sending the identification number to an invoice system, and
- providing an electronic invoice by the invoice system based on the identification number.

Especially, a cloud storage system may be used as invoice system. A readout device may read out the identification number and send it to the cloud storage and/or blockchain system for further processing.

The invention relates further to a method for providing an electronic warranty card for a wearable device, the method comprising the following steps:
- reading out an identification number from an RFID tag of the wearable device,
- sending the identification number to a warranty system, and
- providing an electronic warranty card by the warranty system based on the identification number.

Especially, a cloud storage and/or blockchain system may be used as warranty system. A readout device may read out the identification number and send it to the cloud storage system for further processing.

The invention relates further to a method for providing an electronic product information for a wearable device, the method comprising the following steps:

reading out an identification number from an RFID tag of the wearable device, sending the identification number to a product information system, and providing an electronic product information by the product information system based on the identification number.

Especially, a cloud storage system may be used as product information system. A readout device may read out the identification number and send it to the cloud storage system for further processing.

A $1^{st}$ level of security (low security level) may be implemented to generate an in-house EPC (electronic product code). Typically, the final attachment of an RFID tag is fixed on the product permanently at this time. The manufacturer may input an EPC (electronic product code) to the RFID chip for its inventory control and/or information of a product, such as weight of gems and gold or memo of holder.

A $2^{nd}$ level of security (low security level) may be implemented, especially at retail level. Outlets can keep the same EPC number or rewrite a new in-house number while keeping information of a product for their inventory control. In addition, they may add their branding to the product.

A $3^{rd}$ level (mid security level) may be implemented, especially for a time once the product is sold. A digital invoice, digital warranty, and ownership data is added to a cloud storage and/or blockchain system or an in-house system control. Reference is made to the statements given elsewhere herein.

A customer may especially have a freedom of use. Specifically, a customer can choose to further activate or deactivate the RFID chip or RFID tag from a system.

A $4^{th}$ level (high security level) may be implemented, especially in order to maintain an RFID system to be in use for further conveniency. A customer can register with a central system, for example a cloud storage system, by verifying, e.g., with their IC or passport to make sure the system is communicating with the right person and can complete four ways of security verification.

For security verification, face recognisation (FR), voice recognisation (VR), biometric fingerprint (BF), and/or a PIN number (PN) can be used. Also, other means can be used.

Once a system, especially a cloud storage system, receives an update of information, the system can generate a new EPC number as a personal identity or a digital key for the customer to install information in different level of security such as:

$1^{st}$: storage of information: precious product bought that has RFID implant, for ownership information, such as photos linking a records of family tree and family will and/or information of the product if it is lost and/or found or stolen.

$2^{nd}$: personal medical data: used for emergency in a medical situation. It can be implemented that only an authority can override and/or retrieve information with a reader for only level 2 information.

$3^{rd}$: personal meet and greet information such as self-portrait, name of entity, information, company advertisement or people the keyholder wishes to get in touch and hobby. At a conference or a meeting, a portable reader can be made available at the entrance and/or at the registration desk for the keyholder to scan his RFID identity (especially from the RFID tag) and the reader or another system can show the keyholder's presence or attendance. A user can choose to stay anonymously after register or can be made known by the RFID scanner system to share via Bluetooth or message to send information to those in the event. This will help to safe time to meet the right person the keyholder wishes to meet and enables to have a good follow-up after meeting. Hobbies are a great topic to break the ice in human interaction. Last it is used for entry control at the gantry or entry of an event or exhibitions, this helps to keep update of who the keyholder met if another pandemic takes place, or avoid long queues for registration before entering an exhibition or trade show.

$4^{th}$: shopping and dining experience (option to install): a user can first install information such as how he wishes to be greeted, favorite colors, styles, or items they are looking forward to buy, favorite drinks, food or any food allergy.

At the entrance of a shop there may be an RFID reader with two system elements. The $1^{st}$ is a monitor or screen where the keyholder is scanned and sees if he can find anything of great interest before stepping into the shop. As $2^{nd}$, once stepped in, staff can automatically receive information of the guests on their tablet with information needed to serve the customer.

As for dining, service staff in their tablet would know what not to recommend due to food allergy of customer, and information of their return customer's past orders.

The described implementation may help knowing the way how he or she likes it to be cooked and type of wine he or she likes. Such personal service cannot be achieved without a personal RFID identity. The system can capture information during payment.

During any payment, the customers can be served with a tablet that has a specific system build in for higher security check. Further reference is made to the statements given elsewhere herein, which can readily be applied.

At a $1^{st}$ step, customers can scan the RFID tag as a key to operate the system. Once scanned, there may be a need to do a mid-level security check, e.g., by face recognition. A screen can appear with a welcome note and an option to take a photo of the keyholder. Next, a touch screen may be operated to process payment.

At a $2^{nd}$ step, the customer can verify an amount, i.e. if it is correct in a digital invoice, and use a touch screen to process payment, At a $3^{rd}$ step, an electronic wallet screen can appear to present types of payment such as credit card or any bank facility which the customer already has approved to use. For example, a customer would just need to touch a screen to select payment.

At a $4^{th}$ step, the system can ask for a type of process to activate. Facial expression on face recognition can be used to process payment, if the action does not match the system will decline payment. If the user is not in a noisy environment, he can also select voice recognition, which may use spectrogram or audio coding, which does not require any language. Once it matches specific records in the system, for example in a cloud storage system, the payment will process.

A biometric fingerprint may be used to match the records in the system to approve payment.

If the user is in a low or slow signal area the already mentioned three security features may be slowed down or may be unable to activate. Then, a PIN number may be the last option, and should typically be kept for low value transaction only.

Once approved, the user can choose to keep records of invoices in the system, e.g., for a maximum of 6 months, or may keep a printed invoice if needed.

Especially for a payment process, the $2^{nd}$ level of security check, which may be the facial expression and voice recognition for the payment transaction, may be regarded as being very important. A credit card company or a bank can use an NFC card as personal ID and copy the identity or other information for such payment process.

An aspect of the applicant is a unique wearable identification device that may, e.g., be sold over jewelers or watch dealers worldwide. These jewelers and watch dealers have close links, and they provide an extra level of security.

The idea is to provide them with an after-sales link to the customer. And the customer gets an extra verification device for many applications (see elsewhere herein).

If someone copies the RFID identity, by reading and copying to an NFC chip, he cannot get access to the other information about the customer in the cloud, especially due to the described security measures. This information can only be accessed after entering additional information, especially security information.

The invention relates further to an RFID arrangement, comprising an RFID tag, an antenna being electrically connected to the RFID tag, and a socket at least partially enclosing the RFID tag and the antenna. Such an RFID tag can especially be easily incorporated into a piece of jewelry due to potential use of the socket for connection.

The RFID arrangement can especially be embodied as a part of a jewelry and/or a personal identification device. This eases wearing.

The RFID tag and the antenna can both be comprised in one package. This can protect the RFID tag and can simplify manufacturing.

The package can be made of plastic material. However, also other materials can be used.

Especially, the RFID tag can be a passive RFID tag.

Preferably, the antenna is a loop antenna, yielding a simple implementation. However, also other types of antennas can be used.

According to an implementation, the socket has the shape of a hollow cylinder.

According to an implementation, the socket has the shape of a hollow cylinder with a bottom.

Especially, the socket is open at one side. This can enhance access to the RFID tag.

According to an implementation, the socket is embodied as a chain element.

Especially, the RFID tag and the antenna can both be embodied in a package having a cuboid shape.

The socket can cover the package at three faces of the cuboid. This allows for a secure holding of the package in the socket.

The socket can leave the package uncovered at three faces of the cuboid.

Especially, the socket can cover the package at a bottom face and at two side faces of the cuboid being immediately adjacent to the bottom face and being opposite to each other. This leaves three sides uncovered, which can, for example, be used in order to ease radio wave access.

According to a preferred implementation, the antenna can be positioned adjacent to a top face of the cuboid being opposite to the bottom face. This has shown to yield good readout of the RFID tag.

According to a preferred implementation, the antenna is positioned adjacent to a side face of the cuboid being immediately adjacent to the bottom face and being not covered by the socket. This has also shown to yield good readout of the RFID tag.

The socket can protrude over the package at one or more faces of the cuboid. This can protect the socket.

The chain element may especially comprise one or two rings for connecting with other chain elements. This eases connecting the chain element in a chain, which can be used as a piece of jewelry.

The socket can proximately surround the RFID tag, the antenna and/or a package comprising the RFID tag and/or the antenna. Thus, no gap is present between the socket and the other mentioned respective item, which leads to increased security.

The invention relates further to a method for fabricating a piece of jewelry, the method comprising the following steps:
  providing a base for the piece of jewelry,
  providing an RFID arrangement as disclosed herein, wherein all described variants can be applied, and
  securing the socket of the RFID arrangement with the base.

Such a method can be used in order to fabricate a piece of jewelry with an RFID arrangement.

The socket may be secured with the base by fusing or soldering. However, also other means of connection can be used.

Especially, the base can be formed as a ring, an earring, a bracelet, a pendant, a watch, a brooch, or other accessories.

The invention relates further to an RFID arrangement, comprising
  an RFID tag,
  an antenna being electrically connected to the RFID tag, and
  a socket at least partially enclosing the RFID tag and the antenna,
  wherein the RFID tag and the antenna are both comprised in one package made of plastic material and having a cuboid shape,
  wherein the socket is embodied as a chain element,
  wherein the socket covers the package at a bottom face and at two side faces of the cuboid being immediately adjacent to the bottom face and being opposite to each other,
  wherein the antenna is positioned adjacent to a top face of the cuboid being opposite to the bottom face, or adjacent to a side face of the cuboid being immediately adjacent to the bottom face and being not covered by the socket.

The invention relates further to a method for fabricating a piece of jewelry, the method comprising the following steps:
  providing a base for the piece of jewelry,
  providing an RFID arrangement as disclosed herein, wherein all variations can be applied, and
  securing the socket of the RFID arrangement with the base,
  wherein the socket is secured with the base by fusing or soldering.

The invention relates further to an RFID arrangement, comprising
  means for providing an RFID identification,
  means for radio wave reception being connected to the means for providing an RFID identification, and
  means for holding and at least partially enclosing the means for providing an RFID identification and the means for radio wave reception.

According to an implementation, the RFID arrangement is embodied as a part of a jewelry and/or a personal identification device.

According to an implementation, the means for providing an RFID identification and the means for radio wave reception are both comprised in one means for enclosing.

According to an implementation, the means for enclosing is made of plastic material.

According to an implementation, the means for providing an RFID identification is a passive RFID tag.

According to an implementation, the means for radio wave reception is a loop antenna.

According to an implementation, the means for holding has the shape of a hollow cylinder.

According to an implementation, the means for holding has the shape of a hollow cylinder with a bottom.

According to an implementation, the means for holding is open at one side.

According to an implementation, the means for holding is embodied as a chain element.

According to an implementation, the means for providing an RFID identification and the means for radio wave reception are both embodied in a means for enclosing having a cuboid shape.

According to an implementation, the means for holding covers the means for enclosing at three faces of the cuboid.

According to an implementation, the means for holding leaves the means for enclosing uncovered at three faces of the cuboid.

According to an implementation, the means for holding covers the means for enclosing at a bottom face and at two side faces of the cuboid being immediately adjacent to the bottom face and being opposite to each other.

According to an implementation, the means for radio wave reception is positioned adjacent to a top face of the cuboid being opposite to the bottom face.

According to an implementation, the means for radio wave reception is positioned adjacent to a side face of the cuboid being immediately adjacent to the bottom face and being not covered by the means for holding.

According to an implementation, the means for holding protrudes over the means for enclosing at one or more faces of the cuboid.

According to an implementation, the chain element comprises one or two means for connecting with other chain elements.

According to an implementation, the means for holding proximately surrounds the means for providing an RFID identification, the means for radio wave reception and/or a means for enclosing comprising the means for providing an RFID identification and/or the means for radio wave reception.

The invention relates further to a piece of jewelry, comprising an RFID arrangement as disclosed herein and/or being manufactured according to a method as disclosed herein.

The invention relates further to a piece of jewelry, comprising
 an RFID tag having a first contact and a second contact for electrical connection with an antenna, and
 a body to which the RFID tag is secured,
 wherein the body is, at least partially, made of electrically conducting material, and
 wherein at least the first contact is electrically connected to the body.

This allows for using the body, or at least a part of it, as an antenna. A need for a separate antenna is omitted.

Especially, the body may form a closed loop antenna or a half loop antenna made of electrically conducting material to which the first contact, or the first contact and the second contact, are electrically connected.

Especially, the first contact may be electrically connected to the electrically conducting material of the body.

Especially, the first contact may be connected to the body by a conductive strip and/or a conductive glue. This yields a simple fabrication. However, also other means for connection can be used.

Preferably, the conductive strip and/or the conductive glue surrounds the RFID tag partially. This can connect two opposite sides of the RFID tag.

The conductive strip and/or the conductive glue can connect a face of the RFID tag with an opposite face of the RFID tag. This allows for a connection between two such faces, allowing the RFID tag to be positioned such that both contacts can be directed towards one face of the piece of jewelry.

According to an implementation, a gap is present between the second contact and the body, at least in an initial state. This allows for the connection of the second contact being not permanent, so that access to the RFID tag can be controlled or prevented.

Especially, a face of the body and the second contact can be temporarily connectable by pressure. Thus, access to the RFID tag can be prevented in an initial state, and can be allowed actively be applying pressure.

The piece of jewelry may have a first state and a second state, wherein a face of the body and the second contact are not electrically connected in the first state and are electrically connected in the second state, wherein preferably the first state is an initial state and the second state is achievable by pressure.

According to an implementation, the second contact is not electrically connectable to the body. Thus, the body may form a half loop antenna, which may in some cases be sufficient.

According to an implementation, the second contact and the body are permanently electrically connected. Thus, the body can always form a full loop antenna.

Especially, the second contact is directly connected to the body.

Alternatively, the second contact may be connected to the body by a further conductive strip and/or a further conductive glue.

A gap between the RFID tag and the body may, besides a connection between the second contact and the body, be filled with an insulating material or an insulating glue. This can improve mechanical stability.

The first contact may be formed as a contact pad on the RFID tag. The second contact may be formed as a contact pad on the RFID tag.

Preferably, the piece of jewelry is embodied as a ring, an earring, a bracelet, a pendant, a watch, a brooch, or other accessories.

The invention relates further to a method for fabricating a piece of jewelry, the method comprising the following steps:
 providing an RFID tag having a first contact and a second contact for electrical connection with an antenna,
 providing a body, wherein the body is, at least partially, made of electrically conducting material,
 securing the RFID tag to the body, and
 electrically connecting at least the first contact to the body.

Especially, the first contact may be electrically connected to the electrically conducting material of the body.

A gap may be left present between the second contact and the body, at least in an initial state.

The method may further comprise electrically connecting the second contact to the body. Especially, this may a permanent connection.

The method may further comprise filling a gap between the RFID tag and the body, besides a connection between the second contact and the body, with an insulating material or an insulating glue.

Especially the piece of jewelry is embodied according to any implementation as described herein.

The invention relates to a piece of jewelry, comprising
  an RFID tag having a first contact and a second contact for electrical connection with an antenna, and
  a body to which the RFID tag is secured,
  wherein the body is, at least partially, made of electrically conducting material,
  wherein the body forms a closed loop antenna made of electrically conducting material to which the first contact and the second contact are electrically connected,
  wherein the first contact is connected to the body by a conductive strip and/or a conductive glue, and
  wherein a gap between the RFID tag and the body is, besides a connection between the second contact and the body, filled with an insulating material or an insulating glue.

The invention relates to a method for fabricating a piece of jewelry, the method comprising the following steps:
  providing an RFID tag having a first contact and a second contact for electrical connection with an antenna,
  providing a body, wherein the body is, at least partially, made of electrically conducting material,
  securing the RFID tag to the body,
  electrically connecting the first contact to the body,
  electrically connecting the second contact to the body, and
  filling a gap between the RFID tag and the body, besides a connection between the second contact and the body, with an insulating material or an insulating glue.

The invention relates further to a piece of jewelry, comprising
  a means for providing RFID identification having a first contact and a second contact for electrical connection with a means for radio wave reception, and
  a body to which the means for providing RFID identification is secured,
  wherein the body is, at least partially, made of electrically conducting material, and
  wherein at least the first contact is electrically connected to the body.

According to an implementation, the body forms a closed loop antenna or a half loop antenna made of electrically conducting material to which the first contact, or the first contact and the second contact, are electrically connected.

According to an implementation, the first contact is electrically connected to the electrically conducting material of the body.

According to an implementation, the first contact is connected to the body by a conductive strip and/or a conductive glue.

According to an implementation, the conductive strip and/or the conductive glue surrounds the means for providing RFID identification partially.

According to an implementation, the conductive strip and/or the conductive glue connects a face of the means for providing RFID identification with an opposite face of the means for providing RFID identification.

According to an implementation, a gap is present between the second contact and the body, at least in an initial state.

According to an implementation, a face of the body and the second contact are temporarily connectable by pressure.

According to an implementation, the second contact is not electrically connectable to the body.

According to an implementation, the second contact and the body are permanently electrically connected.

According to an implementation, the second contact is directly connected to the body.

According to an implementation, the second contact is connected to the body by a further conductive strip and/or a further conductive glue.

According to an implementation, a gap between the means for providing RFID identification and the body is, besides a connection between the second contact and the body, filled with an insulating material or an insulating glue.

According to an implementation, the first contact is formed as a contact pad on the means for providing RFID identification.

According to an implementation, the second contact is formed as a contact pad on the means for providing RFID identification.

According to an implementation, the piece of jewelry is embodied as a ring, an earring, a bracelet, a pendant, a watch, a brooch, or other accessories.

The invention relates further to an RFID arrangement, comprising
  an RFID tag having a first contact and a second contact for electrical connection with an antenna, and
  a socket at least partially enclosing the RFID tag,
  the RFID arrangement having a first conductive stripe and a second conductive stripe, the first conductive stripe and the second conductive stripe being made of electrically conducting material and being electrically separate from each other.

Such an RFID arrangement can be embodied into a piece of jewelry using standard jeweler processes. Especially, a method as described further below can be used.

According to a preferred implementation, the socket has, at least substantially, the form of a hollow cylinder. Thus, the socket can be rotated in the piece of jewelry, especially during manufacturing. The RFID tag may be positioned inside the hollow cylinder.

The first conductive stripe and the second conductive stripe may have gaps for isolation between each other. Alternatively, isolating material can be used for isolation.

Especially, the first conductive stripe may be formed as a curved element. Especially, the second conductive stripe is formed as a curved element. Thus, the conductive stripes can have the form of semi-cercles, at least approximately. This eases manufacturing processes that involve rotation.

Preferably, the RFID arrangement has an at least substantially circular cross section.

This also eases manufacturing processes that involve rotation.

The conducting material may be aluminum, gold, silver, and/or copper. However, also other materials can be used.

The first conductive stripe and the second conductive stripe may be provided for connection with a body of a piece of jewelry so that the body forms an antenna for the RFID tag. Thus, the body can be used as an antenna, especially forming a stronger reading distance activation of the RFID tag without grounding the reading, and a separate antenna can be omitted.

The invention further relates to a piece of jewelry, comprising
- an RFID arrangement as disclose herein, wherein all disclose variations can be applied, and
- a body being, at least partially, made of electrically conductive material,
- wherein the first conductive stripe and the second conductive stripe of the RFID arrangement are each connected to one respective face of the body so that the body forms an antenna for the RFID tag.

The invention relates further to a method for fabricating a piece of jewelry, the method comprising the following steps:
- providing a body for the piece of jewelry, being at least partially made of electrically conducting material,
- placing an RFID arrangement as disclosed herein, wherein all variations can be applied, into a recess of the body, so that the first conductive stripe and the second conductive stripe of the RFID arrangement contact the body,
- rotating the RFID arrangement while monitoring access to the RFID tag,
- stopping rotating if the access to the RFID tag exceeds a given threshold and/or exhibits a peak, and
- while maintaining the rotational state between the RFID arrangement and the body, securing the RFID arrangement to the body.

This allows for efficient fabrication of a piece of jewelry, allowing use of standard jeweler processes and tools.

Especially, before the RFID arrangement is placed in the recess, the recess is made by drilling or other material processing of the body. This allows using a body of a standard ring, for example, and reworking it easily so that the RFID arrangement can be connected.

The RFID arrangement may be secured to the body by gluing the socket, the first conductive stripe and the second conductive stripe to the body using conductive glue. This allows for a secure connection.

A gap may be present or may be formed in the body besides the recess so that the first conductive stripe and the second conductive stripe are only electrically connected through a loop formed in the body.

The body may have, at least substantially, the form of a ring, an earring, a bracelet, a pendant, a watch, a brooch, or other accessories.

The invention relates further to a piece of jewelry being made by such a method.

The invention relates further to an RFID arrangement, comprising
- an RFID tag having a first contact and a second contact for electrical connection with an antenna, and
- a socket at least partially enclosing the RFID tag,
- the RFID arrangement having a first conductive stripe and a second conductive stripe, the first conductive stripe and the second conductive stripe being made of electrically conducting material and being electrically separate from each other,
- wherein the socket has, at least substantially, the form of a hollow cylinder,
- wherein the first conductive stripe and the second conductive stripe have gaps for isolation between each other.

The invention relates further to a piece of jewelry, comprising
- an RFID arrangement as disclosed herein, wherein all variations can be applied, and
- a body being, at least partially, made of electrically conductive material,
- wherein the first conductive stripe and the second conductive stripe of the RFID arrangement are each connected to one respective face of the body so that the body forms an antenna for the RFID tag.

The invention relates further to a method for fabricating a piece of jewelry, the method comprising the following steps:
- providing a body for the piece of jewelry, being at least partially made of electrically conducting material,
- placing an RFID arrangement as disclosed herein into a recess of the body, so that the first conductive stripe and the second conductive stripe of the RFID arrangement contact the body,
- rotating the RFID arrangement while monitoring access to the RFID tag,
- stopping rotating if the access to the RFID tag exceeds a given threshold and/or exhibits a peak, and
- while maintaining the rotational state between the RFID arrangement and the body, securing the RFID arrangement to the body,
- wherein, before the RFID arrangement is placed in the recess, the recess is made by drilling or other material processing of the body,
- wherein the RFID arrangement is secured to the body by gluing the socket, the first conductive stripe and the second conductive stripe to the body using conductive glue, and
- wherein a gap is present or is formed in the body besides the recess so that the first conductive stripe and the second conductive stripe are only electrically connected through a loop formed in the body.

The invention relates further to an RFID arrangement, comprising
- a means for providing RFID identification having a first contact and a second contact for electrical connection with a means for radio wave reception, and
- a means for enclosing, at least partially enclosing the means for providing RFID identification,
- the RFID arrangement having a first conductive stripe and a second conductive stripe, the first conductive stripe and the second conductive stripe being made of electrically conducting material and being electrically separate from each other.

According to an implementation, the means for enclosing has, at least substantially, the form of a hollow cylinder.

According to an implementation, the first conductive stripe and the second conductive stripe have gaps for isolation between each other.

According to an implementation, the first conductive stripe is formed as a curved element. According to an implementation, the second conductive stripe is formed as a curved element.

According to an implementation, the RFID arrangement has an at least substantially circular cross section.

According to an implementation, the conducting material is aluminum, gold, silver, and/or cupper.

According to an implementation, the first conductive stripe and the second conductive stripe are provided for connection with a body of a piece of jewelry so that the body forms a means for radio wave reception for the means for providing RFID identification.

The invention relates further to a piece of jewelry, comprising
  an RFID arrangement according as disclosed herein, wherein all variations disclosed herein can be applied, and
  a body being, at least partially, made of electrically conductive material,
  wherein the first conductive stripe and the second conductive stripe of the RFID arrangement are each connected to one respective face of the body so that the body forms a means for radio wave reception for the means for providing RFID identification.

The invention further relates to an RFID arrangement, comprising
  an RFID tag, and
  a housing, at least partially enclosing the RFID tag,
  wherein the RFID tag has a first contact and a second contact,
  wherein the first contact is electrically connected to the housing.

The housing may protect the RFID tag. The RFID tag may store information.

According to an implementation, the housing has the form of a hollow cylinder with a bottom. This can protect the RFID tag substantially.

The RFID tag may have a cylindrical form. The RFID tag may be circular surrounded by a wall of the housing.

Especially the housing may have an opening at one side. The RFID arrangement may further comprise a dummy electrode being electrically connected to the second contact. The dummy electrode may be positioned inside the opening.

Especially, the dummy electrode can be positioned such that the dummy electrode together with the housing have a cylindrical shape, at least disregarding a slot between the dummy electrode and the housing. Thus, the housing together with the dummy electrode may form a substantially close surrounding of the RFID tag.

Preferably, the housing forms an antenna for the RFID tag. A separate antenna can thus be omitted.

The invention relates further to an RFID arrangement, comprising
  an RFID tag,
  a housing, at least partially enclosing the RFID tag, and
  a dummy electrode being electrically connected to the second contact,
  wherein the RFID tag has a first contact and a second contact,
  wherein the first contact is electrically connected to the housing,
  wherein the housing has an opening at one side, and
  wherein the dummy electrode is positioned such that the dummy electrode together with the housing have an cylindrical shape, at least disregarding a slot between the dummy electrode and the housing.

The invention relates further to an RFID arrangement, comprising
  an RFID tag, and
  a socket for receiving a gemstone,
  wherein the RFID tag has a first contact and a second contact,
  wherein the socket is at least partially made of electrically conducting material,
  wherein the first contact and the second contact are electrically connected to the housing.

Thus, a socket for a gemstone, for example a diamond, can be used to provide information using the RFID tag.

The RFID tag may be positioned at a bottom of the socket. The socket may comprise an opening. The bottom may be positioned opposite to the opening. The bottom may be formed as a bar, or may comprise a bar or known as gallery that gives support to the construction of a jewelry. The RFID tag may be positioned in the bar.

According to an embodiment, the socket has a circular cross section. The RFID tag may be positioned in a mid or center of the socket. It may also be positioned otherwise.

According to an embodiment, the socket hat a rectangular cross section, or the cross section of a rectangle with rounded or flattened edges. The RFID tag may be positioned in the mid or center of the socket. The RFID tag may also be positioned at a side of the socket.

The RFID tag may be arranged in a separate bar below a bottom of the socket.

Especially, the socket may form an antenna for the RFID tag.

The invention relates further to an RFID arrangement, comprising
  an RFID tag, and
  a socket for receiving a gemstone,
  wherein the RFID tag has a first contact and a second contact,
  wherein the socket is at least partially made of electrically conducting material,
  wherein the first contact and the second contact are electrically connected to the housing,
  wherein the socket has a circular cross section, and
  wherein the RFID tag is positioned in the mid of the socket.

The invention relates further to a piece of jewelry, comprising an RFID arrangement according to an implementation as disclosed herein. All disclosed implementations can be applied.

Especially, the piece of jewelry may be embodied as a ring, an earring, a bracelet, a pendant, a watch, a brooch, or other accessories. Also other embodiments are possible.

The invention relates further to a method of manufacturing an RFID arrangement, the method comprising the following steps:
  providing a housing,
  positioning an RFID tag inside the housing, and
  connecting a first contact of the RFID tag to the housing.

The method may further comprise placing a dummy electrode in an opening of the housing.

method may further comprise electrically connecting the dummy electrode to a second contact of the RFID tag.

Especially, the RFID arrangement may be fabricated as disclosed herein. All variations and implementations can be applied.

The invention relates further to a method of manufacturing an RFID arrangement, the method comprising the following steps:
  providing a housing,
  positioning an RFID tag inside the housing,
  connecting a first contact of the RFID tag to the housing,
  placing a dummy electrode in an opening of the housing, and
  electrically connecting the dummy electrode to a second contact of the RFID tag.

The invention relates further to a method of manufacturing an RFID arrangement, the method comprising the following steps,
  providing a socket for receiving a gemstone, the socket being at least partially made of electrically conducting material, mechanically connecting an RFID tag with the socket, and electrically connecting a first contact and a second contact of the RFID tag with the socket.

Especially, the RFID arrangement may be fabricated as disclosed herein. All variations and implementations can be applied.

The invention relates further to a method of manufacturing an RFID arrangement, the method comprising the following steps,
- providing a socket for receiving a gemstone, the socket being at least partially made of electrically conducting material,
- mechanically connecting an RFID tag with the socket, and
- electrically connecting a first contact and a second contact of the RFID tag with the socket,
- wherein the socket has a circular cross section, and
- wherein the RFID tag is positioned in the mid of the socket.

The invention relates further to a local sending arrangement, comprising
- a passive wireless communication device for exchanging proprietary information with an external transmitting-sending-device, and with
- a protective covering device for taking up the passive wireless communication device,
- wherein the passive wireless communication device has a first contact and a second contact,
- wherein the first contact is electrically connected to the protective covering device.

It can be implemented that the protective covering device has the form of a hollow cylinder with a bottom.

It can be implemented that the passive wireless communication device has a cylindrical form.

It can be implemented that the passive wireless communication device is circular surrounded by a wall of the protective covering device.

It can be implemented that the protective covering device has an opening at one side.

It can be implemented that the arrangement further comprises a device for forming an electric antipole being electrically connected to the second contact.

It can be implemented that the device for forming an electric antipole is positioned inside the opening.

It can be implemented that the device for forming an electric antipole is positioned such that the device for forming an electric antipole together with the protective covering device have a cylindrical shape, at least disregarding a slot between the device for forming an electric antipole and the protective covering device.

It can be implemented that the protective covering device forms an antenna for the passive wireless communication device.

The local sending arrangement may further comprise
a passive wireless communication device,
a protective covering device, at least partially enclosing the passive wireless communication device, and
a device for forming an electric antipole being electrically connected to the second contact,
wherein the passive wireless communication device has a first contact and a second contact,
wherein the first contact is electrically connected to the protective covering device,
wherein the protective covering device has an opening at one side, and wherein the device for forming an electric antipole is positioned such that the device for forming an electric antipole together with the protective covering device have a cylindrical shape, at least disregarding a slot between the device for forming an electric antipole and the protective covering device.

The invention relates further to a local sending arrangement, comprising
a passive wireless communication device, and
a socket for receiving a gemstone,
wherein the passive wireless communication device has a first contact and a second contact,
wherein the socket is at least partially made of electrically conducting material,
wherein the first contact and the second contact are electrically connected to the protective covering device.

It can be implemented that the passive wireless communication device is positioned at a bottom of the socket.

It can be implemented that the socket comprises an opening.

It can be implemented that the bottom is positioned opposite to the opening.

It can be implemented that the bottom is formed as a bar.

It can be implemented that the passive wireless communication device is positioned in the bar.

It can be implemented that the socket has a circular cross section.

It can be implemented that the passive wireless communication device is positioned in a mid of the socket.

It can be implemented that the socket has a rectangular cross section, or the cross section of a rectangle with rounded or flattened edges.

It can be implemented that the passive wireless communication device is positioned in the mid or center of the socket.

It can be implemented that the passive wireless communication device is positioned at a side of the socket.

It can be implemented that the passive wireless communication device is arranged in a separate bar below a bottom of the socket.

It can be implemented that the socket forms an antenna for the Passive wireless communication device.

The invention relates further to a local sending arrangement, comprising
a passive wireless communication device, and
a socket for receiving a gemstone,
wherein the passive wireless communication device has a first contact and a second contact,
wherein the socket is at least partially made of electrically conducting material,
wherein the first contact and the second contact are electrically connected to the protective covering device,
wherein the socket has a circular cross section, and
wherein the passive wireless communication device is positioned in the mid of the socket.

The invention relates further to a piece of jewelry, comprising a local sending arrangement as disclosed herein. All implementations and variations can be applied.

It can be implemented that the piece of jewelry is embodied as a ring, an earring, a bracelet, a pendant, a watch, a brooch, or other accessories.

The invention further relates to a piece of jewelry, comprising
a body, and
an RFID tag,
wherein the RFID tag comprises a first contact and a second contact, and
wherein the first contact and/or the second contact are electrically connected to the body.

The body may serve as an antenna for the RFID tag.

Especially, the RFID tag may also be mechanically connected to the body. Thus, the body may also hold the RFID tag.

Especially, the body may form an antenna for the RFID tag.

Especially, a slot may be formed in the body, and the first contact and the second contact may be electrically connected to the body at opposite sides of the slot, so that the body electrically connects the first contact with the second contact around the slot.

The slot may especially have a length of minimum 1 cm. It may also be longer. This has proven go yield good results for an antenna functionality.

The body may be embodied as a ring. This may fit to a user's finger.

Preferably, the body may be embodied as a ring, and the RFID tag may be partly or fully comprised in the ring. This may secure and protect the RFID tag.

It may be implemented that only one of the contacts is electrically connected to the body. Thus, the body may form a half-loop antenna. However, also both contacts may be connected, and the body may form a full-loop antenna.

There is an implementation of the piece of jewelry,
wherein the body comprises a first ring and a second ring,
wherein the RFID tag is fastened between the first ring and the second ring,
wherein the first contact is electrically connected to the first ring and the second contact is electrically connected to the second ring, and
wherein the first ring and the second ring are electrically and/or mechanically connected to each other at a connection apart from the RFID tag.

According to an implementation, the first ring and the second ring may be connected to each other such that they both extend in the same plane. The second ring may have a larger diameter compared to the first ring. The first ring may be positioned inside the second ring. This can yield a specific appearance with two rings.

Especially, the RFID tag may be positioned at maximum distance between the first ring and the second ring. This leaves enough room for the RFID tag.

According to an implementation, the first ring and the second ring are oriented in different planes. The first ring and the second ring are oriented parallel to each other. The RFID tag may be positioned at a first circumferential position between the first ring and the second ring. A connecting rod between the first ring and the second ring is positioned at a second circumferential position. The first circumferential position may be opposite to the second circumferential position.

Especially, it may be implemented that the first ring has an identical diameter compared with the second ring, and/or that the first ring is coaxially arranged to the second ring.

There is a possible implementation
wherein the body is embodied as a ring, and
wherein the ring has a discontinuity with a first end and a second end,
wherein the RFID tag is positioned between the first end and the second end.

The first contact may be mechanically and electrically connected with the first end, and the second contact may be mechanically and electrically connected with the second end. Thus, the ring may serve as an antenna.

According to an implementation, an imaginary line between the first contact and the second contact is oriented at least approximately perpendicular to a plane of the ring.

According to an implementation, an imaginary line between the first contact and the second contact is oriented at least approximately parallel to a central axis of the ring.

According to an implementation, an imaginary line between the first contact and the second contact is oriented at least approximately perpendicular to a central axis of the ring and/or is oriented radially.

According to an implementation, an imaginary line between the first contact and the second contact is oriented at least approximately along a circumference of the ring.

The invention relates further to a piece of jewelry, comprising
a body, and
an RFID tag,
wherein the RFID tag comprises a first contact and a second contact,
wherein the first contact and/or the second contact are electrically connected to the body,
wherein the RFID tag is mechanically connected to the body,
wherein the body forms an antenna for the RFID tag,
wherein a slot is formed in the body,
wherein the first contact and the second contact are electrically connected to the body at opposite sides of the slot, so that the body electrically connects the first contact with the second contact around the slot, and
wherein the body is embodied as a ring.

The invention relates further to a method for fabricating a piece of jewelry, the method comprising the following steps:
providing a body,
providing an RFID tag, the RFID tag comprising a first contact and a second contact,
fastening the RFID tag to the body, and
electrically connecting the first contact and/or the second contact to the body.

Especially, the first contact and/or the second contact may be connected mechanically and electrically to the body.

Preferably, the piece of jewelry may be fabricated as disclosed herein. All disclosed embodiments and variations may be applied.

The invention relates further to a method for fabricating a piece of jewelry, the method comprising the following steps:
providing a body, being embodied as a ring,
providing an RFID tag, the RFID tag comprising a first contact and a second contact,
forming a slot in the body, leaving a first end and a second end of the body,
fastening the RFID tag to the body, and
electrically and mechanically connecting the first contact to the first end and the second contact to the second end.

The invention relates further to a piece of jewelry, comprising
a device for forming a substantial part, and
a passive wireless communication device,
wherein the passive wireless communication device comprises a first contact and a second contact, and wherein the first contact and/or the second contact are electrically connected to the device for forming a substantial part.

It may be implemented that the passive wireless communication device is mechanically connected to the device for forming a substantial part.

It may be implemented that the device for forming a substantial part forms an antenna for the passive wireless communication device.

It may be implemented that a slot is formed in the device for forming a substantial part, and the first contact and the second contact are electrically connected to the device for forming a substantial part at opposite sides of the slot, so that the device for forming a substantial part electrically connects the first contact with the second contact around the slot.

It may be implemented that the device for forming a substantial part is embodied as a ring.

It may be implemented that the device for forming a substantial part is embodied as a ring, and the passive wireless communication device is partly or fully comprised in the ring.

It may be implemented that only one of the contacts is electrically connected to the device for forming a substantial part.

There can be a piece of jewelry,
wherein the device for forming a substantial part comprises a first ring and a second ring,
wherein the passive wireless communication device is fastened between the first ring and the second ring,
wherein the first contact is electrically connected to the first ring and the second contact is electrically connected to the second ring, and
wherein the first ring and the second ring are electrically and/or mechanically connected to each other at a connection apart from the passive wireless communication device.

It may be implemented that the first ring and the second ring are connected to each other such that they both extend in the same plane.

It may be implemented that the second ring has a larger diameter compared to the first ring.

It may be implemented that the first ring is positioned inside the second ring.

It may be implemented that the passive wireless communication device is positioned at maximum distance between the first ring and the second ring.

It may be implemented that the first ring and the second ring are oriented in different planes.

It may be implemented that the first ring and the second ring are oriented parallel to each other.

It may be implemented that the passive wireless communication device is positioned at a first circumferential position between the first ring and the second ring.

It may be implemented that a connecting rod between the first ring and the second ring is positioned at a second circumferential position.

It may be implemented that the first circumferential position is opposite to the second circumferential position.

There may be a piece of jewelry,
wherein the first ring has an identical diameter compared with the second ring, and/or
wherein the first ring is coaxially arranged to the second ring.

There may be a piece of jewelry,
wherein the device for forming a substantial part is embodied as a ring, and wherein the ring has a discontinuity with a first end and a second end,
wherein the passive wireless communication device is positioned between the first end and the second end.

There may be a piece of jewelry,
wherein the first contact is mechanically and electrically connected with the first end, and
wherein the second contact is mechanically and electrically connected with the second end.

It may be implemented that an imaginary line between the first contact and the second contact is oriented at least approximately perpendicular to a plane of the ring.

It may be implemented that an imaginary line between the first contact and the second contact is oriented at least approximately parallel to a central axis of the ring.

It may be implemented that an imaginary line between the first contact and the second contact is oriented at least approximately perpendicular to a central axis of the ring and/or is oriented radially.

It may be implemented that an imaginary line between the first contact and the second contact is oriented at least approximately along a circumference of the ring.

The invention relates further to a piece of jewelry, comprising
a device for forming a substantial part, and
a passive wireless communication device,
wherein the passive wireless communication device comprises a first contact and a second contact,
wherein the first contact and/or the second contact are electrically connected to the device for forming a substantial part,
wherein the passive wireless communication device is mechanically connected to the device for forming a substantial part,
wherein the device for forming a substantial part forms an antenna for the passive wireless communication device,
wherein a slot is formed in the device for forming a substantial part,
wherein the first contact and the second contact are electrically connected to the device for forming a substantial part at opposite sides of the slot, so that the device for forming a substantial part electrically connects the first contact with the second contact around the slot, and
wherein the device for forming a substantial part is embodied as a ring.

The invention relates further to a buckle, comprising
a frame,
a prong, being swivel-mounted with respect to the frame,
an RFID tag with a first contact and a second contact,
wherein the RFID tag is mounted on the frame with the first contact being permanently electrically connected to the frame and the second contact facing away from the frame, and
wherein the prong contacts the second contact when it is in one end state, and does otherwise not contact the second contact.

Thus, the RFID functionality can be implemented in a buckle. This allows the functionality to be used by persons not wearing a ring, for example.

Especially, the frame and/or the prong are made of metal, or steel. Thus, they are electrically conductive. Also other materials can be used.

Preferably, the frame and the prong form an antenna for the RFID tag, when the prong contacts the second contact. Thus, an additional antenna can be omitted.

The RFID tag may be positioned in a recess of the frame, the recess laterally securing the prong when it is in the end state. Thus, an electric contact between the prong and the RFID tag may be secured, because a lateral position of the prong is defined.

The invention relates further to a piece of jewelry, comprising
a bracelet, and
a buckle as disclosed herein, the buckle being connected to the bracelet.

With regard to the buckle, all disclosed implementations can be applied.

The piece of jewelry may further comprise a watch connected to the bracelet.

The invention relates further to a buckle, comprising
a frame,
a prong, being swivel-mounted with respect to the frame,
an RFID tag with a first contact and a second contact,
wherein the RFID tag is mounted on the frame with the first contact being permanently electrically connected to the frame and the second contact facing away from the frame,
wherein the prong contacts the second contact when it is in one end state, and does otherwise not contact the second contact,
wherein the frame and/or the prong are made of metal, or steel,
wherein the frame and the prong form an antenna for the RFID tag, when the prong contacts the second contact, and
wherein the RFID tag is positioned in a recess of the frame, the recess laterally securing the prong when it is in the end state.

The invention relates further to a method for fabricating a buckle, the method comprising the following steps:
providing a frame,
swivel-mounting a prong with respect to the frame,
mounting an RFID tag with a first contact and a second contact to the frame,
wherein the RFID tag is mounted on the frame with the first contact being permanently electrically connected to the frame and the second contact facing away from the frame, and
wherein the prong contacts the second contact when it is on one end state, and does otherwise not contact the second contact.

The invention relates further to a method for fabricating a buckle, the method comprising the following steps:
providing a frame,
swivel-mounting a prong with respect to the frame,
mounting an RFID tag with a first contact and a second contact to the frame,
wherein the RFID tag is mounted on the frame with the first contact being permanently electrically connected to the frame and the second contact facing away from the frame,
wherein the prong contacts the second contact when it is on one end state, and does otherwise not contact the second contact, and
wherein the RFID tag is mounted in a recess of the frame, the recess laterally securing the prong when it is in the end state.

The invention relates further to a device for connecting two ends of a belt, comprising
a device for forming an outer structure,
a fastening device, being swivel-mounted with respect to the device for forming an outer structure,
a passive wireless communication device with a first contact and a second contact,
wherein the passive wireless communication device is mounted on the device for forming an outer structure with the first contact being permanently electrically connected to the device for forming an outer structure and the second contact facing away from the device for forming an outer structure, and
wherein the fastening device contacts the second contact when it is in one end state, and does otherwise not contact the second contact.

It may be implemented that the device for forming an outer structure and/or the fastening device are made of metal, or steel.

It may be implemented that the device for forming an outer structure and the fastening device form an antenna for the passive wireless communication device, when the fastening device contacts the second contact.

It may be implemented that the passive wireless communication device is positioned in a recess of the device for forming an outer structure, the recess laterally securing the fastening device when it is in the end state.

The invention relates further to a piece of jewelry, comprising
a bracelet, and
a device for connecting two ends of a belt according to one of the preceding items, the device for connecting two ends of a belt being connected to the bracelet.

It may be implemented that the piece of jewelry further comprises a watch connected to the bracelet.

The invention relates further to a device for connecting two ends of a belt, comprising
a device for forming an outer structure,
a fastening device, being swivel-mounted with respect to the device for forming an outer structure,
a passive wireless communication device with a first contact and a second contact,
wherein the passive wireless communication device is mounted on the device for forming an outer structure with the first contact being permanently electrically connected to the device for forming an outer structure and the second contact facing away from the device for forming an outer structure,
wherein the fastening device contacts the second contact when it is in one end state, and does otherwise not contact the second contact,
wherein the device for forming an outer structure and/or the fastening device are made of metal, or steel,
wherein the device for forming an outer structure and the fastening device form an antenna for the passive wireless communication device, when the fastening device contact the second contact, and
wherein the passive wireless communication device is positioned in a recess of the device for forming an outer structure, the recess laterally securing the fastening device when it is in the end state.

The invention relates further to an RFID arrangement. The RFID arrangement comprises an RFID tag. The RFID tag can be used to store data for readout, for example by a corresponding readout device. The RFID tag comprises an antenna. The antenna is electrically connected to the RFID tag. Thus, the antenna can be used in order to access the RFID tag using suitable radio waves. The RFID arrangement further comprises a solid layer, wherein the RFID tag and the antenna are positioned on the solid layer. The solid layer can thus be regarded as a stabilizing and supporting structure of the RFID arrangement. The RFID arrangement further comprises a cover layer covering the solid layer, the RFID tag and the antenna. The cover layer thus provides a protective shield, which can be regarded as a top of the RFID arrangement in use. The RFID arrangement further comprises a glue layer for fixing the RFID arrangement to an external device. The glue layer is especially positioned on a side of the solid layer opposite to the cover layer.

The RFID arrangement in principle comprises three layers, namely the solid layer, the cover layer and the glue layer. The glue layer can be used in order to fix the RFID arrangement to an external device. For example, it can be fixed at a surface of a mobile phone. Thus, the mobile phone can be provided with the ability to provide information stored in the RFID tag without having to modify the mobile phone itself. The glue layer may comprise or may be formed of a suitable glue, for example a glue that forms a material connection with another item.

The cover layer can present a surface to a user, wherein the cover layer protects the RFID arrangement and can especially be used so that a user can put a fingertip on the cover layer in order to activate readout of the RFID tag. This can provide a functionality so that the RFID tag cannot be read out if there is no fingertip placed on the cover layer, and that it can be read out if a fingertip is placed on the cover layer.

Especially, the solid layer may be parallel to the cover layer. Furthermore, the solid layer may be parallel to the glue layer. Especially, all three layers, namely the solid layer, the cover layer, and the glue layer, may be parallel to each other. This can provide for a very compact arrangement. Especially, each of these layers can be flat, insofar as dimensions in a plane may be significantly larger than a thickness measured perpendicular to this plane. Corresponding planes can be parallel for all three mentioned layers.

Especially, the solid layer may have a uniform thickness. Also, the cover layer may have a uniform thickness. Also, the glue layer may have a uniform thickness. Having a uniform thickness for each of the layers can provide for a very compact arrangement that can have a uniform thickness as a complete arrangement. Thus, the RFID arrangement as a whole can be provided in a form factor that is flat and has a certain extension in a plane, so that it may, for example, correspond approximately to the dimensions of a human fingertip in the plane, and that it does not disturb normal usage of a device like a mobile phone if the RFID arrangement is secured at an outer surface of this device.

The cover layer may especially be made of electrically insulating material. Especially, it may be made of plastic or acrylic. Thus, the cover layer just provides for protecting the RFID arrangement and for a surface on which a human fingertip can be placed, but does not disturb electrical operation.

The cover layer may especially comprise an outside structure indicating an intended position of a fingertip, wherein especially it may comprise a design pattern indicating a fingerprint. This can provide for a visual recognizable sign to a user that he should place his fingertip on the cover layer in order to enable readout of the RFID tag.

The solid layer may especially be made of electrically insulating material. Especially, it may be made of plastic or acrylic. This can also provide for electrically insulating the RFID tag and/or the antenna.

The RFID tag and the antenna may be arranged so that the RFID tag can only be read out when a fingertip or another part of a human body is placed on the cover layer. Especially, the antenna can be arranged electrically such that waves used for reading out the RFID tag only propagate to the antenna in a sufficient manner if a fingertip or another part of a human body is placed on the cover layer, wherein the waves otherwise propagate in other parts of the RFID tag and/or in an object or device to which the RFID arrangement is secured to.

Especially, the antenna may be structured to extend in a plane. This can yield a flat structure of the RFID arrangement.

Especially, the RFID tag may be a passive RFID tag. Thus, an electromagnetic wave can be used in order to read out the RFID tag, wherein the electromagnetic wave propagates towards the antenna, is modified by the RFID tag and this modification can be detected by the readout device. There is no energy source required for such an RFID tag. However, also an active RFID tag can be used, which typically has a power source in order to provide for sending an electromagnetic wave itself.

The invention relates further to an RFID arrangement, comprising
   an RFID tag,
   an antenna, being electrically connected to the RFID tag,
   a solid layer, the RFID tag and the antenna being positioned on the solid layer,
   a cover layer covering the solid layer, the RFID tag and the antenna, and
   a glue layer for fixing the RFID arrangement to an external device, the glue layer being positioned on a side of the solid layer opposite to the cover layer,
   wherein the solid layer has a uniform thickness,
   wherein the cover layer has a uniform thickness, and
   wherein the solid layer, the cover layer and the glue layer are parallel to each other.

The invention relates further to a local sending arrangement, comprising a passive wireless communication device for exchanging information with an external readout device, and further comprising an antenna being electrically connected to the passive wireless communication device. The local sending arrangement further comprises a solid layer, the passive wireless communication device and the antenna being positioned on the solid layer. The local sending arrangement further comprises a protective layer covering the solid layer, the passive wireless communication device and the antenna. The protective layer protects the passive wireless communication device and the antenna. The local sending arrangement further comprises a fixation layer for fixing the local sending arrangement to an external device, the fixation layer being positioned on a side on the solid layer opposite to the protective layer.

With such a local sending arrangement, similar advantages can be achieved as described further above with respect to an RFID arrangement.

The solid layer may especially be parallel to the protective layer. The solid layer may especially be parallel to the fixation layer. The solid layer, the protective layer and/or the fixation layer may have a uniform thickness.

Especially, the protective layer may be made of electrically insulating material, especially of plastic or acrylic.

Especially, the protective layer may comprise an outside structure indicating an intended position of a fingertip or a design pattern indicating a fingerprint.

The solid layer may especially be made of electrically insulating material, especially plastic or acrylic.

The passive wireless communication device and the antenna may especially be arranged so that the passive wireless communication device can only be read out when a fingertip or another part of a human body is placed on the protective layer.

Especially, the antenna may be structured to extend in a plane. Especially, the passive wireless communication device may be a passive RFID tag. Furthermore, it may also be an active RFID tag.

Reference is made to the statements given above with respect to an RFID arrangement, which can be applied accordingly.

The invention relates further to a local sending arrangement, comprising
- a passive wireless communication device,
- an antenna, being electrically connected to the passive wireless communication device,
- a solid layer, the passive wireless communication device and the antenna being positioned on the solid layer,
- a protective layer covering the solid layer, the passive wireless communication device and the antenna, and
- a fixation layer for fixing the local sending arrangement to an external device, the fixation layer being positioned on a side of the solid layer opposite to the protective layer,
- wherein the solid layer has a uniform thickness,
- wherein the protective layer has a uniform thickness, and
- wherein the solid layer, the protective layer and the fixation layer are parallel to each other.

The invention relates further to a method for retrieving information, the method comprising the following steps:
- providing an RFID arrangement as disclosed herein, wherein the information is stored on the RFID tag on the RFID arrangement,
- providing a readout device,
- sending radiofrequency waves from the readout device to the RFID arrangement, and retrieving the information from a change in the radiofrequency waves.

This method can be used to read out information stored in an RFID tag of an RFID arrangement. With respect to the RFID arrangement all disclosed embodiments can be applied.

The method may further comprise, while sending radiofrequency waves, putting an object on the cover layer. This can activate a readout, wherein radiofrequency waves can be guided to be received by the antenna when the object on the cover layer is placed. Especially, the object may be a human finger or another part of a human body.

The RFID arrangement may especially be secured to an item with the glue layer. Thus, the RFID arrangement may be placed on an item like a mobile phone or another portable device, so that the information stored on the RFID tag is provided without the need that a customer wears a specific piece of jewelry or another specific device for providing the RFID tag.

The invention relates further to a method for retrieving information, the method comprising the following steps:
- providing an RFID arrangement according to any of item 1 to 13, wherein the information is stored on the RFID tag of the RFID arrangement,
- providing a readout device,
- sending radio frequency waves from the readout device to the RFID arrangement, and
- retrieving the information from a change in the radio frequency waves,
- further comprising, while sending radio frequency waves, putting a human finger on the cover layer.

With regard to the method, it should be noted that instead of an RFID arrangement as mentioned, a local sending arrangement as mentioned further above can also be used. All statements given above can be applied accordingly.

In general, throughout the present application, any element that can form an antenna, for example a loop antenna, a housing, a socket, a bracket, a tag holder, a body, a housing, a protective covering device, a ring, a device for forming a substantial part, a prong, an outer structure, or a fastening device, can fully or partly be made of an electrically conductive material. For example, a metal such as copper, aluminum, silver, gold, or platinum can be used. Alternatively, a conductive polymer or any other conductive substance can be used. If such an element is only partly made of an electrically conductive material, the element may especially be covered by the electrically conductive material. The same statements given for an element that can form an antenna apply for any element that can be glued or soldered to another element.

The invention will now be further described with reference to the drawings.

Figure 2:
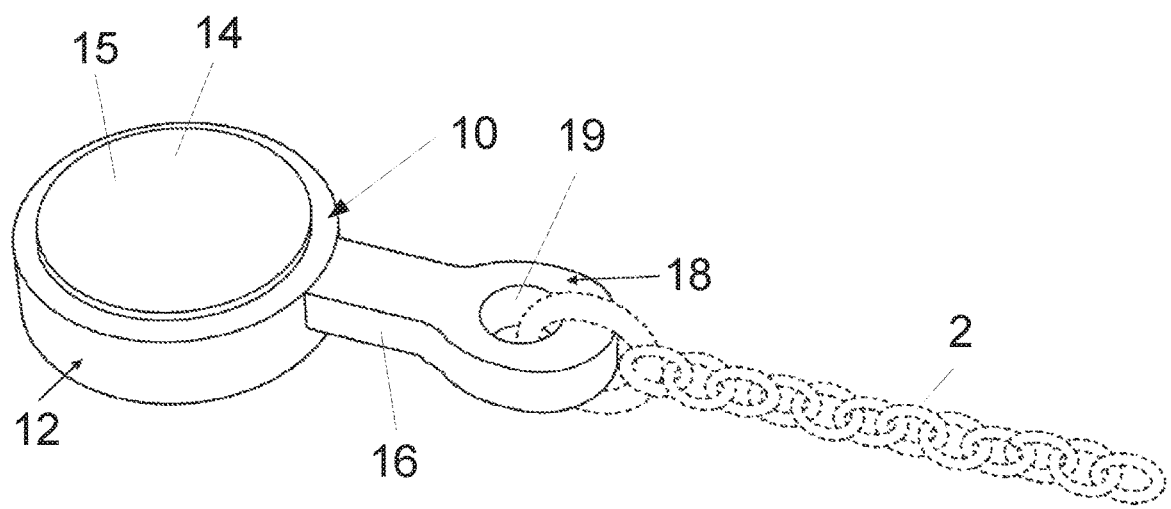
Figure 3:
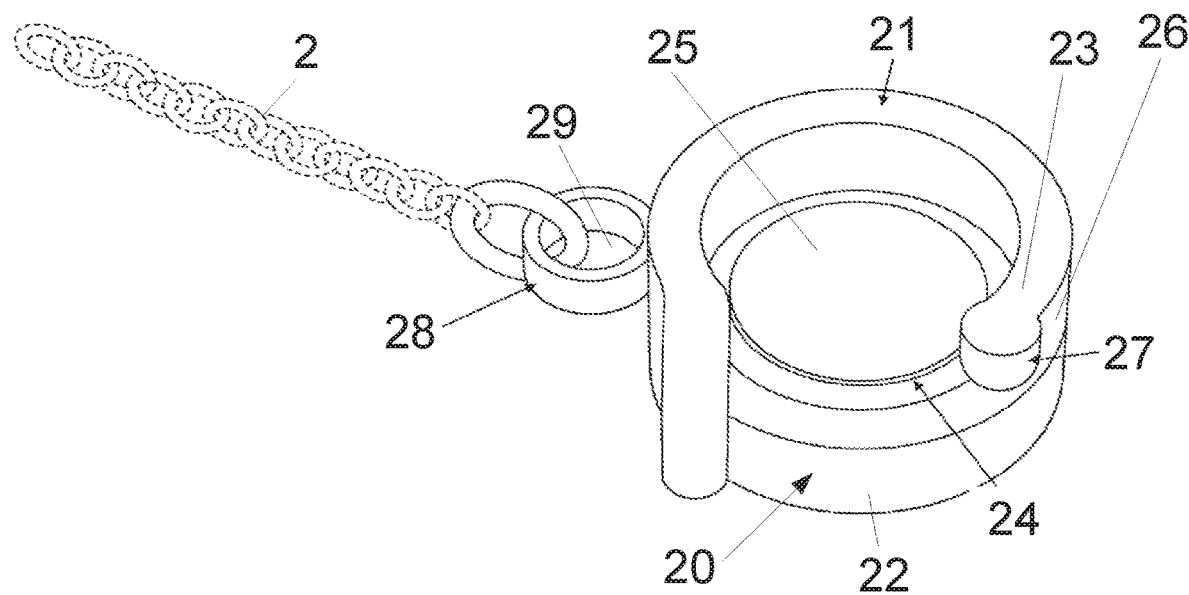
Figure 4:
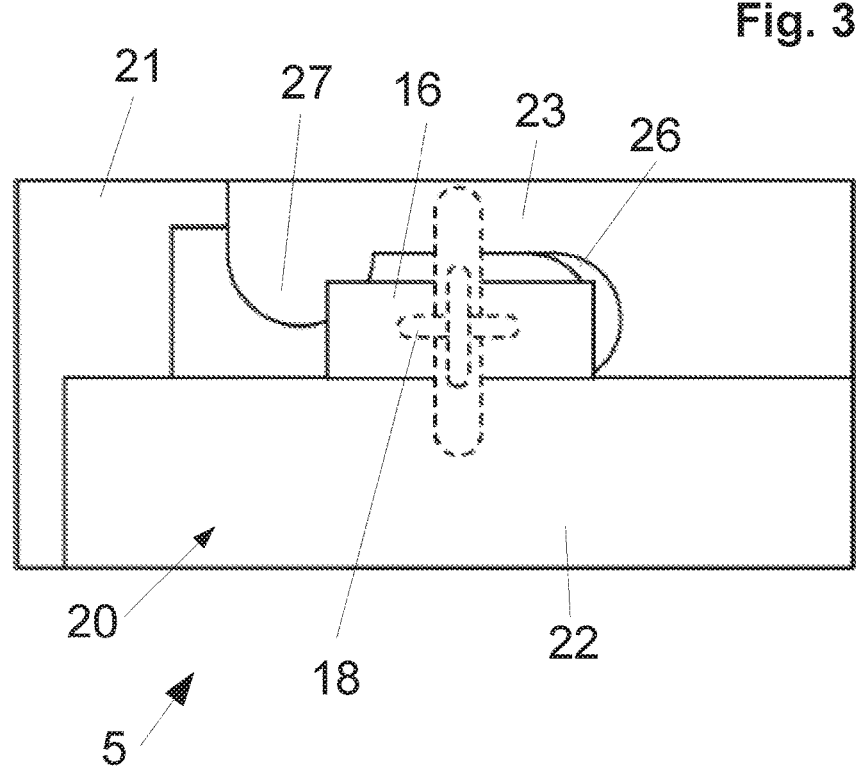
Figure 5:
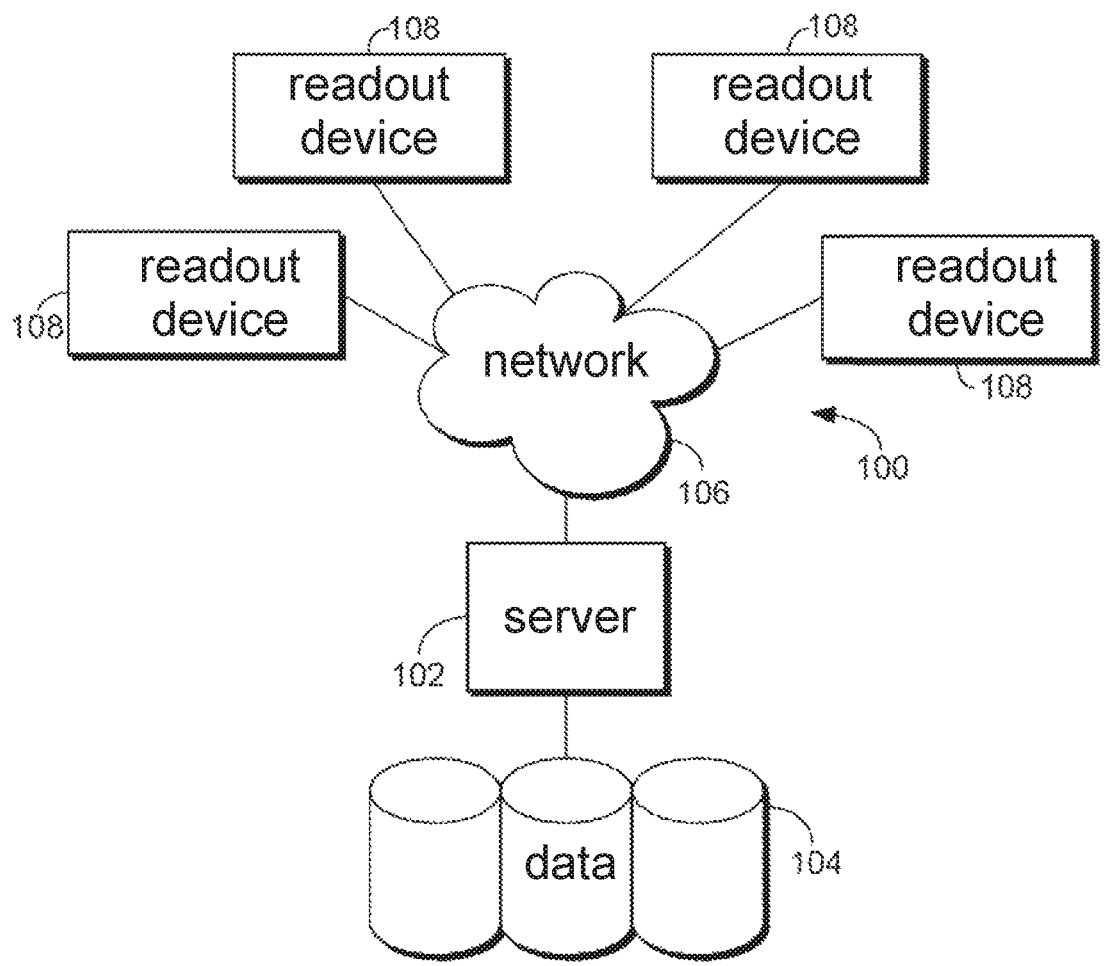
Figure 6:
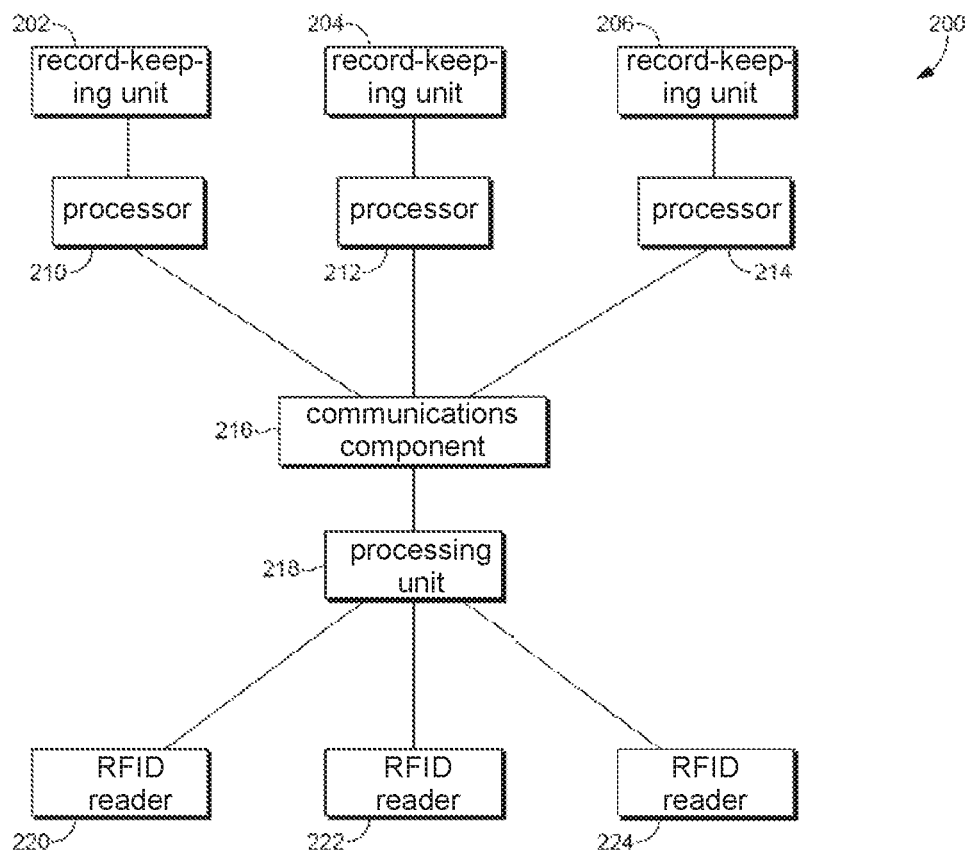
Figure 7:
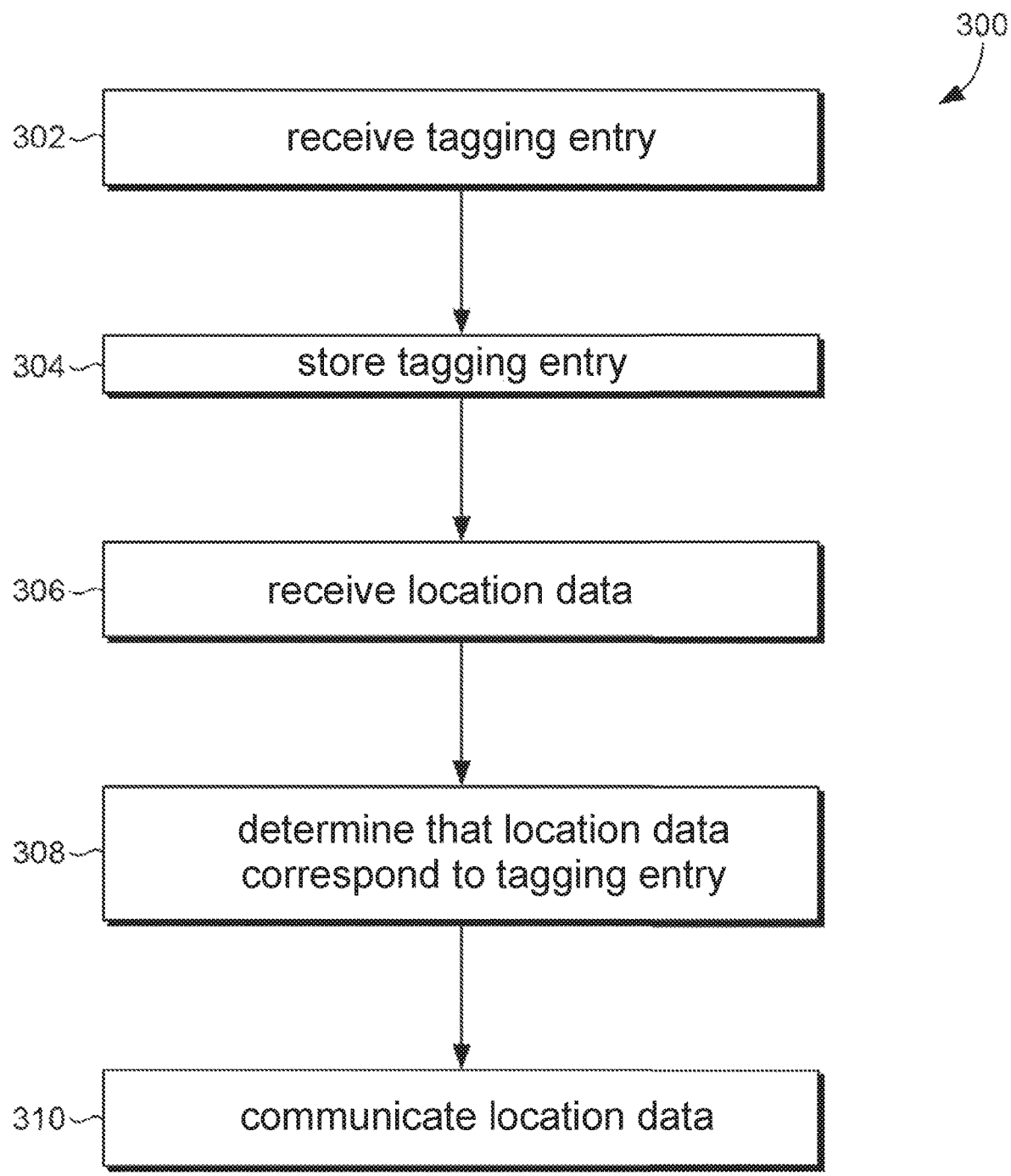
Figure 8:
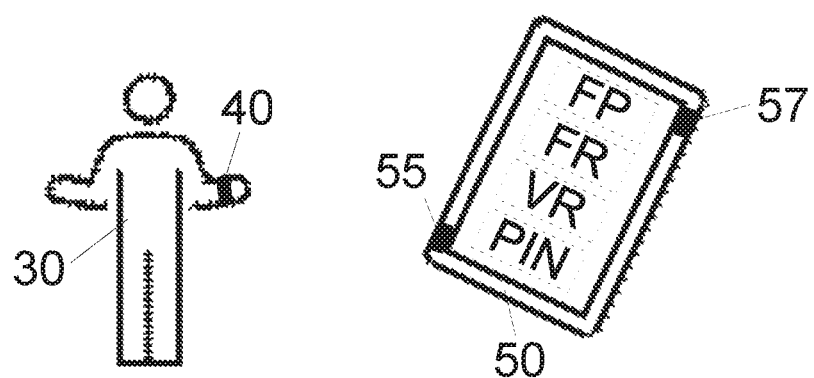
Figure 9:
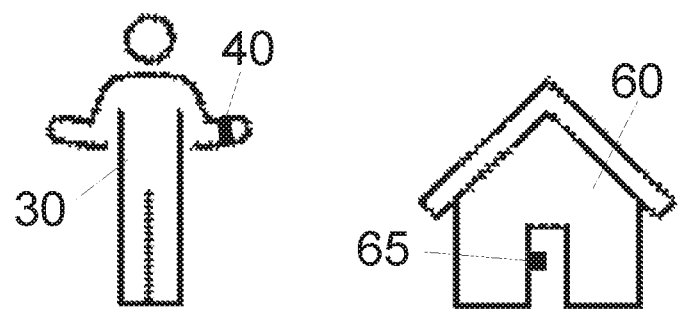
Figure 10:
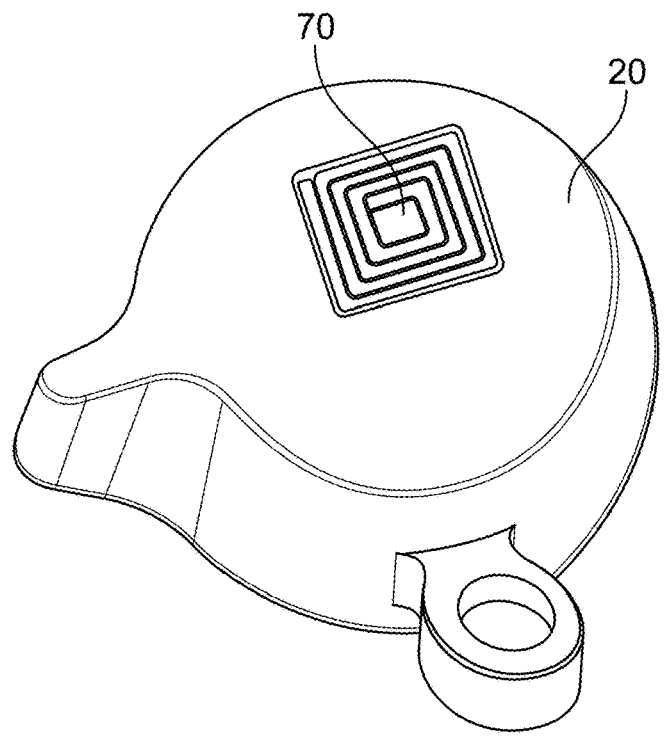
Figure 11:
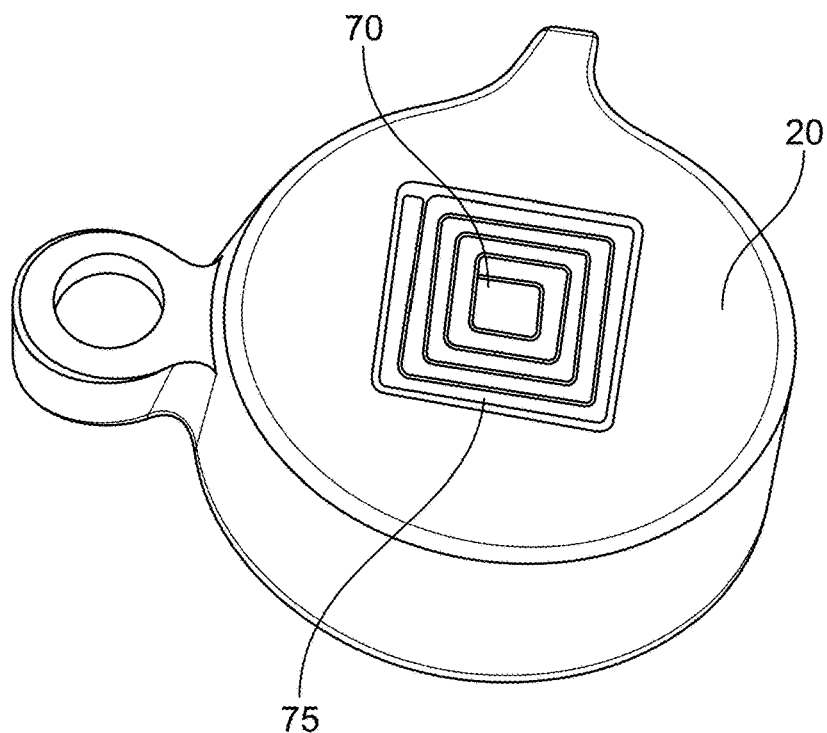
Figure 15:
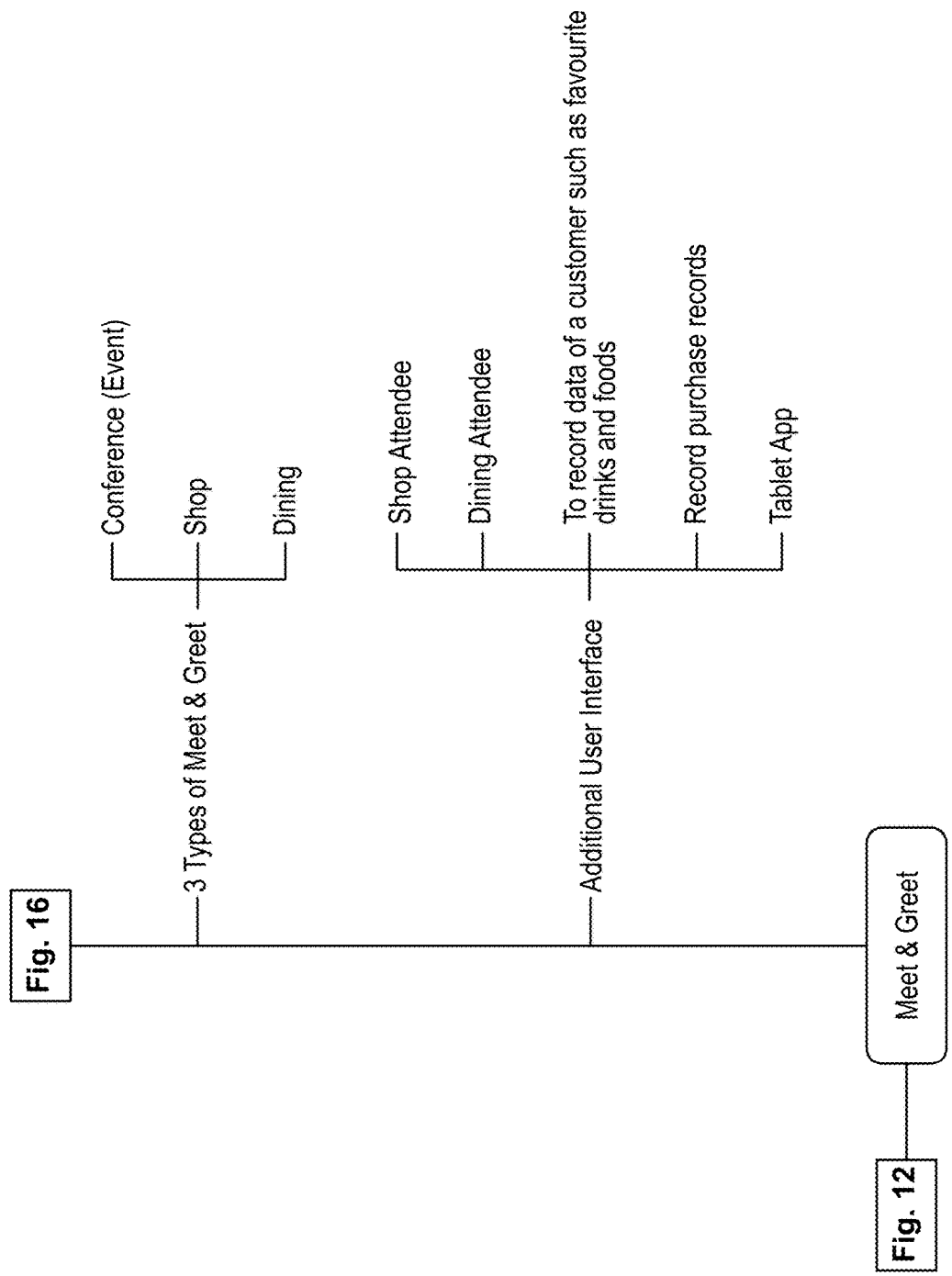
Figure 16:
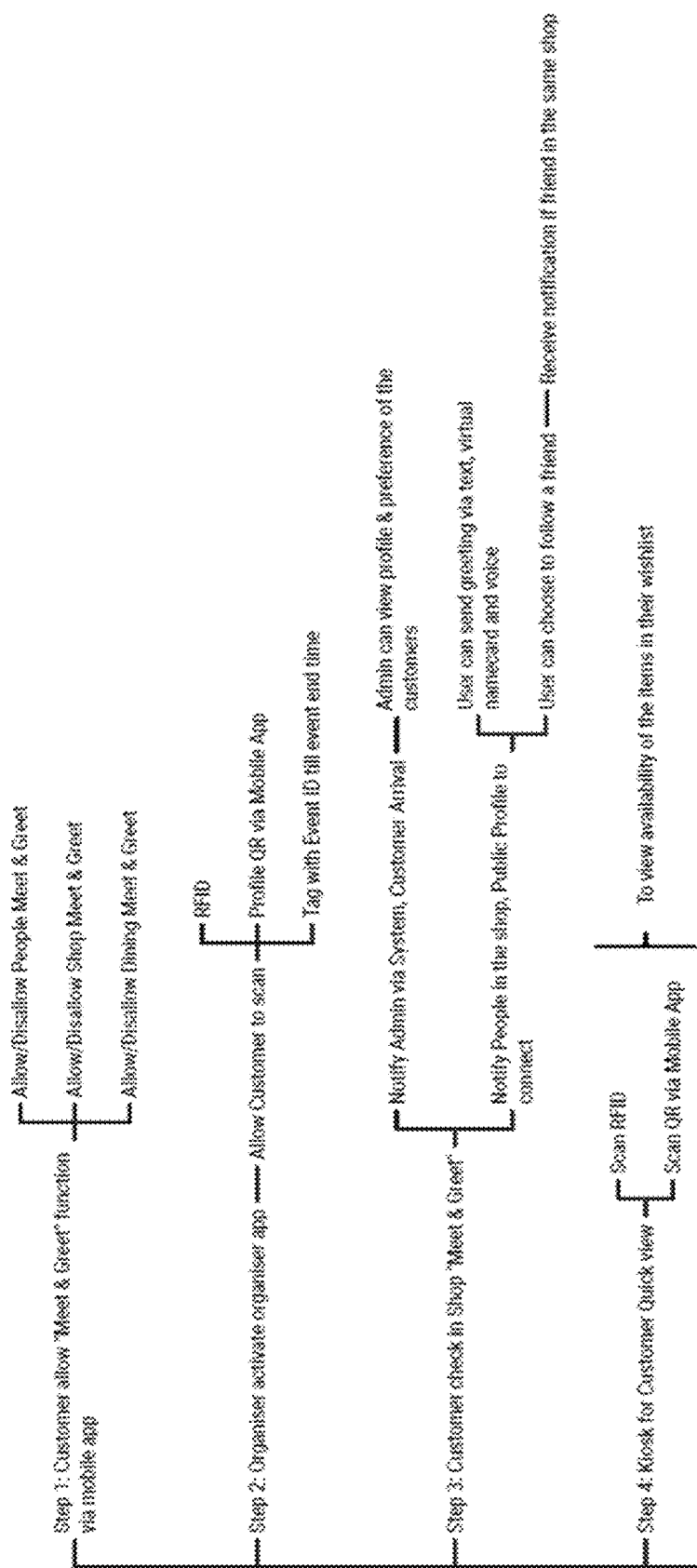
Figure 17:
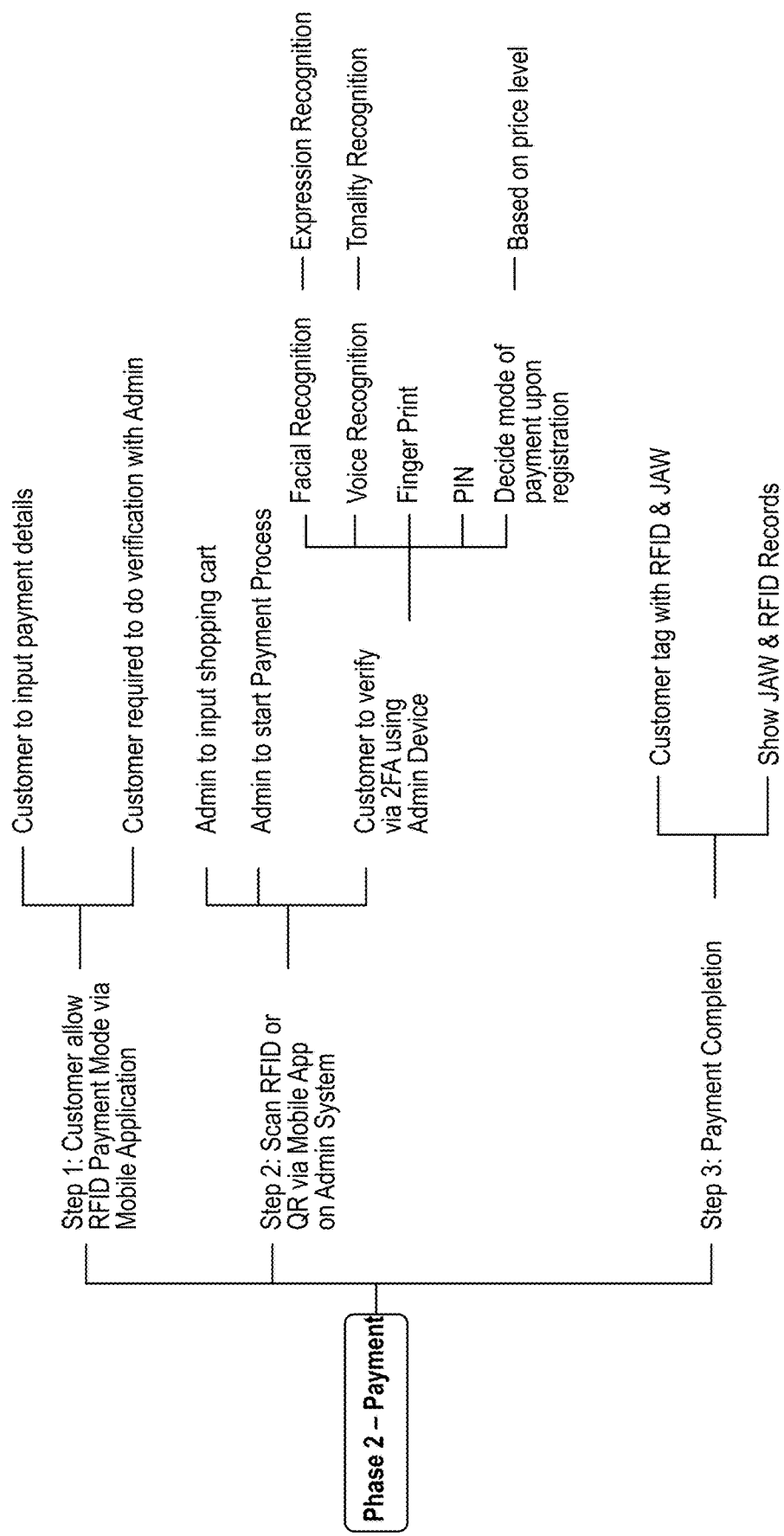
Figure 18:
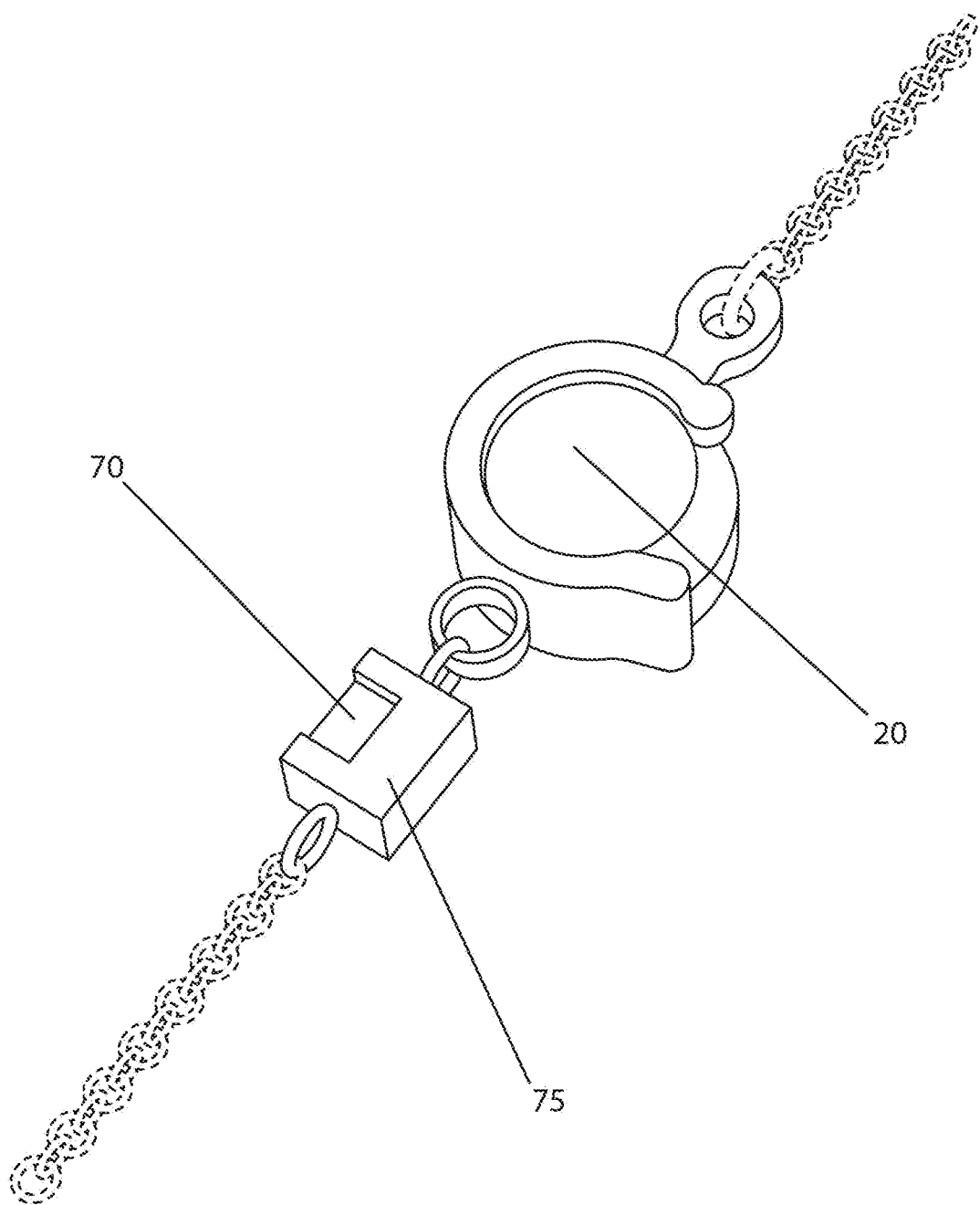
Figure 19:
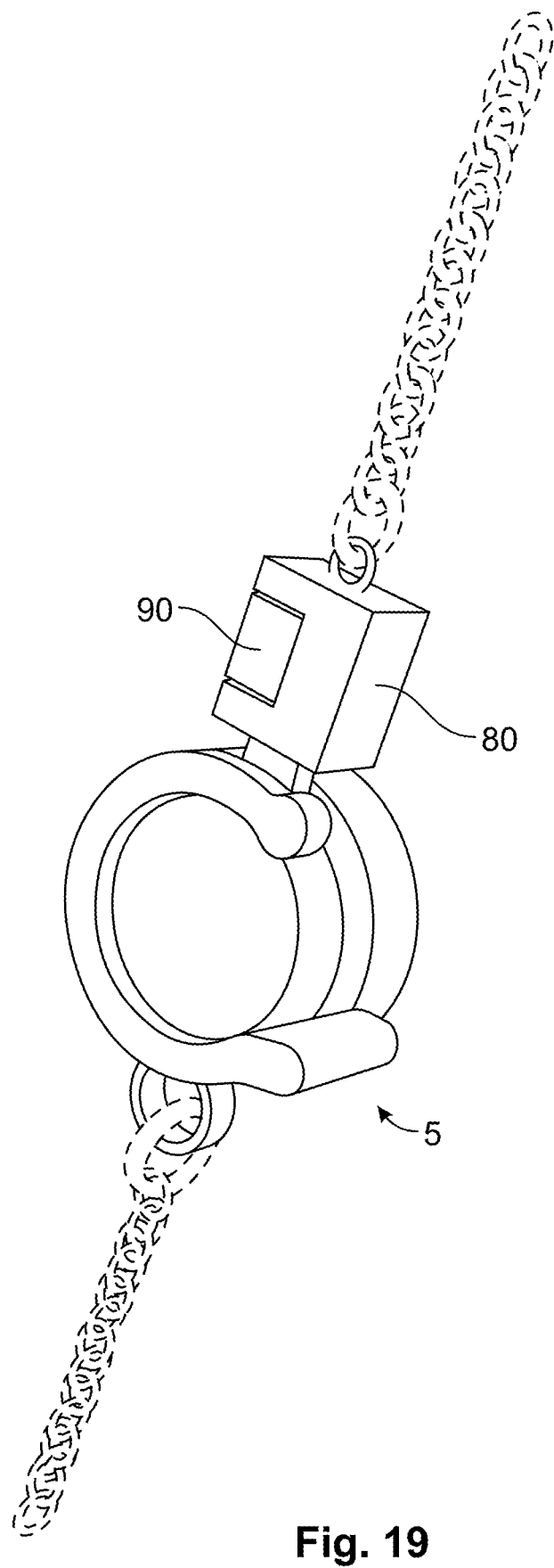
Figure 20:
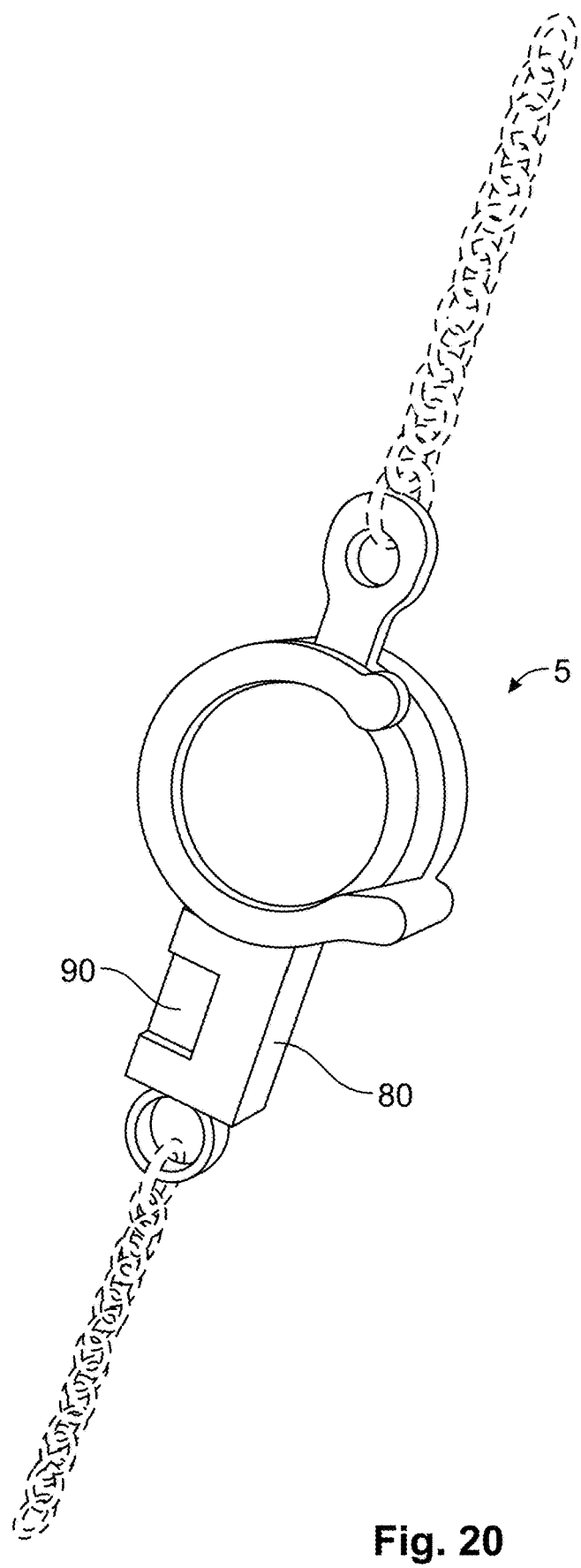
Figure 21:
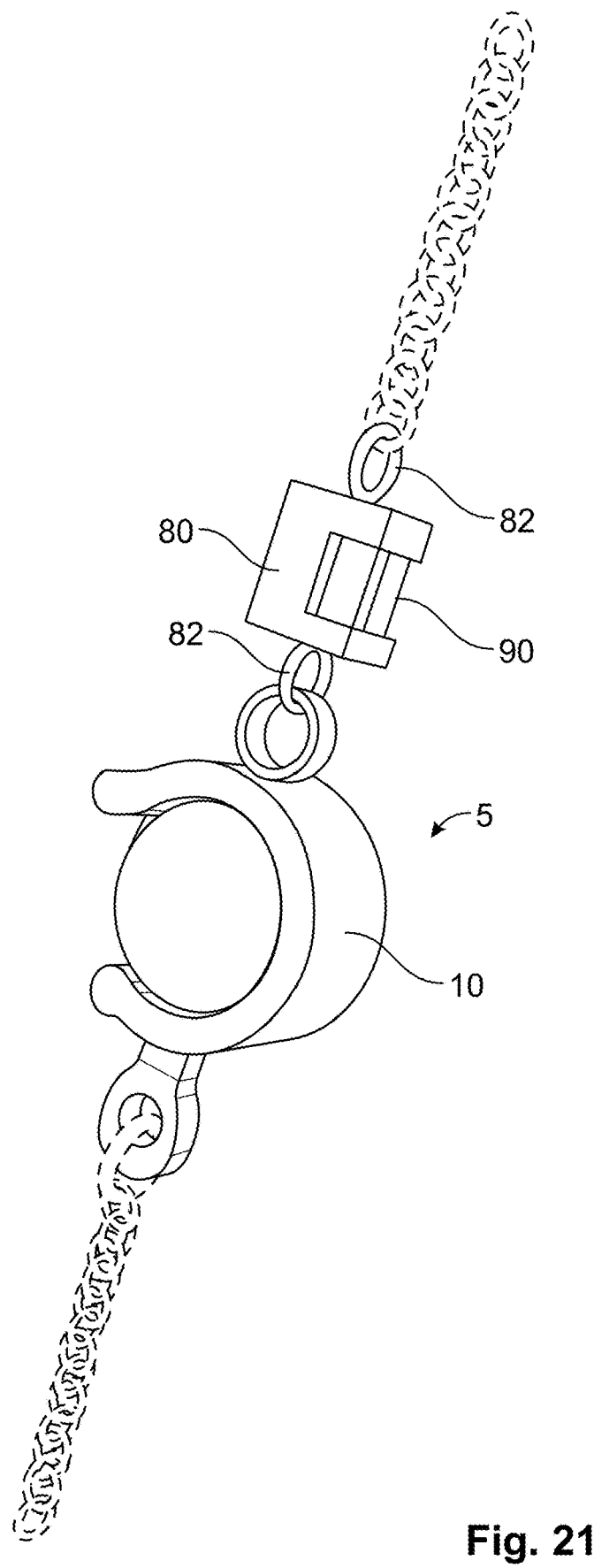
Figure 22:
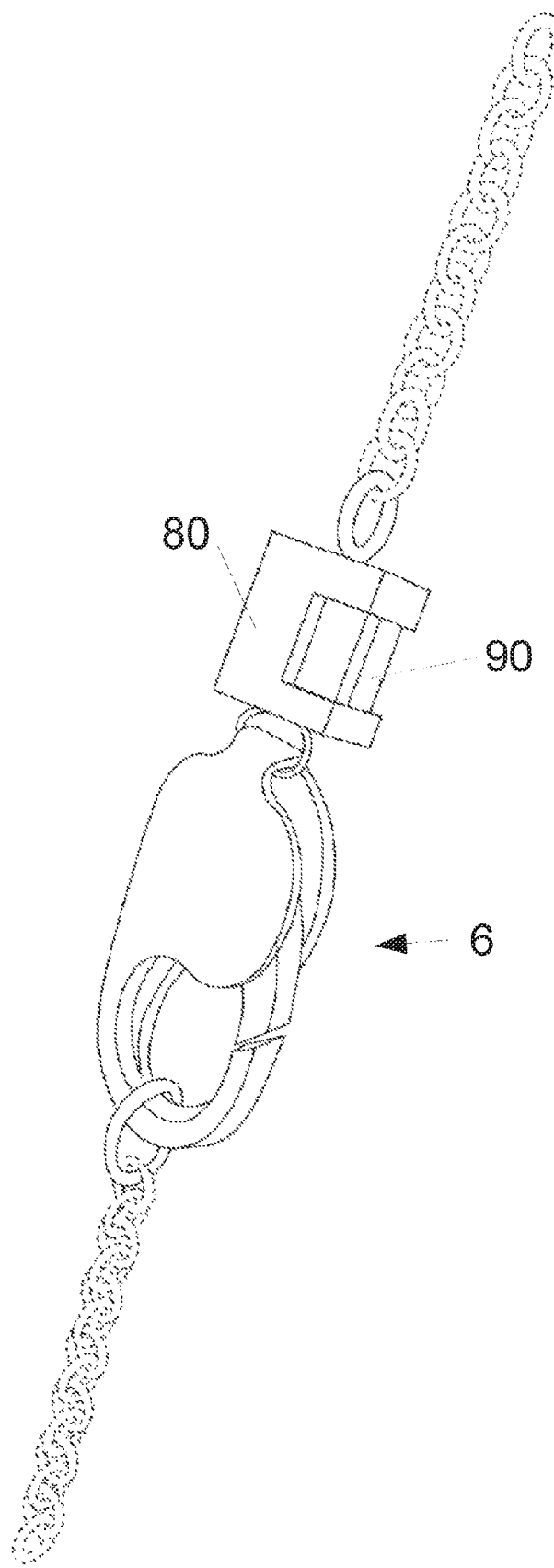
Figure 23:
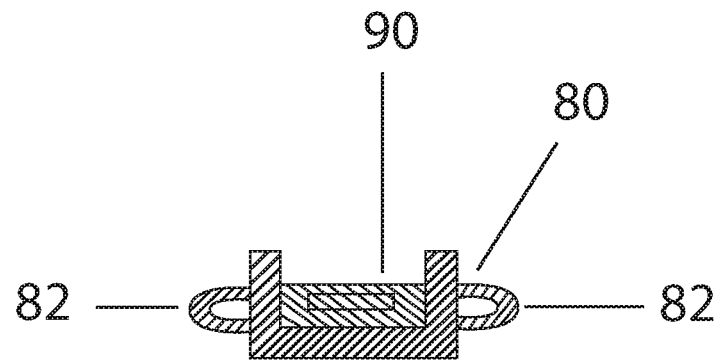
Figure 24:
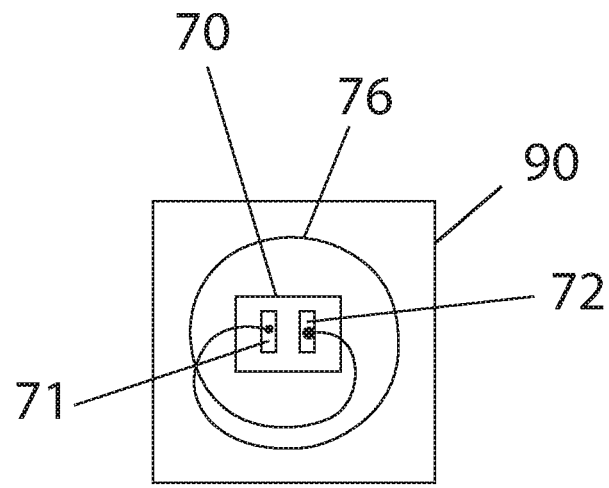
Figure 25:
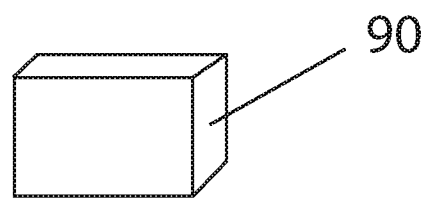
Figure 26:
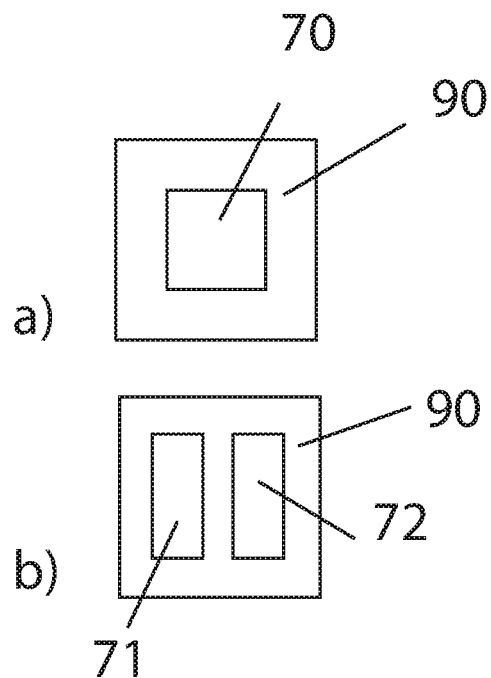
Figure 27:
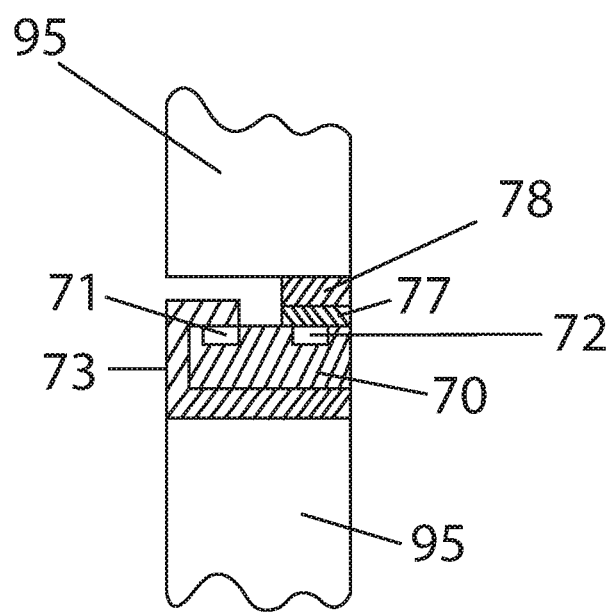
Figure 28:
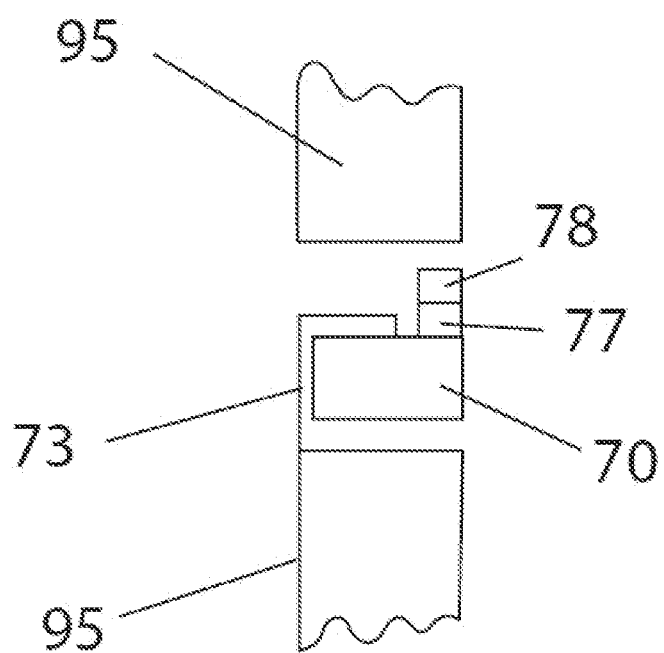
Figures 29A, 29B:
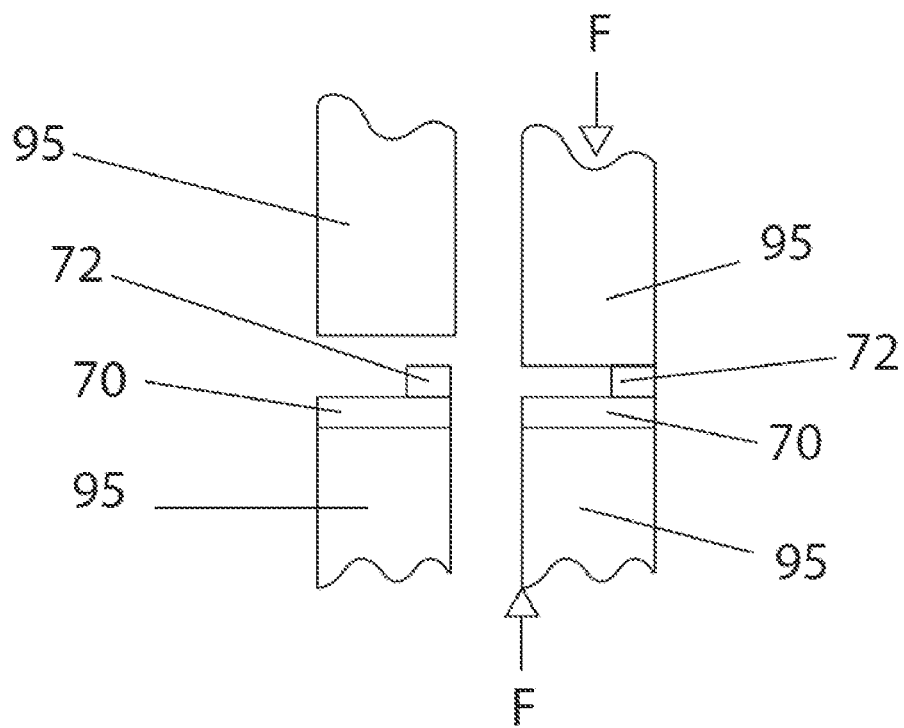
Figure 30:
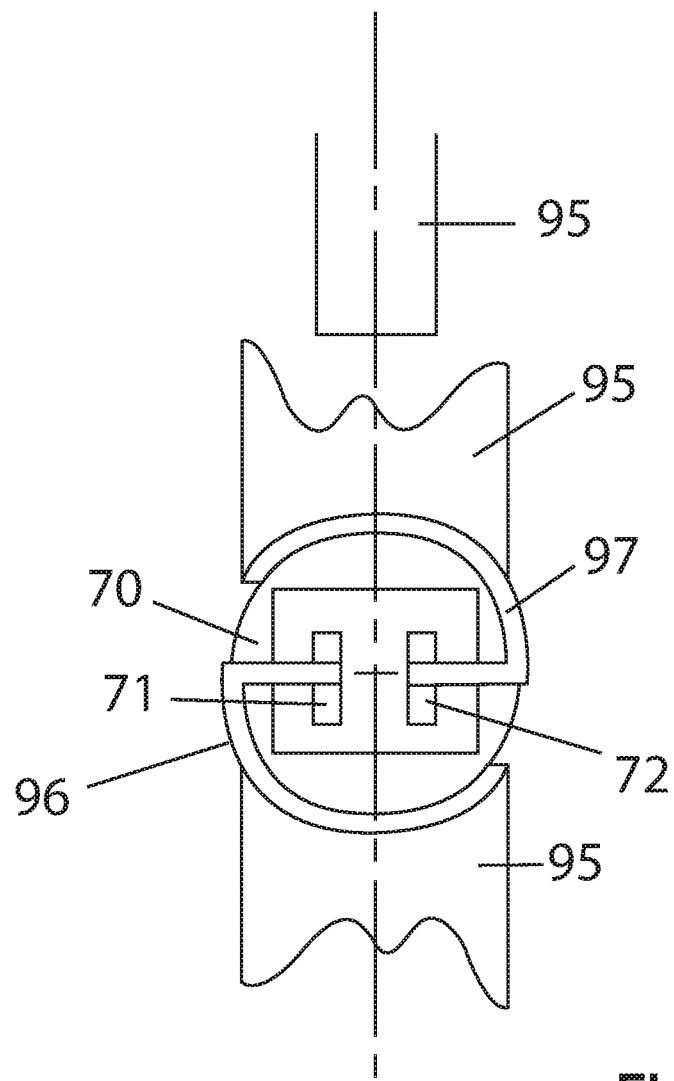
Figure 36:
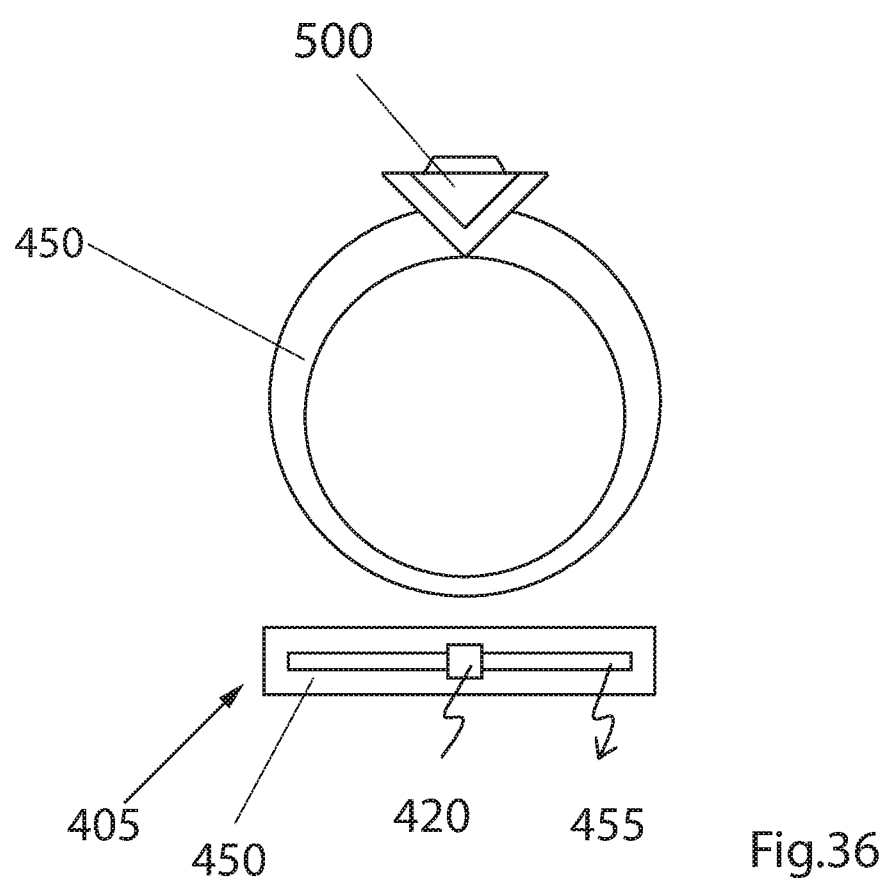
Figure 37:
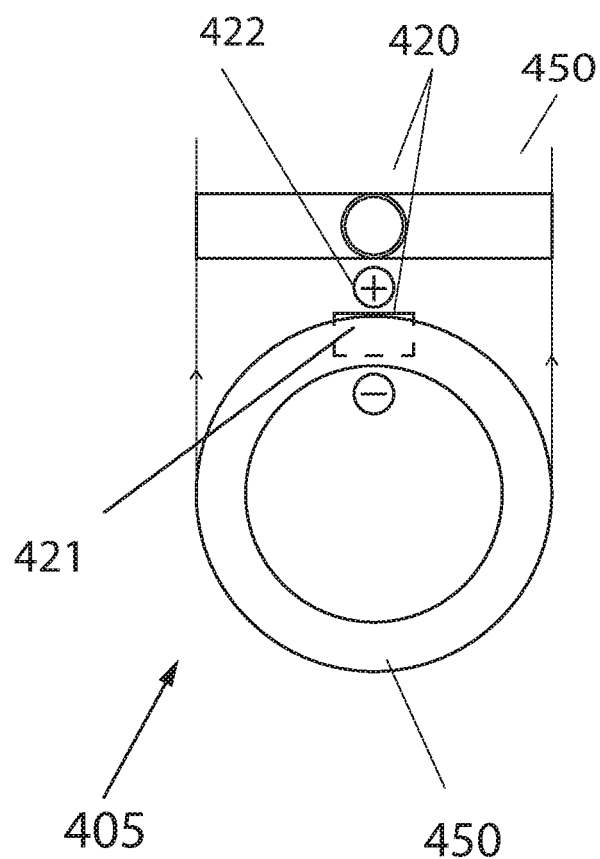
Figure 38:
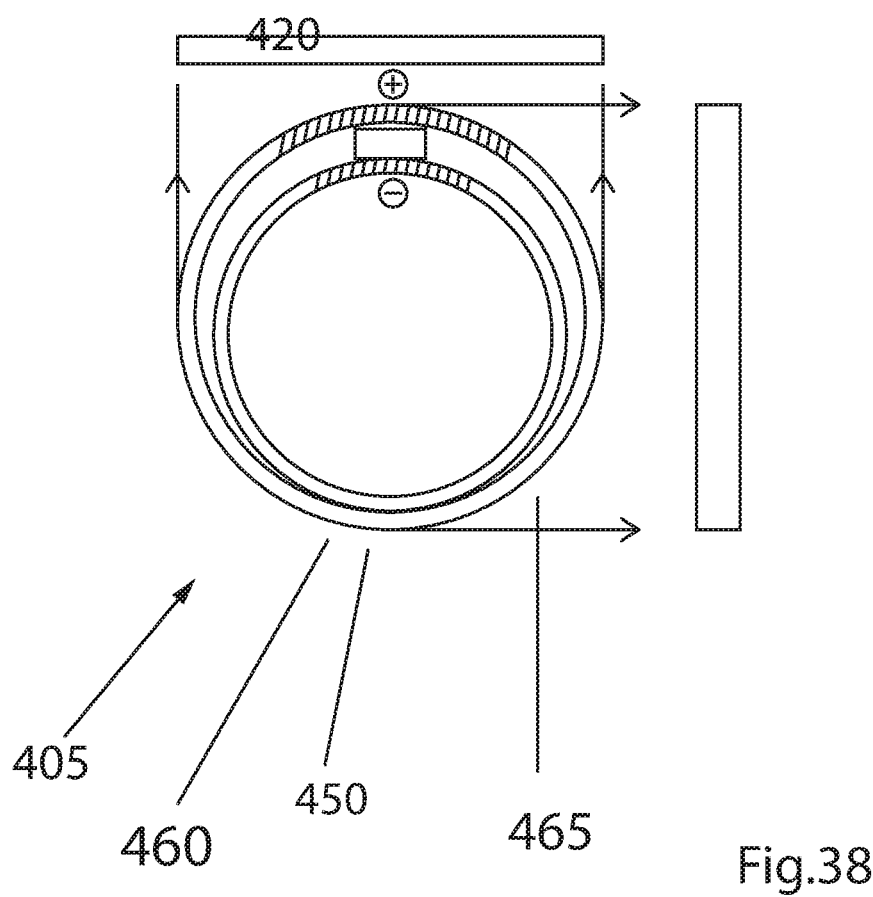
Figure 39:
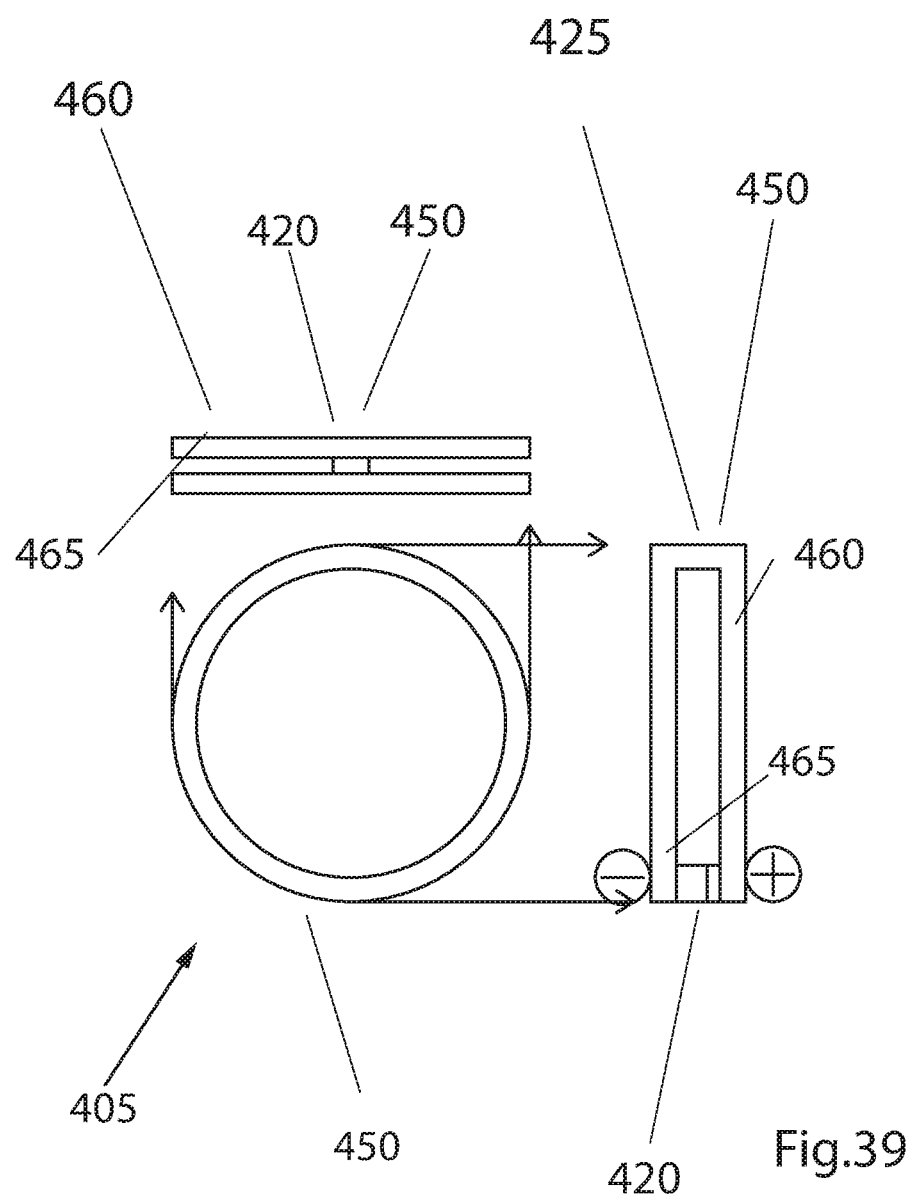
Figure 40:
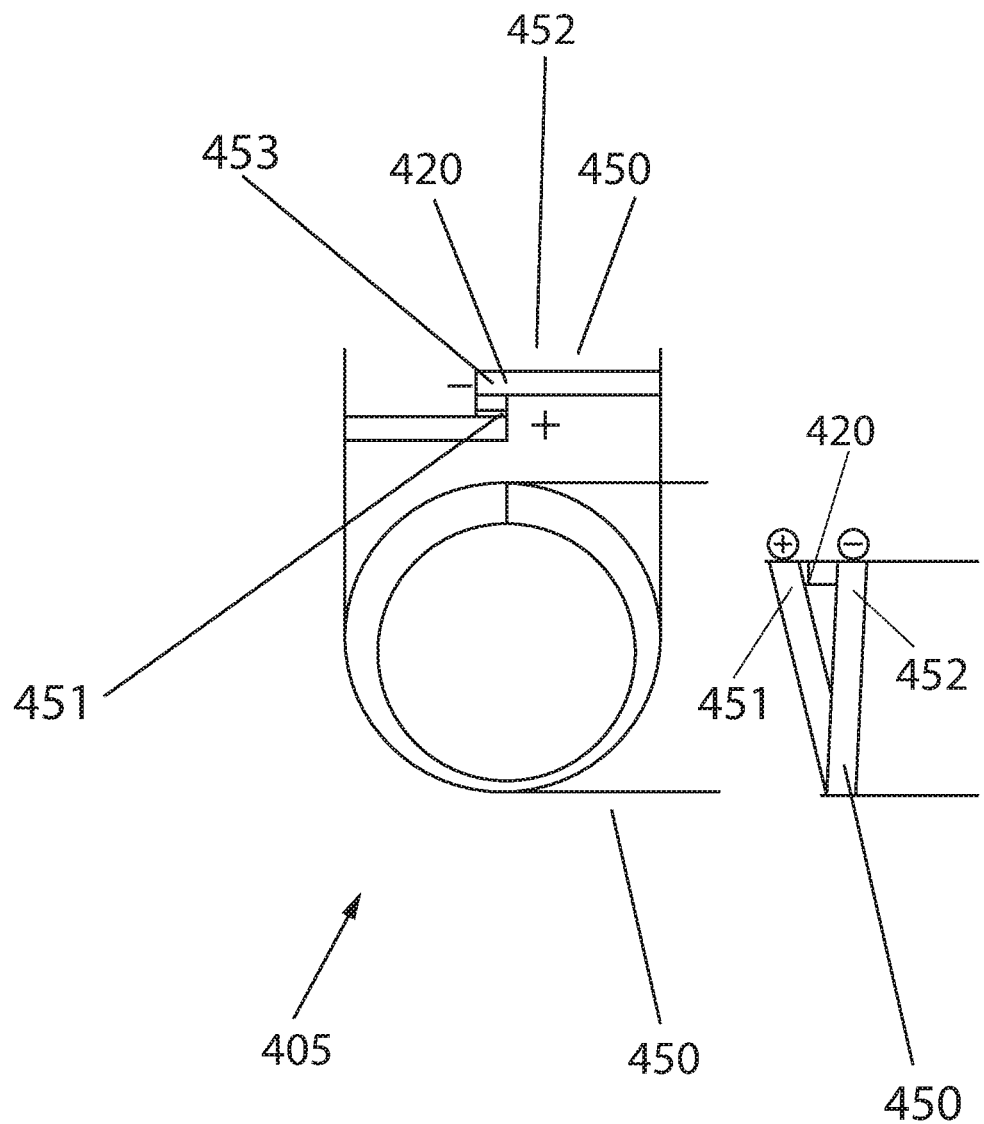
Figure 41:
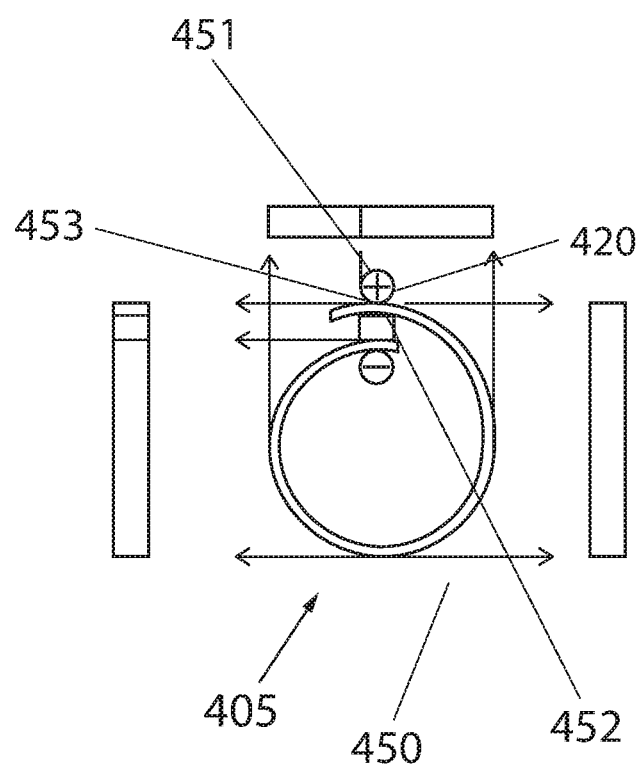
Figure 42:
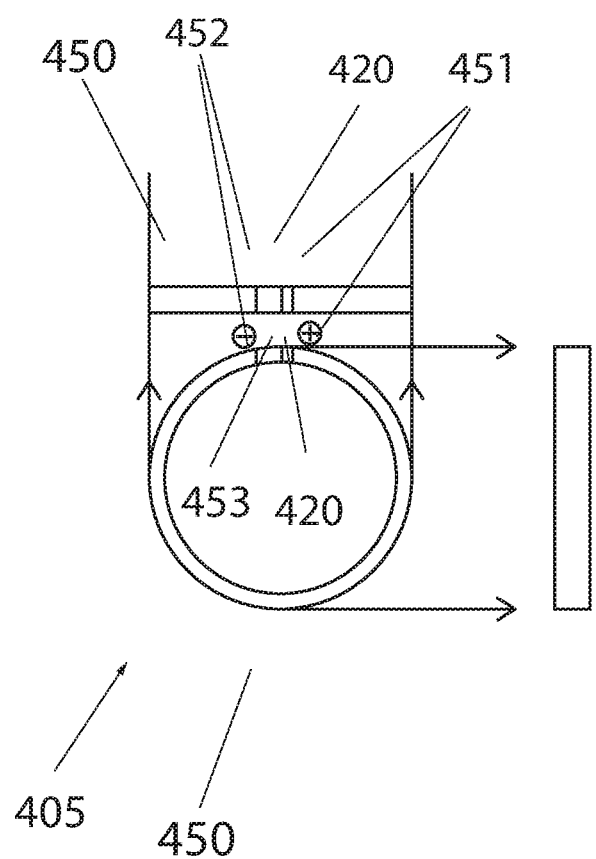
Figure 46:
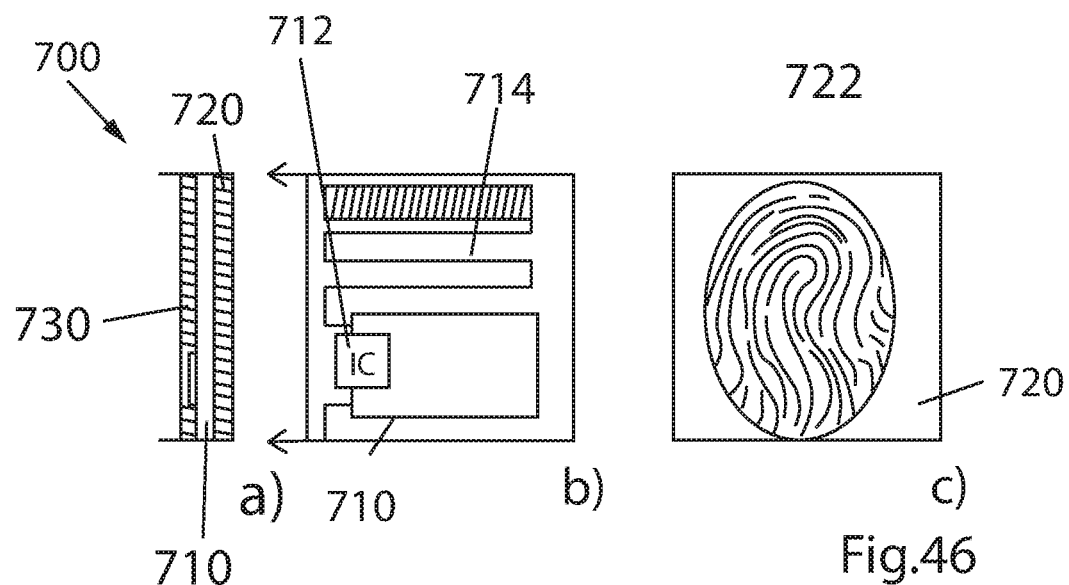
Figure 47:
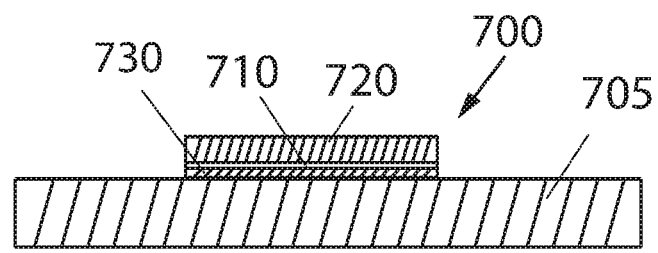
Figure 48:
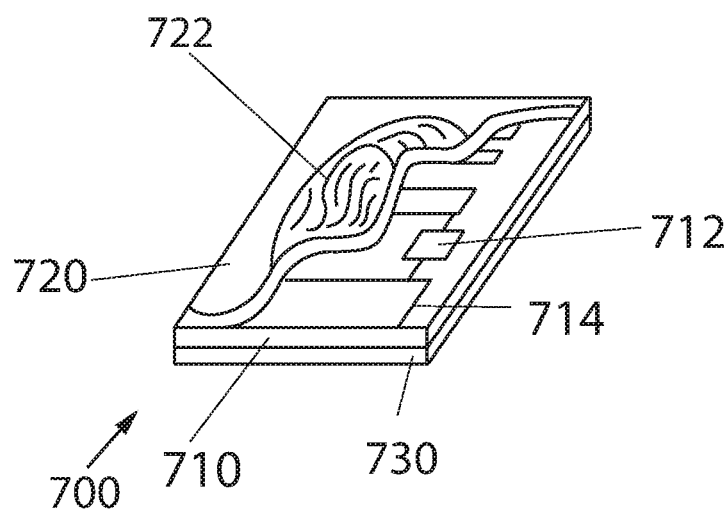

FIG. 1 shows a piece of jewelry with a clasp,
FIG. 2 shows a first element,
FIG. 3 shows a second element,
FIG. 4 shows the clasp in a side view,
FIG. 5 shows an arrangement,
FIG. 6 shows an arrangement for performing a method,
FIG. 7 shows a flow diagram,
FIG. 8 shows a setting with a user and a tablet,
FIG. 9 shows a setting with a user and a shop,
FIG. 10 shows a second element, and
FIG. 11 shows a second element,
FIG. 12 to FIG. 16 show a diagram of several processes, and
FIG. 17 shows a diagram of a payment process,
FIG. 18 shows a clasp and a chain element,
FIG. 19 shows a clasp and a chain element,
FIG. 20 shows a clasp and a chain element,
FIG. 21 shows a clasp and a chain element,
FIG. 22 shows a chain element and a connection element,
FIG. 23 shows a chain element,
FIG. 24 shows an interior of a chain element,
FIG. 25 shows a package and a coordinate system,
FIG. 26 shows an interior of a package,
FIG. 27 shows a part of a ring,
FIG. 28 shows a part of an alternative ring,
FIG. 29 shows a part of an alternative ring,
FIG. 30 shows an insert for a ring,
FIG. 31 shows an RFID arrangement,
FIG. 32 shows the RFID arrangement of FIG. 31 in a top view,
FIG. 33 shows an RFID arrangement,
FIG. 34 shows an RFID arrangement,
FIG. 35 shows an RFID arrangement,
FIG. 36 shows a piece of jewelry,
FIG. 37 shows a piece of jewelry,
FIG. 38 shows a piece of jewelry,
FIG. 39 shows a piece of jewelry,
FIG. 40 shows a piece of jewelry,
FIG. 41 shows a piece of jewelry,
FIG. 42 shows a piece of jewelry,
FIG. 43 shows a frame of a buckle,
FIG. 44 shows a buckle,
FIG. 45 shows the buckle of FIG. 44 in a different view,
FIG. 46 shows an RFID arrangement in different views,
FIG. 47 shows an RFID arrangement being secured on an item, and
FIG. 48 shows an RFID arrangement in a sectional view.

FIG. 1 shows a piece of jewelry 1 according to an embodiment. The piece of jewelry 1 comprises a chain 2 and a clasp 5 according to an embodiment.

The clasp 5 comprises a first element 10 which is further shown in FIG. 2 and a second element 20 which is further shown in FIG. 3. Both elements 10, 20 each comprise a respective magnetic element so as to attract each other in the position shown in FIG. 1. These magnetic elements will be further described below.

The first element 10 comprises a main part 12, from which a protrusion 14 protrudes. The protrusion 14 has a cylindrical shape.

In addition, an arm 16 is secured to the main part 12. The arm 16 has a loop 18 with a hole 19 for securing the chain 2.

In detail, the first element 10 comprises a first magnetic element 15 that has a cylindrical shape and is made of a material like neodymium so as to be a permanent magnet. The first magnetic element 15 is secured in the main part 12 of the first element 10 and protrudes over the main part 12, so that it automatically forms the protrusion 14.

The second element 20 has a main part 22. In the main part 22, a clearance 24 is formed. The clearance 24 has a cylindrical shape. The aforementioned clearance 24 mates the protrusion 14, so that the elements 10, 20 may be put together such that the protrusion 14 is received in the clearance 24.

A second magnetic element 25 is positioned at the bottom of the clearance 24. Also, the second magnetic element 25 is made of a material like neodymium so as to be a permanent magnet.

The magnetic fields generated by the magnetic elements 15, 25 are such that they help to bring the first element 10 and the second element 20 in the correct orientation relative to each other when closing the clasp 5.

The second element 20 has a wall 21 encompassing a segment of a cylinder. When the first element 10 is in contact with the second element 20, this wall 21 partially surrounds the first element 10. This prevents an inadvertent contact with the first element 10 that could possibly disengage the first element 10 from the second element 20.

The second element 20 also has a loop 28 with a hole 29 for securing the chain 2.

The second element 20 has a gap 26 formed between the main part 22 and a cantilever 23. The cantilever 23 protrudes from the wall 21 and has a retaining element 27 at its free end.

The retaining element 27 is embodied as a sphere. Thus, it provides smooth surfaces in all directions downwards from the cantilever 23.

To secure the first element 10 to the second element 20 from a state in which both elements 10, 20 are separate from each other, the first element 10 can at first be inserted such that its protrusion 14 is received by the clearance 24. The arm 16 is positioned between the wall 21 and the cantilever 23 on the front side as shown in FIG. 3. Especially, it does not yet engage the gap 26.

If the first element 10 is in a correct position relative to the second element 20, the two magnetic element 15, 25 provide for an attractive force between the elements 10, so as to help the user during closing the clasp 5. If the position is incorrect, for example if the first element 10 is positioned at a bottom side of the second element 20, a guiding force is generated that helps the user to reach the correct relative position.

After the protrusion 14 has been received by the clearance 24, the first element 10 may be rotated relative to the second element 20 such that the arm 16 passes the retaining element 27 under slight resilient deformation of the cantilever 23.

After this operation, the arm 16 engages the gap 26. This corresponds to a closed state.

In order to release the first element 10 from the second element 20, the first element may be rotated in the opposite direction under slight resilient deformation of the cantilever 23. Then, the arm 16 is again out of engagement with the gap 26 and the first element 10 can be separated from the second element 20.

FIG. 4 shows the clasp 5 in a side view in a closed state. The gap 26 that has already been described is clearly visible in this figure.

As shown, the arm 16 protrudes through the gap 26 and is secured in the gap 26 by the retaining element 27. This prevents an inadvertent release of the first element 10 from the second element 20.

If the arm 16 is turned to the left, it may slightly bend the cantilever 23 upwardly and may then be brought into a state in which the two elements 10, 20 can be released from each other. When bending the cantilever 23, it is of advantage that the retaining element 27 is embodied as a sphere, because the cantilever 23 can be smoothly bent resiliently upwards by the moving arm 16. The user will sense a certain resistance due to the retaining element 27. However, she will be able to overcome this resistance using human muscular force. As long as the clasp 5 should remain in a closed state, this resistance secures this closed state and prevents inadvertent release.

The first element 10 may be fabricated by taking a main part 12 having a cylindrical shape and processing it so as to form a cylindrical disc-shaped clearance. The first magnetic element 15 may be inserted into this clearance such that it protrudes out of the clearance, automatically forming the protrusion 14 due to its cylindrical shape.

The arm 16 can be secured to the main part 12 using techniques like soldering or welding.

The second element 20 may be fabricated by taking a main part 22 having a cylindrical shape and processing it so as to form the clearance 24 also with a cylindrical shape. The second magnetic element 25 may be inserted into the clearance 24. The second magnetic element 25 may partially fill the clearance 24, but leave an upper part of the clearance 24 so as to receive the protrusion 14 of the first element 10. The wall 21 may be processed separately such that it already comprises the cantilever 23. The retaining element 27 in the form of a sphere may be formed at the end of the cantilever 23. The wall 21 may then be secured to the main part 22 using techniques like soldering or welding. The loop 28 may also be secured by soldering or welding.

After fabrication of the first element 10 and the second element 20, the chain 2 may be attached to the loops 18, 28 in order to form the piece of jewelry 1, for example a necklace or bracelet.

FIG. 5 shows an arrangement 100 with which a method can be performed.

The arrangement comprises a network 106 with which several entities can communicate with each other. The network 106 may especially be the internet.

The arrangement 100 comprises several readout devices 108. These readout devices 108 may read out an identification number of an RFID tag. The RFID tag may be part of a wearable or handheld device, for example as described elsewhere herein.

The network 106 may communicate with a server 102 providing access to a database 104. The database 104 hosts data. The server 102 may read out data and store data and may further perform some operations like comparing data in order to determine if a user is authorized or not.

The readout devices 108 can thus be distributed worldwide and can access the database 104. The server 102 and the database 104 together may be denoted as a cloud storage system.

FIG. 6 shows an arrangement 200 for performing a method.

Several record-keeping units 202, 204, 206 are shown, which may be part of a database like the database 104 shown in FIG. 5. Each record-keeping unit 202, 204, 206 may be controlled by a respective processor 210, 212, 214, each processor 210, 212, 214 communicating with a communications component 216. The communications component 216 may communicate with a processing unit 218, which may communicate with several RFID readers 220, 222, 224. The RFID readers 220, 222, 224 can readout data, for example an identification number, from an RFID tag being part of a wearable or handheld device.

Thus, data can be exchanged between the record-keeping units 202, 204, 206 and the RFID readers 220, 222, 224, for example in order to use an identification number stored in an RFID tag in order to identify a user and in order to retrieve user-related data stored in the record-keeping units 202, 204, 206.

FIG. 7 shows a flow diagram of a possible method 300. The method 300 may be performed by a cloud storage device, especially as shown in FIG. 5.

The method 300 starts with receiving a tagging entry at step 302. The tagging entry is stored in a database in a step 304. Then location data is received in a step 306.

If it is determined in a step 308 that location data corresponds to the tagging entry, a further step 310 is performed in order to communication location data to an external entity. This location data can especially be used in order to verify an identity of a user.

FIG. 8 shows a user 30. The user 30 wears a wearable device 40 or handheld device. The wearable device 40 comprises an RFID tag on which an identification number is written. The RFID tag is a passive RFID tag that can be read out using specific radio waves.

The user 30 is, for example, sitting in a restaurant and wants to pay. For that purpose, the restaurant provides a tablet 50. The tablet 50 comprises an RFID reader 55 and a wireless communication device 57, which can also be denoted as an interface device.

The RFID reader 55 is able to read out the RFID tag of the wearable device 40. The wireless communication device 57 is able to connect to a wireless network in order to connect to the internet.

When the user wants to pay, he first brings his wearable device 40, which can also be regarded as a handheld device, in proximity to the RFID reader 55. The identification number stored in the RFID tag is read out and further processed by the tablet 50.

As payment information is required, additional security measures are implemented to ensure that only the owner of the wearable device 40 is able to perform a payment process.

The user is requested to select one of four kinds of security information:
FP: Fingerprint
FR: Face Recognition
VR: Voice Recording
PIN: PIN number In the state shown in FIG. 8, the user may select one of the four alternatives. Afterwards, security information according to the selection is obtained. If fingerprint is selected, the user has to put his finger on a specific reader and the fingerprint is collected. If face recognition is selected, a picture is made from a face of the user. If voice recording is selected, a short speech of the user is recorded. If PIN number is selected, the user has to input a code.

The identification number together with the security information and a content of a variable defining the type "payment information" is transmitted in a request using the wireless communication device 57 to a cloud storage system. The cloud storage system is accessible using a standard internet connection.

The cloud storage receives the request, identifies the user using the identification number and verifies his identity using the security information. The security information is compared with stored reference information. If the user is verified, payment information is transmitted to the tablet 50, including credit card information, for example. This payment information is then used in order to perform a payment process.

The same or a similar payment process may also be used at an ATM or other machine for retrieving money. It allows a user to desist from using a credit card or other payment means.

FIG. 9 shows a different setting. A user 30 wearing a wearable device 40 with an RFID tag stands in front of a store 60 having a readout device 65. If the user 30 enters the store 60, he holds his wearable device 40 near the readout device 65. The readout device 65 reads the identification number out of the RFID tag and sends a request comprising this identification number and a content of a variable having the type "personal preference information" to the cloud storage system. The cloud storage system sends preference information back. This information is presented on a screen to the shop owner immediately when the user 30 enters the store 60.

Thus, the shop owner or shop employee knows about the user's preferences, for example colors or materials, and thus can decide which products to offer.

In an alternative implementation, a restaurant can apply the implementation instead of a shop 60. The restaurant thus may know about personal preferences of the user 30. For example, the restaurant can be informed if the user likes big macs or cheeseburgers. For example, the restaurant can also be informed about food allergies or religious exclusions of specific food.

In an additional or alternative implementation, the RFID tag of the wearable device may be used for inventory control before selling the wearable device. For example, a company may write an inventory control number in the RFID tag and may read it out each time an inventory should be controlled. Especially, each wearable device may be tracked prior to sale. During or after sale, the inventory control number can be replaced by the identification number, or the inventory control number can be used as the identification number.

When the identification number is processed in a cloud storage and/or blockchain system, the cloud storage and/or blockchain system may identify if the identification number corresponds to a stored reference. If no reference should be found, the wearable device from which the identification number was read out may be identified as potentially being subject to forgery.

The cloud storage system may also store indications that a wearable device has been stolen. If the cloud storage system finds out that a dataset corresponding to an identification number indicates that the wearable device having this identification number has been stolen, it may, for example, deactivate further use of this identification number and/or inform a police or owner using predetermined contact data.

The identification number may also be used in order to provide an electronic invoice to a customer. For example, an electronic invoice can be stored with relation to an identification number, and when the identification number is read out the electronic invoice may be provided, for example to a predefined e-mail address.

The identification number may also be used in order to provide an electronic warranty card to a customer. For example, an electronic warranty card can be stored with relation to an identification number and when the identification number is read out the electronic warranty card may be provided, for example to a predefined e-mail address.

The identification number may also be used in order to provide an electronic product information to a customer. For example, an electronic product information can be stored with relation to an identification number, and when the identification number is read out the electronic product information may be provided, for example to a predefined e-mail address.

FIG. 10 shows a second element 20 as a part of a clasp 5 being a wearable device that can be used for identification purposes. The second element 20 houses an RFID tag 70. The RFID tag 70 has, in the shown embodiment, a cuboid shape and a cross section with outer dimensions of approximately 2 mm×2 mm.

FIG. 11 shows a second element 20 with an RFID tag 70 according to a different implementation. In this implementation, an antenna 75 is provided as a part of the RFID tag 70.

It should be noted that even if some features or method steps have been disclosed in combination, a person skilled in the art will recognize that they can also be used or performed separately and can be combined with other features or method steps disclosed herein, regardless of whether they have been disclosed separately or together with other features or method steps.

FIGS. 12 to 16 show a diagram showing different aspects of a use of an RFID device and especially of a clasp system. Connections between the figures are shown in rectangular surroundings.

Figure 12:
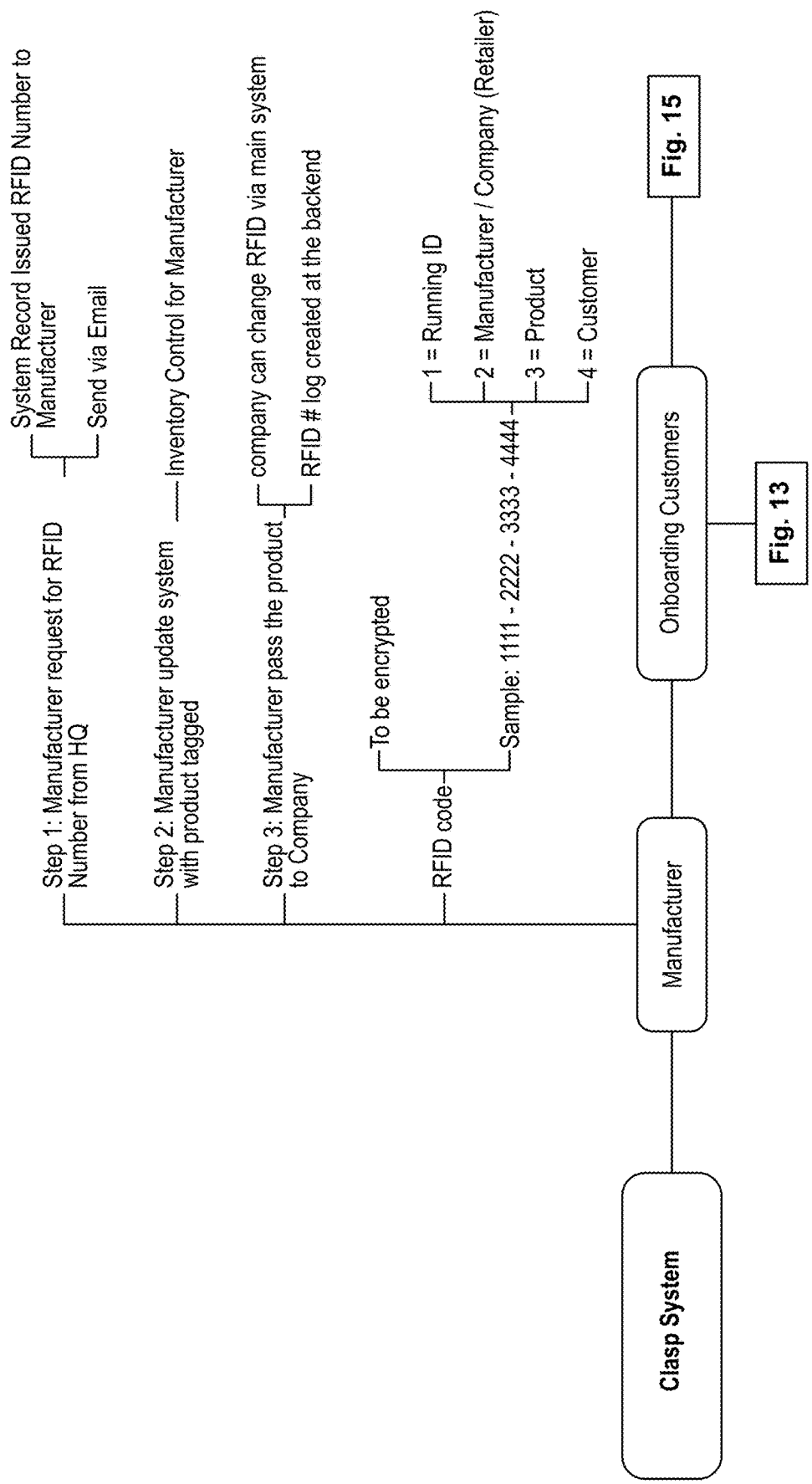

In FIG. 12, steps that may be performed by a manufacturer are shown. In step 1, a manufacturer may request for an RFID number from HQ, wherein HQ is a central software system, commonly operated as a cloud storage system. The system may record an RFID number that has been issued to a manufacturer. Especially, the RFID number may be sent via e-mail.

In step 2, the manufacturer may update a system with a product tag. This may especially be used for inventory control by the manufacturer. Thus, the manufacturer has always a control regarding his inventory of clasps.

In step 3, the manufacturer may pass the product to a company. The company can change the RFID or the content of the RFID via the main system, which may especially be the HQ. The RFID lock may be created at a backend.

In a further step, an RFID code may be encrypted. This can prevent an unauthorized readout.

For example, a 16 number RFID code can be used, wherein the example 1111-2222-3333-4444 is shown in FIG. 12. The first four digits may indicate a running ID. This can be used in order to identify a specific clasp. The fifth to eighth digits can be used in order to identify a manufacturer, a company, or a retailer. The ninth to twelfth digits may be used in order to identify a product. The last four digits may be used in order to identify a customer.

After steps performed by the manufacturer, further steps may be performed by a retailer having onboarding customers, or by customers themselves. This is shown in FIGS. 13 and 14.

In step 1, an admin may be registered on a system based on the number stored in the RFID tag. The tag may especially be present in a jewel, an accessory, or a watch (together abbreviated as JAW). A product description may be registered at the system. An inventory or other stock management system may be updated.

In step 2, a customer may register upon purchase. An admin may register customer details via the system. The tag has an RFID and is typically inserted in a JAW product. In step 2.1, the customer may be required to present an ID card and/or a passport, wherein such identification means can be used regardless of the specific country in which the customer resides.

In step 2.2, security measures are implemented. They may be called 4FA, because four types of security measures may be implemented, as has been described elsewhere herein.

In step 2.3, a customer personal ID number may be generated. In step 2.4, the RFID may be rewritten with the personal ID number. The personal ID number may especially be used as identification number as described elsewhere herein. In step 2.5, the personal ID may be encrypted. In step 2.6, a warranty card may be tagged to the product, an electronic invoice may be tagged to the product, and a portfolio or collection may be added.

In step 3, the customer may download a corresponding clasp mobile app. Personal details may be filled in, for example a medical report, which may be secured with security measures according to a level 2 information. Thus, readout of medical data by unauthorized persons may be prevented. Records of JAW and RFID may be shown in order to generate a purchase portfolio. In addition, payment details may be saved, wherein such payment details are optional features. The 4FA security features may be applied by the admin via the system. Especially, facial recognition, voice recognition, a pin code and/or fingerprint may be used for increased security. A customer can import a company profile with image and YouTube link. This can increase information about the customer so that he may be identified and he may present himself with his corporate profile. The customer profile may also include hobbies, as such hobbies can, for example, be used in order to start a conversation with someone else having the same hobbies, even if the customer did not know the person before. The customer can select what he is looking for, for example by entering details such as product categories, color, and materials. This can even be done without a product catalog. The customer can input personal details such as food allergies, favorite drinks, or health record, which can, for example, be used in a restaurant in order to allow a waiter to know which food or drinks to offer.

A loss or theft of the clasp may be reported. In step 1, the customer may log in the mobile app. He may select his lost JAW product in step 2. In step 3, he may report the loss or theft. In step 4, providers can be notified. In step 5, the customer can be notified via mobile app when the item was found by the admin or by any other person. For example, police or dealers may be informed about the lost or stolen item so that they can report it to the system when a product with a specific identity read out from the RFID tag was found.

The clasp may be used for a meet and greet functionality. This is shown in FIGS. 15 and 16.

In step 1, a customer may allow a meet and greet function, for example via the already mentioned mobile app. People meet and greet, shop meet and greet, and dining meet and greet can be allowed or disallowed separately.

In step 2, an organizer of an event or another person may activate an organizer app. This may allow customers to scan their RFID. In addition, a QR code may be scanned via the mobile app, so that a profile may be loaded. A tag with an event ID, which can be valid until an event end time, may be generated in order to identify a specific event.

In step 3, a customer may check in, for example in a shop, retrieving "meet and greet" information and can notify an admin via the system about a customer arrival. The admin can view a profile and preferences of the customer. People in a shop may be notified. A public profile may be used in order to connect. A user can send greetings via text, virtual name cards, and voice. A user can choose to follow a friend and will receive notifications if the friend is in the same shop or shopping mall.

In step 4, a kiosk can be provided for customer quick view. The RFID may be scanned, and/or a QR-code may be scanned via the mobile app. The availabilities of the items in a wish list of the customer may be viewed.

Especially, there may be three types of meet and greet. A first type may be at a conference or other event. The second type may be in a shop. The third type may be while dining, especially in a restaurant. There may be provided an additional user interface, for example for a shop attendee and/or for a dining attendee, to record data of a customer such as favorite drinks and foods, to store purchase records, and in order to use a tablet app. The tablet app can, for example, be provided to a customer in order to perform identification and/or payment functions.

A possible payment process is shown in FIG. 17. In step 1, the customer may allow the RFID payment mode via a mobile application. The customer may input payment details. The customer may especially be required to do a verification with an admin. For example, a personal ID or a passport may be used for such verification.

In step 2, the RFID or QR-code may be scanned via the mobile app on an admin system. The admin may input a shopping cart, for example a bill of a restaurant in which the user was dining. The admin may start the payment process. The customer can verify, for example via two security features using the admin device. For example, facial recognition and expression recognition may be used. Alternatively, or additionally, voice recognition with tonality recognition may be used. Alternatively, or additionally, a fingerprint may be scanned and used for safety purposes. Alternatively, or additionally, a pin-code can be used. The mode of payment may be decided upon registration. For example, a price level can be used in order to decide on the mode, or in order to exclude some modes. For example, if a price to be paid is above a certain limit, some less secure payment modes may be deactivated.

In step 3, the payment may be completed. Thus, the customer can use his JAW product, for example a clasp, with an RFID tag for payment. Respective information may be kept as records in the system.

FIG. 18 shows a clasp besides a chain element connected to the second element 20 of the clasp, the chain element having an RFID tag 70 and an antenna 75.

FIG. 19 shows a clasp 5 connected to a chain element 80. The chain element 80 is also connected to the second element 20 and comprises a package 90, the package 90 comprising an RFID tag as described further below.

FIG. 20 shows the clasp 5 and the chain element 80 of FIG. 19 in a different view.

FIG. 21 shows a clasp 5 and a chain element 80 similar to the embodiment of FIGS. 19 and 20, but with the chain element 80 connected with a ring 82 to the first element of the clasp 5. At the opposite side, there is another ring 82 for connection with the rest of the chain.

FIG. 22 shows a chain connector 6 besides a chain element 80 having a package 90.

FIG. 23 shows a chain element 80, which can be regarded as an RFID arrangement, with a package 90. The chain element 80 comprises two rings 82 for connection with other elements of a chain. The package comprises an RFID tag 70, as is shown in FIG. 24. The RFID tag 70 is connected to a loop antenna 76 using a first contact 71 and a second contact 72 of the RFID tag. Thus, the package 90 comprises both the RFID tag 70 and a corresponding loop antenna 76 for communication.

FIG. 25 shows a package 90 separately with a coordinate system showing three axes x, y, and z. Assuming that the loop antenna 76 is arranged in the x-z-plane, it has proven to be of advantage with regard to readout of the RFID tag 70 if the loop antenna 76 is at a front or backward surface not being covered by the material of the chain element 80 shown in FIG. 23, or at the top surface.

FIG. 26 *a*) shows a bottom view of a package 90 with the RFID tag 70 comprises in it. FIG. 26 *b*) shows a corresponding top view, wherein the two contacts 71, 72 of the RFID tag 70 can be seen. That means that in contrast to the previously described embodiments, this embodiment does not contain a loop antenna. Rather, material of the package 90 has been removed in order to remove the loop antenna and in order to get direct access to the contacts 71, 72. They can be connected to other elements that can serve as an antenna, as will be explained further below.

FIG. 27 shows a part of a ring 95 comprising an RFID tag 70 with its first contact 71 and its second contact 72. The first contact 71 is connected to one part of the ring 95 using a conductive strip 73. The second contact 72 is connected to another part of the ring 95 using a pad 77 and contact glue 78. Thus, the ring 95 can serve as an antenna for the RFID tag 70.

FIG. 28 shows a similar version with slightly different dimensions.

FIG. 29 shows a different embodiment with the second contact 72 not being permanently connected to the ring 95. This is shown in the left picture of FIG. 29. Thus, in this state, there is a gap between the second contact 72 and a face 96 of the ring 95 being immediately opposite to the second contact 72. If a force F is applied on the ring 95, the face 96 of the ring 95 can be brought in contact with the second contact 72. Thus, only when the force F is applied, the ring 95 works as antenna. This implementation can be used to control access to data stored on the RFID tag 70.

FIG. 30 shows an RFID tag 70 with its first contact 71 being connected to a first conductive stripe 96 and its second contact 72 being connected to a second conductive stripe 97. Thus, the RFID tag 70 is part of an RFID arrangement that can be used as a part of a piece of jewelry, for example a ring 95. The conductive stripes 96, 97 can be used to connect the RFID tag 70 with the ring 95, so that the ring 95 can be used as an antenna.

FIG. 31 shows an RFID arrangement 400 according to an embodiment. The RFID arrangement 400 comprises a housing 410, which is embodied as a hollow cylinder with a bottom. FIG. 32 shows a top view on the RFID arrangement 400.

Inside the RFID arrangement 400, there is positioned an RFID tag 420. The RFID tag 420 comprises a first contact 421 and a second contact 422. These are contacts for contacting an antenna, so that the RFID tag 420 can be read out. Typically, it is a passive RFID tag.

The first contact 421 is electrically connected to the housing 410. The housing 410 is made of electrically conducting material, especially metal, and can thus serve as an antenna for the RFID tag 420. The second contact 422 is electrically connected to a dummy electrode 430. The dummy electrode 430 is positioned at the upper part of the RFID tag 400 and serves as a reference for the antenna. The dummy electrode 430 substantially closes an upper opening of the housing 410, disregarding a slot 432.

FIG. 33 shows an RFID arrangement 400 according to another embodiment. The RFID arrangement 400 comprises a socket 415, which is adapted to receive a gemstone 500. An RFID tag 420 is positioned at the lower part of the socket 415, and contacts 421, 422 of the RFID tag 420 are electrically connected to the socket 415. The socket 415 thus serves as an antenna for the RFID tag 420. The socket 415 is partially open at its side, so that a substantial part of the gemstone 500 is visible.

FIG. 34 shows an RFID arrangement 400 with a socket 415 according to another embodiment. Left in FIG. 34, there is shown a bottom view. In the center of FIG. 34, there is shown a top view. In the right of FIG. 34, there is shown a side view.

The socket 415 comprises a bottom plate 440, on which a bar 444 with an integrated RFID tag 420 is positioned. Contacts of the RFID tag 420 are connected to the bar 444, and the bar 444 is connected to the bottom plate 440 using a side wall 442. Thus, the socket 415 forms an antenna for the RFID tag 420.

FIG. 35 shows an RFID arrangement 400 with a socket 415 according to another embodiment. In contrast to the embodiment shown in FIG. 34, the embodiment shown in FIG. 35 does not have a circular shape, but a shape of a rectangle with flattened edges. This is shown in the bottom view left in FIG. 35. As shown in the center of FIG. 35, the RFID tag 420 is also positioned in a bar 444. As shown in the right of FIG. 35, the RFID tag 420 is positioned at a side of the socket 415, and its contacts are connected to a side wall 442. Thus, the socket 415 also works as an antenna for the RFID tag 420.

FIG. 36 shows a piece of jewelry 405 according to an embodiment. The piece of jewelry 405 comprises a body 450, which is embodied as a ring. The ring has a thickness differing with the position around its circumference. It carries a gemstone 500 at its thick part. A bottom view is shown in the lower part of FIG. 36.

At one position around its circumference, there is a slot 455 in the body 450. An RFID tag 420 is positioned in the center of the slot 455, so that it is connected at both sides of the slot 455 to the body 450. The slot 455 has a minimum length of 1 cm. Thus, the electrically conducting material of the body 450 which is around the slot 455 serves as an antenna for the RFID tag 420.

FIG. 37 shows a piece of jewelry 405 according to another embodiment. The body 450 is a ring with a constant thickness. At one position around its circumference, there is an RFID tag 420, which is embedded into the body 450. It has a first contact 421 and a second contact 422. The first contact 421 is connected to the body 450, so that the body 450 works as a half-loop antenna for the RFID tag 420. The second contact 422 is not connected to the body 450 in the shown embodiment.

FIG. 38 shows a piece of jewelry 405 according to another embodiment. The body 450 of this piece of jewelry 405 comprises a first ring 460 and a second ring 465. The rings 460, 465 are connected to each other at the lower part shown in FIG. 38. They have different diameters, wherein the second ring 465 has a larger diameter compared to the first ring 460. The rings 460, 465 are arranged in one plane. An RFID tag 420 is positioned between the rings 460, 465 at an upper part of FIG. 38. The contacts of the RFID tag 420 are electrically connected to the first ring 460 and the second ring 465, respectively. Thus, the rings 460, 465 form an antenna for the RFID tag 420. Current can flow between the rings 460, 465 at the lower part in FIG. 38, where the two rings 460, 465 are connected. One can say that the first ring 460 is positioned inside the second ring 465.

FIG. 39 shows a piece of jewelry 405 according to another embodiment. The body 450 comprises a first ring 460 and a second ring 465, which are oriented in different, parallel planes. At one position along the circumference of the body 450, there is arranged an RFID tag 420, with its respective contacts each being connected to one of the rings 460, 465. At the opposite side, there is a connecting rod 425 between the two rings 460, 465. Thus, the two rings 460, 465 serve as an antenna for the RFID tag 420.

The lower left part of FIG. 39 shows a side view, wherein the upper part shows a top view and the right part shows a perpendicular side view.

FIG. 40 shows a piece of jewelry 405 according to a further embodiment. The body 450 of the piece of jewelry 405 is embodied as a ring. The ring has a discontinuity 453, defining a first end 451 and a second end 452 of the body 450. Between the first end 451 and the second end 452, there is an RFID tag 420. Its contacts are connected to the ends 451, 452. The body 450 is thus a ring with the mentioned discontinuity, which is shown in the upper part of FIG. 40 and also in the right part of FIG. 40, which is a side view perpendicular to the other side view shown left downwards in FIG. 40. With such a configuration, the body 450 can serve as an antenna for the RFID tag 420. The ring is not a ring in a very strict mathematical sense, because it does not lie in one plane.

In the embodiment shown in FIG. 40, an imaginary line between the first contact and the second contact of the RFID tag 420 is oriented at least approximately perpendicular to a plane of the ring. A plane of the ring can especially be regarded as a plane from which the ring emerges in both directions perpendicular to the plane by the same amount. The imaginary line between the first contact and the second contact is also oriented parallel to a central axis of the ring. This central axis is perpendicular to the plane of FIG. 40.

FIG. 41 shows a piece of jewelry 405 according to a further embodiment. Also in this embodiment, the body 450 is embodied as a ring with a discontinuity 453, defining a first end 451 and a second end 452. An RFID tag 420 is positioned and fastened between the ends 451, 452. An imaginary line between the contacts of the RFID tag 420 is oriented in the plane of FIG. 41, and perpendicular to a central axis of the body 450. The body 450 does not emerge in a direction perpendicular to a plane as in FIG. 40, but lies in one single plane. Also in this case, the body 450 forms an antenna for the RFID tag 420.

FIG. 42 shows a piece of jewelry 405, wherein the body 450 is embodied as a ring arranged in one plane. It also has a discontinuity 453 with a first end 451 and a second end 452. The discontinuity 453 in the embodiment of FIG. 42 is a discontinuity in an otherwise standard ring, without bending of the ring out of its usual ring structure. The discontinuity 453 is filled by an RFID tag 420, having its contacts connected to the ends 451, 452. Thus, the RFID tag 420 can use the body 450 as an antenna. It fills the discontinuity 453.

FIG. 43 shows a frame 610 of a buckle 600 according to an embodiment. The frame 610 comprises a recess 615 for receiving a prong, as shown in FIGS. 44 and 45. In the recess 615, there is positioned an RFID tag 420, wherein one contact of the RFID tag 420 is contacted to the frame 610. The frame 610 is comprised of electrically conducting material, especially metal, and can thus serve as an antenna for the RFID tag 420.

FIG. 44 shows a buckle 600 with the frame 610 already shown in FIG. 43 and a prong 620, which is swivel-mounted with respect to the frame 610. A bracelet 630 is connected to the frame 610, so that an element like a watch or a gemstone can be secured to a user's arm.

In FIG. 45, it is shown that the prong 620 can be in states in which it is not in contact with the RFID tag 420. In the state shown in FIG. 45, the frame 610 and the buckle 620 do not serve as an antenna for the RFID tag 420. If the prong 620 is in contact with the RFID tag 420, as shown for example in FIG. 44, the frame 610 and the prong 620 serve as an antenna for the RFID tag 420, so that the RFID tag 420 can be read out.

FIG. 46 shows an RFID arrangement 700 in different views.

FIG. 46a shows a side view, in which it can be seen that the RFID arrangement 700 comprises a solid layer 710, which is interposed between a glue layer 730 and a cover layer 720. The glue layer 730 can be used in order to attach the RFID arrangement 700 on another item, for example on a mobile phone. Thus, the RFID arrangement 700 can be used in order to provide a secure and permanent provision of information or identification. The cover layer 720 is made of a plastic material in order to protect the RFID arrangement 700.

FIG. 46b shows a top view on the solid layer 710. There it is shown that on the solid layer 710 there is arranged an RFID tag 712, which is named IC. The RFID tag 712 can be used in order to store information or identification for readout by radiofrequency waves. There is also an antenna 714 arranged on the solid layer 710. The antenna 714 is used in order to receive and modify radiofrequency waves, which are typically sent by a sending device for reading out the RFID tag 712.

FIG. 46c shows a top view on the RFID arrangement 700. There it is shown that on the cover layer 712 there is positioned an outside structure 722, which indicates a human fingerprint. This is an indication that a user may put his fingertip on the cover layer 720 in order to activate readout.

FIG. 47 shows the RFID arrangement 700, which is mounted on an item 705. For example, the item 705 may be the backside of a mobile phone.

FIG. 48 shows the RFID arrangement 700 in a sectional view. The cover layer 720 is partially removed, so that the antenna 714 and the RFID tag 712 being positioned on the solid layer 710 are visible.

The functionality of the RFID tag 712 is designed such that in normal situations it is not possible to read out information stored in the RFID tag 712, because radiofrequency waves that could be used for readout propagate through the RFID arrangement 700, for example further in the item 705. Only in case a fingertip is placed on the cover layer 720, the propagation of radiofrequency waves is modified such that the radiofrequency waves propagate through the antenna 714 into the RFID tag 712 and are modified. This modification can be sensed by a suitable readout device. This can be used in order to retrieve information stored in the RFID tag 712.

It should be noted that this application contains a plurality of interdependencies and exchangeable items. Especially, a piece of jewelry can in generally be embodied according to one of the implementations as described herein, as long as this is technically appropriate. An RFID tag can generally be embodied into a piece of jewelry. Implementations disclosed with respect to different embodiments or inventive aspects can be combined.

In general, throughout the present application, any element that can form an antenna, for example a loop antenna, a housing, a socket, a bracket, a tag holder, a body, a housing, a protective covering device, a ring, a device for forming a substantial part, a prong, an outer structure, or a fastening device, can fully or partly be made of an electrically conductive material. For example, a metal such as copper, aluminum, silver, gold, or platinum can be used. Alternatively, a conductive polymer or any other conductive substance can be used. If such an element is only partly made of an electrically conductive material, the element may especially be covered by the electrically conductive material. The same statements given for an element that can form an antenna apply for any element that can be glued or soldered to another element.

In the following, certain features are provided in a structured form (see especially FIGS. 1 to 4).

These features can be combined with other features disclosed herein.

1. Clasp (5), comprising
   a first element (10), and
   a second element (20),
   wherein the first element (10) has a protrusion (14), and the second element (20) has a clearance (24) for receiving the protrusion (14) of the first element (10) such that the first element (10) is rotatable with respect to the second element (20),
   wherein the first element (10) has an arm (16), and the second element (20) has a gap (26), wherein the arm (16) engages the gap (26) when the first element (10) is rotated with respect to the second element (20) into a closed state,
   wherein the first element (10) is removable from the second element (20) when the arm (16) does not engage the gap (26).
2. Clasp (5) according to item 1,
   wherein the protrusion (14) has a circular cross section.
3. Clasp (5) according to one of the preceding items,
   wherein the clearance (24) has a circular cross section.
4. Clasp (5) according to one of the preceding items,
   wherein the clearance (24) mates the protrusion (14).
5. Clasp (5) according to one of the preceding items,
   wherein the gap (26) is defined between a cantilever (23) and a main part (22) of the second element (20).
6. Clasp (5) according to one of the preceding items,
   wherein the gap (26) has, at an end at which the arm (16) enters the gap (26) from an open state, a retaining element (27), the retaining element (27) releasably retaining the arm (16) in the gap (26).
7. Clasp (5) according to item 6,
   wherein the retaining element (27) is embodied as a sphere partially closing an entry of the gap (26).
8. Clasp (5) according to item 5 and one of items 6 or 7,
   wherein the retaining element (27) is positioned at a free end of the cantilever (23).

9. Clasp (5) according to one of the preceding items, wherein the first element (10) is not removable from the second element (20) when the arm (16) engages the gap (26).
10. Clasp (5) according to one of the preceding items, wherein the first element (10) has a first loop (18) with a first hole (19) for securing another element, and/or wherein the second element (20) has a second loop (28) with a second hole (29) for securing another element.
11. Clasp (5) according to one of the preceding items, wherein the first element (10) and/or the second element (20) comprise a magnetic element (15, 25) so as to attract each other by magnetic force.
12. Clasp (5) according to item 11, wherein the first element (10) comprises a first magnetic element (15) forming the protrusion (14).
13. Clasp (5) according to one of items 11 or 12, wherein the second element (20) comprises a second magnetic element (25) being positioned in the clearance (24).
14. Clasp (5) according to one of the preceding items, wherein the first element (10) and/or the second element (20) are fully or partly made of gold, silver, metal, or metal alloy.
15. Clasp (5) according to one of the preceding items, wherein the second element (20) has a wall (21) encompassing a segment of a circle and laterally securing the first element (10) when the protrusion (14) is received in the clearance (24).
16. Clasp (5) according to one of the preceding items, further comprising an identification tag in the first element (10), the second element (20), or between the first element (10) and the second element (20).
17. Piece of jewelry (1), especially necklace or bracelet, comprising a clasp (5) according to one of the preceding items.
18. Piece of jewelry (1) according to item 17, comprising at least one chain (2) being attached to the first element (10) and/or to the second element (20) of the clasp (5).

In the following, certain features are provided in a structured form (see especially FIGS. 5 to 22).

These features can be combined with other features disclosed herein.

1. Method for retrieving user-related data from a cloud storage system, the method comprising the following steps:
    reading out an identification number from an RFID tag,
    providing a variable, a content of the variable indicating a type of user-related data using an interface device,
    sending a request comprising the identification number and the type to the cloud storage system, especially using the interface device, and
    receiving user-related data from the cloud storage system, the user-related data especially being based on the identification number and the content of the variable.
2. Method according to item 1, wherein the content of the variable and/or the type is provided by a device performing the method.
3. Method according to one of the preceding items, wherein the content of the variable and/or the type is provided by user input.
4. Method according to one of the preceding items, wherein, when the type is out of a first group of types, only the identification number and the type are sent to the cloud storage system.
5. Method according to one of the preceding items, wherein, when the type is out of a second group of types, at least one security information is obtained and is sent in addition to the identification number and the type to the cloud storage system.
6. Method according to item 5, wherein obtaining security information comprises taking a fingerprint, and wherein the security information comprises information regarding the fingerprint.
7. Method according to one of items 5 or 6, wherein obtaining security information comprises taking a speech record, and wherein the security information comprises information regarding the speech record.
8. Method according to one of items 5 to 7, wherein obtaining security information comprises taking a picture of a face, and wherein the security information comprises information regarding the picture of a face.
9. Method according to one of items 5 to 8, wherein obtaining security information comprises inputting a code, and wherein the security information comprises information regarding the code.
10. Method according to one of the preceding items, wherein one type is ownership information; and/or wherein one type is medical information; and/or wherein one type is meet and greet information; and/or wherein one type is gantry control or entry control in events or exhibitions; and/or wherein one type is personal preference information; and/or wherein one type is payment information.
11. Method according to one of the preceding items, wherein the received user-related data is presented on a screen of a device performing the method.
12. Method according to one of the preceding items, wherein the method is performed in a mobile electronic device, a tablet, or a stationary electronic device.
13. Method according to one of the preceding items, wherein the RFID tag is a passive RFID tag.
14. Method for performing a payment process, the method comprising the following steps:
    reading out an identification number from an RFID tag secured in a wearable or handheld device,
    setting a content of a variable for defining a type of user-related data to be payment data,
    requesting security information,
    obtaining security information,
    sending a request comprising the identification number, the content of the variable and the security information to a cloud storage system,
    receiving user-related data being payment data from the cloud storage system, and
    performing the payment process using the payment data.
15. Method according to item 14, wherein the security information is a fingerprint, a voice record, a picture of a face, or a code.
16. Method according to one of items 14 or 15, further comprising a step of selecting which kind of security information should be requested.
17. Method according to item 16,
wherein the selecting is performed by user input.
18. Method according to one of items 16 or 17,
wherein selecting is performed automatically based on an amount to be paid, a location, a venue, and/or based on other information.
19. Method for providing user-related information to a person, the method comprising the following steps:
reading out an identification number from an RFID tag secured in a wearable device,
setting a content of a variable for defining a type of user-related data to be meet and greet information or personal information,
sending a request comprising the identification number and the content of the variable to the cloud storage system,
receiving user-related data from a cloud storage system, and
presenting the user-related data on a display and/or sending the user related data to another electronic device.
20. Readout device, comprising
an RFID reader being configured to read out an identification number from an RFID tag, and
an interface device being configured for
providing a content of a variable indicating a type of user-related data using an interface device,
sending a request comprising the identification number and the content of the variable to a cloud storage system, and
receiving user-related data from the cloud storage system, the user-related data preferably being based on the identification number and the content of the variable.
21. Readout device, comprising
an RFID reader and an interface device,
the readout device being configured to perform a method according to one of items 1 to 19.
22. Cloud storage system, the cloud storage system being configured to
receive a request comprising an identification number and a content of a variable indicating a type of user-related data, and
send user-related data depending on the identification number and the content of the variable.
23. Cloud storage system according to item 22,
being further configured to receive security information, to compare the security information with stored reference data, and to send user-related data only if the security information corresponds to the stored reference data.
24. Method for inventory control of a personal identification device, the method comprising the following steps:
writing an inventory control number in an RFID tag, and
tracking the personal identification device using the inventory control number.
25. Method according to item 24,
wherein the inventory control number is read out from the RFID tag each time an inventory should be determined.
26. Method for forgery control and/or theft control of a wearable device, the method comprising the following steps:
reading out an identification number from an RFID tag of the wearable or handheld device,
comparing the identification number to a reference dataset, and
indicating forgery if the identification number does not correspond to the reference dataset, or indicating theft if the reference dataset indicates that the identification number corresponds to a stolen device.
27. Method for providing an electronic invoice for a wearable or handheld device, the method comprising the following steps:
reading out an identification number from an RFID tag of the wearable device,
sending the identification number to an invoice system, and
providing an electronic invoice by the invoice system based on the identification number.
28. Method for providing an electronic warranty card for a wearable or handheld device, the method comprising the following steps:
reading out an identification number from an RFID tag of the wearable or handheld device,
sending the identification number to a warranty system, and
providing an electronic warranty card by the warranty system based on the identification number.
29. Method for providing an electronic product information for a wearable or handheld device, the method comprising the following steps:
reading out an identification number from an RFID tag of the wearable or handheld device,
sending the identification number to a product information system, and
providing an electronic product information by the product information system based on the identification number.
30. Personal identification device, comprising
a tag holder for mechanical connection with a wearable or handheld device (20), and
an RFID tag being mechanically connected with the tag holder,
wherein the RFID tag has stored, or is configured to store, an identification number.
31. Personal identification device according to item 30,
wherein the tag holder is fully or partially made of a precious metal.
32. Personal identification device according to one of items 30 or 31,
wherein the RFID tag has a round shape or any fancy shape.
33. Personal identification device according to one of items 30 to 32,
wherein the RFID tag has a diameter of at least 0.5 mm or 1 mm and/or of at most 4 mm.
34. Personal identification device according to one of items 30 to 33,
wherein the RFID tag has a diameter of 1 mm or 1.5 mm or 3 mm, or of 1 mm to 3 mm.
35. Personal identification device according to one of items 30 to 34,
wherein the tag holder forms an antenna or an antenna amplifier for the RFID tag.
36. Wearable device (20), comprising
a fastening structure for fastening the wearable device (20) to a human body, and
a personal identification device according to one of items 30 to 35.

37. Wearable device (20) according to item 36,
    wherein the wearable device (20) is a mechanical watch.
38. Wearable device (20) according to one of items 36 or 37,
    wherein the wearable device (20) is a piece of jewelry.
39. Wearable device (20) according to one of items 36 to 38,
    wherein the wearable device (20) is a clasp.
40. Wearable device (20) according to one of items 36 to 39,
    wherein the tag holder is soldered, lasered or glued in the wearable device (20).

In the following, certain features are provided in a structured form (see especially FIGS. 23 to 25).

These features can be combined with other features disclosed herein.

1. RFID arrangement, comprising
    an RFID tag,
    an antenna being electrically connected to the RFID tag, and
    a socket at least partially enclosing the RFID tag and the antenna.
2. RFID arrangement according to item 1,
    wherein the RFID arrangement is embodied as a part of a jewelry and/or a personal identification device.
3. RFID arrangement according to one of the previous items,
    wherein the RFID tag and the antenna are both comprised in one package.
4. RFID arrangement according to item 3,
    wherein the package is made of plastic material.
5. RFID arrangement according to one of the previous items,
    wherein the RFID tag is a passive RFID tag.
6. RFID arrangement according to one of the previous items,
    wherein the antenna is a loop antenna.
7. RFID arrangement according to one of the previous items,
    wherein the socket has the shape of a hollow cylinder.
8. RFID arrangement according to one of items 1 to 6,
    wherein the socket has the shape of a hollow cylinder with a bottom.
9. RFID arrangement according to one of the previous items,
    wherein the socket is open at one side.
10. RFID arrangement according to one of items 1 to 6,
    wherein the socket is embodied as a chain element.
11. RFID arrangement according to one of the previous items,
    wherein the RFID tag and the antenna are both embodied in a package having a cuboid shape.
12. RFID arrangement according to item 11,
    wherein the socket covers the package at three faces of the cuboid.
13. RFID arrangement according to one of items 11 or 12,
    wherein the socket leaves the package uncovered at three faces of the cuboid.
14. RFID arrangement according to one of items 11 to 13,
    wherein the socket covers the package at a bottom face and at two side faces of the cuboid being immediately adjacent to the bottom face and being opposite to each other.
15. RFID arrangement according to item 14,
    wherein the antenna is positioned adjacent to a top face of the cuboid being opposite to the bottom face.
16. RFID arrangement according to item 14,
    wherein the antenna is positioned adjacent to a side face of the cuboid being immediately adjacent to the bottom face and being not covered by the socket.
17. RFID arrangement according to one of items 11 to 16,
    wherein the socket protrudes over the package at one or more faces of the cuboid.
18. RFID arrangement according to item 10 or an item depending on item 10,
    wherein the chain element comprises one or two rings for connecting with other chain elements.
19. RFID arrangement according to one of the previous items,
    wherein the socket proximately surrounds the RFID tag, the antenna and/or a package comprising the RFID tag and/or the antenna.
20. Method for fabricating a piece of jewelry, the method comprising the following steps:
    providing a base for the piece of jewelry,
    providing an RFID arrangement according to one of the previous items, and
    securing the socket of the RFID arrangement with the base.
21. Method according to item 20,
    wherein the socket is secured with the base by fusing or soldering.
22. Method according to one of items 20 or 21,
    wherein the base is formed as a ring, an earring, a bracelet, a pendant, a watch, a brooch, or other accessories.
23. RFID arrangement, comprising
    an RFID tag,
    an antenna being electrically connected to the RFID tag, and
    a socket at least partially enclosing the RFID tag and the antenna,
    wherein the RFID tag and the antenna are both comprised in one package made of plastic material and having a cuboid shape,
    wherein the socket is embodied as a chain element,
    wherein the socket covers the package at a bottom face and at two side faces of the cuboid being immediately adjacent to the bottom face and being opposite to each other,
    wherein the antenna is positioned adjacent to a top face of the cuboid being opposite to the bottom face, or adjacent to a side face of the cuboid being immediately adjacent to the bottom face and being not covered by the socket.
24. Method for fabricating a piece of jewelry, the method comprising the following steps:
    providing a base for the piece of jewelry,
    providing an RFID arrangement according to one of items 1 to 19 or 23, and
    securing the socket of the RFID arrangement with the base,
    wherein the socket is secured with the base by fusing or soldering.
25. RFID arrangement, comprising
    means for providing an RFID identification,
    means for radio wave reception being connected to the means for providing an RFID identification, and
    means for holding and at least partially enclosing the means for providing an RFID identification and the means for radio wave reception.

26. RFID arrangement according to item 25,
    wherein the RFID arrangement is embodied as a part of a jewelry and/or a personal identification device.
27. RFID arrangement according to one of items 25 or 26,
    wherein the means for providing an RFID identification and the means for radio wave reception are both comprised in one means for enclosing.
28. RFID arrangement according to item 27,
    wherein the means for enclosing is made of plastic material.
29. RFID arrangement according to one of items 25 to 28,
    wherein the means for providing an RFID identification is a passive RFID tag.
30. RFID arrangement according to one of items 25 to 29,
    wherein the means for radio wave reception is a loop antenna.
31. RFID arrangement according to one of items 25 to 30,
    wherein the means for holding has the shape of a hollow cylinder.
32. RFID arrangement according to one of items 25 to 30,
    wherein the means for holding has the shape of a hollow cylinder with a bottom.
33. RFID arrangement according to one of items 25 to 32,
    wherein the means for holding is open at one side.
34. RFID arrangement according to one of items 25 to 30,
    wherein the means for holding is embodied as a chain element.
35. RFID arrangement according to one of items 25 to 34,
    wherein the means for providing an RFID identification and the means for radio wave reception are both embodied in a means for enclosing having a cuboid shape.
36. RFID arrangement according to item 35,
    wherein the means for holding covers the means for enclosing at three faces of the cuboid.
37. RFID arrangement according to one of items 35 or 36,
    wherein the means for holding leaves the means for enclosing uncovered at three faces of the cuboid.
38. RFID arrangement according to one of items 35 to 37,
    wherein the means for holding covers the means for enclosing at a bottom face and at two side faces of the cuboid being immediately adjacent to the bottom face and being opposite to each other.
39. RFID arrangement according to item 38,
    wherein the means for radio wave reception is positioned adjacent to a top face of the cuboid being opposite to the bottom face.
40. RFID arrangement according to item 38,
    wherein the means for radio wave reception is positioned adjacent to a side face of the cuboid being immediately adjacent to the bottom face and being not covered by the means for holding.
41. RFID arrangement according to one of items 35 to 40,
    wherein the means for holding protrudes over the means for enclosing at one or more faces of the cuboid.
42. RFID arrangement according to item 34 or an item depending on item 34,
    wherein the chain element comprises one or two means for connecting with other chain elements.
43. RFID arrangement according to one of the previous items,
    wherein the means for holding proximately surrounds the means for providing an RFID identification, the means for radio wave reception and/or a means for enclosing comprising the means for providing an RFID identification and/or the means for radio wave reception.
44. Piece of jewelry, comprising an RFID arrangement according to one of items 1 to 19, 23, or 25 to 43 and/or being manufactured according to a method according to one of items 20 to 22 or 24.

In the following, certain features are provided in a structured form (see especially FIGS. 26 to 29).

These features can be combined with other features disclosed herein.

1. Piece of jewelry, comprising
    an RFID tag having a first contact and a second contact for electrical connection with an antenna, and
    a body to which the RFID tag is secured,
    wherein the body is, at least partially, made of electrically conducting material, and
    wherein at least the first contact is electrically connected to the body.
2. Piece of jewelry according to item 1,
    wherein the body forms a closed loop antenna or a half loop antenna made of electrically conducting material to which the first contact, or the first contact and the second contact, are electrically connected.
3. Piece of jewelry according to one of the previous items,
    wherein the first contact is electrically connected to the electrically conducting material of the body.
4. Piece of jewelry according to one of the previous items,
    wherein the first contact is connected to the body by a conductive strip and/or a conductive glue.
5. Piece of jewelry according to item 4,
    wherein the conductive strip and/or the conductive glue surrounds the RFID tag partially.
6. Piece of jewelry according to one of items 4 or 5,
    wherein the conductive strip and/or the conductive glue connects a face of the RFID tag with an opposite face of the RFID tag.
7. Piece of jewelry according to one of the previous items,
    wherein a gap is present between the second contact and the body, at least in an initial state.
8. Piece of jewelry according to item 7,
    wherein a face of the body and the second contact are temporarily connectable by pressure,
    and/or
    wherein the piece of jewelry has a first state and a second state, wherein a face of the body and the second contact are not electrically connected in the first state and are electrically connected in the second state, wherein preferably the first state is an initial state and the second state is achievable by pressure.
9. Piece of jewelry according to item 7,
    wherein the second contact is not electrically connectable to the body.
10. Piece of jewelry according to one of items 1 to 6,
    wherein the second contact and the body are permanently electrically connected.
11. Piece of jewelry according to item 10,
    wherein the second contact is directly connected to the body.
12. Piece of jewelry according to item 10,
    wherein the second contact is connected to the body by a further conductive strip and/or a further conductive glue.

13. Piece of jewelry according to one of items 10 to 12, wherein a gap between the RFID tag and the body is, besides a connection between the second contact and the body, filled with an insulating material or an insulating glue.
14. Piece of jewelry according to one of the previous items,
    wherein the first contact is formed as a contact pad on the RFID tag,
    and/or
    wherein the second contact is formed as a contact pad on the RFID tag.
15. Piece of jewelry according to one of the previous items,
    wherein the piece of jewelry is embodied as a ring, an earring, a bracelet, a pendant, a watch, a brooch, or other accessories.
16. Method for fabricating a piece of jewelry, the method comprising the following steps:
    providing an RFID tag having a first contact and a second contact for electrical connection with an antenna,
    providing a body, wherein the body is, at least partially, made of electrically conducting material,
    securing the RFID tag to the body, and
    electrically connecting at least the first contact to the body.
17. Method according to item 16,
    wherein the first contact is electrically connected to the electrically conducting material of the body.
18. Method according to one of the previous items 16 or 17,
    wherein a gap is left present between the second contact and the body, at least in an initial state.
19. Method according to one of items 16 or 17, further comprising
    electrically connecting the second contact to the body.
20. Method according to one of items 16 to 19, further comprising
    filling a gap between the RFID tag and the body, besides a connection between the second contact and the body, with an insulating material or an insulating glue.
21. Method according to one of items 16 to 20,
    wherein the piece of jewelry is embodied according to one of items 1 to 15.
22. Piece of jewelry, comprising
    an RFID tag having a first contact and a second contact for electrical connection with an antenna, and
    a body to which the RFID tag is secured,
    wherein the body is, at least partially, made of electrically conducting material,
    wherein the body forms a closed loop antenna made of electrically conducting material to which the first contact and the second contact are electrically connected,
    wherein the first contact is connected to the body by a conductive strip and/or a conductive glue, and
    wherein a gap between the RFID tag and the body is, besides a connection between the second contact and the body, filled with an insulating material or an insulating glue.
23. Method for fabricating a piece of jewelry, the method comprising the following steps:
    providing an RFID tag having a first contact and a second contact for electrical connection with an antenna,
    providing a body, wherein the body is, at least partially, made of electrically conducting material,
    securing the RFID tag to the body,
    electrically connecting the first contact to the body,
    electrically connecting the second contact to the body, and
    filling a gap between the RFID tag and the body, besides a connection between the second contact and the body, with an insulating material or an insulating glue.
24. Piece of jewelry, comprising
    a means for providing RFID identification having a first contact and a second contact for electrical connection with a means for radio wave reception, and
    a body to which the means for providing RFID identification is secured,
    wherein the body is, at least partially, made of electrically conducting material, and
    wherein at least the first contact is electrically connected to the body.
25. Piece of jewelry according to item 24,
    wherein the body forms a closed loop antenna or a half loop antenna made of electrically conducting material to which the first contact, or the first contact and the second contact, are electrically connected.
26. Piece of jewelry according to one of items 24 or 25,
    wherein the first contact is electrically connected to the electrically conducting material of the body.
27. Piece of jewelry according to one of the previous items,
    wherein the first contact is connected to the body by a conductive strip and/or a conductive glue.
28. Piece of jewelry according to item 27,
    wherein the conductive strip and/or the conductive glue surrounds the means for providing RFID identification partially.
29. Piece of jewelry according to one of items 27 or 28,
    wherein the conductive strip and/or the conductive glue connects a face of the means for providing RFID identification with an opposite face of the means for providing RFID identification.
30. Piece of jewelry according to one of the previous items,
    wherein a gap is present between the second contact and the body, at least in an initial state.
31. Piece of jewelry according to item 30,
    wherein a face of the body and the second contact are temporarily connectable by pressure.
32. Piece of jewelry according to item 30,
    wherein the second contact is not electrically connectable to the body.
33. Piece of jewelry according to one of items 24 to 29,
    wherein the second contact and the body are permanently electrically connected.
34. Piece of jewelry according to item 33,
    wherein the second contact is directly connected to the body.
35. Piece of jewelry according to item 33,
    wherein the second contact is connected to the body by a further conductive strip and/or a further conductive glue.
36. Piece of jewelry according to one of items 33 to 35,
    wherein a gap between the means for providing RFID identification and the body is, besides a connection between the second contact and the body, filled with an insulating material or an insulating glue.

37. Piece of jewelry according to one of items 24 to 36,
wherein the first contact is formed as a contact pad on the means for providing RFID identification, and/or wherein the second contact is formed as a contact pad on the means for providing RFID identification.

38. Piece of jewelry according to one of the previous items,
wherein the piece of jewelry is embodied as a ring, an earring, a bracelet, a pendant, a watch, a brooch, or other accessories.

In the following, certain features are provided in a structured form (see especially FIG. 30).

These features can be combined with other features disclosed herein.

1. RFID arrangement, comprising
   an RFID tag having a first contact and a second contact for electrical connection with an antenna, and
   a socket at least partially enclosing the RFID tag,
   the RFID arrangement having a first conductive stripe and a second conductive stripe, the first conductive stripe and the second conductive stripe being made of electrically conducting material and being electrically separate from each other.

2. RFID arrangement according to item 1,
   wherein the socket has, at least substantially, the form of a hollow cylinder.

3. RFID arrangement according to one of the previous items,
   wherein the first conductive stripe and the second conductive stripe have gaps for isolation between each other.

4. RFID arrangement according to one of the previous items,
   wherein the first conductive stripe is formed as a curved element, and/or
   wherein the second conductive stripe is formed as a curved element.

5. RFID arrangement according to one of the previous items,
   wherein the RFID arrangement has an at least substantially circular cross section.

6. RFID arrangement according to one of the previous items,
   wherein the conducting material is aluminum, gold, silver, and/or cupper.

7. RFID arrangement according to one of the previous items,
   wherein the first conductive stripe and the second conductive stripe are provided for connection with a body of a piece of jewelry so that the body forms an antenna for the RFID tag.

8. Piece of jewelry, comprising
   an RFID arrangement according to one of the previous items, and
   a body being, at least partially, made of electrically conductive material,
   wherein the first conductive stripe and the second conductive stripe of the RFID arrangement are each connected to one respective face of the body so that the body forms an antenna for the RFID tag.

9. Method for fabricating a piece of jewelry, the method comprising the following steps:
   providing a body for the piece of jewelry, being at least partially made of electrically conducting material,
   placing an RFID arrangement according to one of items 1 to 7 into a recess of the body, so that the first conductive stripe and the second conductive stripe of the RFID arrangement contact the body,
   rotating the RFID arrangement while monitoring access to the RFID tag,
   stopping rotating if the access to the RFID tag exceeds a given threshold and/or exhibits a peak, and
   while maintaining the rotational state between the RFID arrangement and the body, securing the RFID arrangement to the body.

10. Method according to item 9,
    wherein, before the RFID arrangement is placed in the recess, the recess is made by drilling or other material processing of the body.

11. Method according to one of items 9 or 10,
    wherein the RFID arrangement is secured to the body by gluing the socket, the first conductive stripe and the second conductive stripe to the body using conductive glue.

12. Method according to one of items 9 to 11,
    wherein a gap is present or is formed in the body besides the recess so that the first conductive stripe and the second conductive stripe are only electrically connected through a loop formed in the body.

13. Method according to one of items 9 to 12,
    wherein the body has, at least substantially, the form of a ring, an earring, a bracelet, a pendant, a watch, a brooch, or other accessories.

14. Piece of jewelry being made by a method according to one of items 9 to 13.

15. RFID arrangement, comprising
    an RFID tag having a first contact and a second contact for electrical connection with an antenna, and
    a socket at least partially enclosing the RFID tag,
    the RFID arrangement having a first conductive stripe and a second conductive stripe, the first conductive stripe and the second conductive stripe being made of electrically conducting material and being electrically separate from each other,
    wherein the socket has, at least substantially, the form of a hollow cylinder,
    wherein the first conductive stripe and the second conductive stripe have gaps for isolation between each other.

16. Piece of jewelry, comprising
    an RFID arrangement according to item 15, and
    a body being, at least partially, made of electrically conductive material,
    wherein the first conductive stripe and the second conductive stripe of the RFID arrangement are each connected to one respective face of the body so that the body forms an antenna for the RFID tag.

17. Method for fabricating a piece of jewelry or handheld product, the method comprising the following steps:
    providing a body for the piece of jewelry, being at least partially made of electrically conducting material,
    placing an RFID arrangement according to one of items 1 to 7 into a recess of the body, so that the first conductive stripe and the second conductive stripe of the RFID arrangement contact the body,
    rotating the RFID arrangement while monitoring access to the RFID tag,
    stopping rotating if the access to the RFID tag exceeds a given threshold and/or exhibits a peak, and
    while maintaining the rotational state between the RFID arrangement and the body, securing the RFID arrangement to the body, wherein, before the RFID arrangement is placed in the recess, the recess is made by drilling or other material processing of the body, wherein the RFID arrangement is secured to the body by gluing the socket, the first conductive stripe and the second conductive stripe to the body using conductive glue, and wherein a gap is present or is formed in the body besides the recess so that the first conductive stripe and the second conductive stripe are only electrically connected through a loop formed in the body.

18. RFID arrangement, comprising
    a means for providing RFID identification having a first contact and a second contact for electrical connection with a means for radio wave reception, and
    a means for enclosing, at least partially enclosing the means for providing RFID identification,
    the RFID arrangement having a first conductive stripe and a second conductive stripe, the first conductive stripe and the second conductive stripe being made of electrically conducting material and being electrically separate from each other.

19. RFID arrangement according to item 18,
    wherein the means for enclosing has, at least substantially, the form of a hollow cylinder.

20. RFID arrangement according to one of the previous items 18 or 19,
    wherein the first conductive stripe and the second conductive stripe have gaps for isolation between each other.

21. RFID arrangement according to one of items 18 to 20,
    wherein the first conductive stripe is formed as a curved element, and/or
    wherein the second conductive stripe is formed as a curved element.

22. RFID arrangement according to one of items 18 to 21,
    wherein the RFID arrangement has an at least substantially circular cross section.

23. RFID arrangement according to one of items 18 to 22,
    wherein the conducting material is aluminum, gold, silver, and/or cupper.

24. RFID arrangement according to one of items 18 to 23,
    wherein the first conductive stripe and the second conductive stripe are provided for connection with a body of a piece of jewelry so that the body forms a means for radio wave reception for the means for providing RFID identification.

25. Piece of jewelry, comprising
    an RFID arrangement according to one of items 18 to 24, and
    a body being, at least partially, made of electrically conductive material,
    wherein the first conductive stripe and the second conductive stripe of the RFID arrangement are each connected to one respective face of the body so that the body forms a means for radio wave reception for the means for providing RFID identification.

In the following, certain features are provided in a structured form (see especially FIGS. 31 to 35).

These features can be combined with other features disclosed herein.

1. RFID arrangement, comprising
    an RFID tag, and
    a housing, at least partially enclosing the RFID tag,
    wherein the RFID tag has a first contact and a second contact,
    wherein the first contact is electrically connected to the housing.

2. RFID arrangement according to item 1,
    wherein the housing has the form of a hollow cylinder with a bottom.

3. RFID arrangement according to one of the preceding items,
    wherein the RFID tag has a cylindrical form.

4. RFID arrangement according to one of the preceding items,
    wherein the RFID tag is circular surrounded by a wall of the housing.

5. RFID arrangement according to one of the preceding items,
    wherein the housing has an opening at one side.

6. RFID arrangement according to one of the preceding items,
    further comprising a dummy electrode being electrically connected to the second contact.

7. RFID arrangement according to item 5 and item 6,
    wherein the dummy electrode is positioned inside the opening.

8. RFID arrangement according to item 7, or according to item 5 and item 6,
    wherein the dummy electrode is positioned such that the dummy electrode together with the housing have a cylindrical shape, at least disregarding a slot between the dummy electrode and the housing.

9. RFID arrangement according to one of the preceding items,
    wherein the housing forms an antenna for the RFID tag.

10. RFID arrangement according to one of the preceding items,
    wherein the housing is fully or partly made of an electrically conductive material and/or of metal.

11. RFID arrangement, comprising
    an RFID tag,
    a housing, at least partially enclosing the RFID tag, and
    a dummy electrode being electrically connected to the second contact,
    wherein the RFID tag has a first contact and a second contact,
    wherein the first contact is electrically connected to the housing,
    wherein the housing has an opening at one side, and
    wherein the dummy electrode is positioned such that the dummy electrode together with the housing have a cylindrical shape, at least disregarding a slot between the dummy electrode and the housing.

12. RFID arrangement, comprising
    an RFID tag, and
    a socket for receiving a gemstone,
    wherein the RFID tag has a first contact and a second contact,
    wherein the socket is at least partially made of electrically conducting material,
    wherein the first contact and the second contact are electrically connected to the housing.

13. RFID arrangement according to item 12,
    wherein the RFID tag is positioned at a bottom of the socket.

14. RFID arrangement according to one of items 12 to 13,
    wherein the socket comprises an opening.

15. RFID arrangement according to item 13 and item 14,
    wherein the bottom is positioned opposite to the opening.

16. RFID arrangement according to one of items 13 to 15, wherein the bottom is formed as a bar.
17. RFID arrangement according to items 16, wherein the RFID tag is positioned in the bar.
18. RFID arrangement according to one of items 12 to 17, wherein the socket has a circular cross section.
19. RFID arrangement according to one of items 12 to 18, wherein the RFID tag is positioned in a center of the socket.
20. RFID arrangement according to one of items 12 to 17, wherein the socket has a rectangular cross section, or the cross section of a rectangle with rounded or flattened edges.
21. RFID arrangement according to item 20, wherein the RFID tag is positioned in the center of the socket.
22. RFID arrangement according to item 20, wherein the RFID tag is positioned at a side of the socket.
23. RFID arrangement according to one of items 12 to 22, wherein the RFID tag is arranged in a separate bar below a bottom of the socket.
24. RFID arrangement according to one of items 12 to 23, wherein the socket forms an antenna for the RFID tag.
25. RFID arrangement according to one of items 12 to 24 wherein the socket is fully or partly made of an electrically conductive material and/or of metal.
26. RFID arrangement, comprising
an RFID tag, and
a socket for receiving a gemstone,
wherein the RFID tag has a first contact and a second contact,
wherein the socket is at least partially made of electrically conducting material,
wherein the first contact and the second contact are electrically connected to the housing,
wherein the socket has a circular cross section, and
wherein the RFID tag is positioned in the center of the socket.
27. Piece of jewelry, comprising an RFID arrangement according to one of the preceding items.
28. Piece of jewelry according to item 27, wherein the piece of jewelry is embodied as a ring, an earring, a bracelet, a pendant, a watch, a brooch, or other accessories.
29. Method of manufacturing an RFID arrangement, the method comprising the following steps:
providing a housing,
positioning an RFID tag inside the housing, and
connecting a first contact of the RFID tag to the housing.
30. Method according to item 29, further comprising placing a dummy electrode in an opening of the housing.
31. Method according to item 30, further comprising electrically connecting the dummy electrode to a second contact of the RFID tag.
32. Method according to one of items 29 to 31, wherein the RFID arrangement is fabricated according to one of items 1 to 11.
33. Method of manufacturing an RFID arrangement, the method comprising the following steps:
providing a housing,
positioning an RFID tag inside the housing,
connecting a first contact of the RFID tag to the housing,
placing a dummy electrode in an opening of the housing, and
electrically connecting the dummy electrode to a second contact of the RFID tag.
34. Method of manufacturing an RFID arrangement, the method comprising the following steps,
providing a socket for receiving a gemstone, the socket being at least partially made of electrically conducting material,
mechanically connecting an RFID tag with the socket, and
electrically connecting a first contact and a second contact of the RFID tag with the socket.
35. Method according to item 34, wherein the RFID arrangement is fabricated according to one of items 12 to 26.
36. Method of manufacturing an RFID arrangement, the method comprising the following steps,
providing a socket for receiving a gemstone, the socket being at least partially made of electrically conducting material,
mechanically connecting an RFID tag with the socket, and
electrically connecting a first contact and a second contact of the RFID tag with the socket,
wherein the socket has a circular cross section, and
wherein the RFID tag is positioned in the center of the socket.
37. A local sending arrangement, comprising
a passive wireless communication device for exchanging proprietary information with an external transmitting-sending-device, and with
a protective covering device for taking up the passive wireless communication device,
wherein the passive wireless communication device has a first contact and a second contact,
wherein the first contact is electrically connected to the protective covering device.
38. The local sending arrangement according to item 37, wherein the protective covering device has the form of a hollow cylinder with a bottom.
39. The local sending arrangement according to one of items 37 to 38, wherein the passive wireless communication device has a cylindrical form.
40. The local sending arrangement according to one of items 37 to 39, wherein the passive wireless communication device is circular surrounded by a wall of the protective covering device.
41. The local sending arrangement according to one of items 37 to 40, wherein the protective covering device has an opening at one side.
42. The local sending arrangement according to one of items 37 to 41, further comprising a device for forming an electric antipole being electrically connected to the second contact.
43. The local sending arrangement according to item 41 and item 42, wherein the device for forming an electric antipole is positioned inside the opening.
44. The local sending arrangement according to item 43, or according to item 41 and item 42, wherein the device for forming an electric antipole is positioned such that the device for forming an electric antipole together with the protective covering device have a cylindrical shape, at least disregarding a slot between the device for forming an electric antipole and the protective covering device.

45. The local sending arrangement according to one of items 37 to 44,
wherein the protective covering device forms an antenna for the passive wireless communication device.

46. The local sending arrangement according to one of items 37 to 45,
wherein the protective covering is fully or partly made of an electrically conductive material and/or of metal.

47. A local sending arrangement, comprising
a passive wireless communication device,
a protective covering device, at least partially enclosing the passive wireless communication device, and
a device for forming an electric antipole being electrically connected to the second contact,
wherein the passive wireless communication device has a first contact and a second contact,
wherein the first contact is electrically connected to the protective covering device,
wherein the protective covering device has an opening at one side, and
wherein the device for forming an electric antipole is positioned such that the device for forming an electric antipole together with the protective covering device have a cylindrical shape, at least disregarding a slot between the device for forming an electric antipole and the protective covering device.

48. A local sending arrangement, comprising
a passive wireless communication device, and
a socket for receiving a gemstone,
wherein the passive wireless communication device has a first contact and a second contact,
wherein the socket is at least partially made of electrically conducting material,
wherein the first contact and the second contact are electrically connected to the protective covering device.

49. The local sending arrangement according to item 48,
wherein the passive wireless communication device is positioned at a bottom of the socket.

50. The local sending arrangement according to one of items 48 to 49,
wherein the socket comprises an opening.

51. The local sending arrangement according to item 49 and item 50,
wherein the bottom is positioned opposite to the opening.

52. The local sending arrangement according to one of items 48 to 51,
wherein the bottom is formed as a bar.

53. The local sending arrangement according to item 52,
wherein the passive wireless communication device is positioned in the bar.

54. The local sending arrangement according to one of items 48 to 53,
wherein the socket has a circular cross section.

55. The local sending arrangement according to one of items 48 to 54,
wherein the passive wireless communication device is positioned in a center of the socket.

56. The local sending arrangement according to one of items 48 to 55,
wherein the socket has a rectangular cross section, or the cross section of a rectangle with rounded or flattened edges.

57. The local sending arrangement according to item 56,
wherein the passive wireless communication device is positioned in the center of the socket.

58. The local sending arrangement according to item 56,
wherein the passive wireless communication device is positioned at a side of the socket.

59. The local sending arrangement according to one of items 48 to 58,
wherein the passive wireless communication device is arranged in a separate bar below a bottom of the socket.

60. The local sending arrangement according to one of items 48 to 59,
wherein the socket forms an antenna for the Passive wireless communication device.

61. The local sending arrangement according to one of items 48 to 60,
wherein the socket is fully or partly made of an electrically conductive material and/or of metal.

62. A local sending arrangement, comprising
a passive wireless communication device, and
a socket for receiving a gemstone,
wherein the passive wireless communication device has a first contact and a second contact,
wherein the socket is at least partially made of electrically conducting material,
wherein the first contact and the second contact are electrically connected to the protective covering device,
wherein the socket has a circular cross section, and
wherein the passive wireless communication device is positioned in the center of the socket.

63. Piece of jewelry, comprising a local sending arrangement according to one of items 37 to 62.

64. Piece of jewelry according to item 63,
wherein the piece of jewelry is embodied as a ring, an earring, a bracelet, a pendant, a watch, a brooch, or other accessories.

In the following, certain features are provided in a structured form (see especially FIGS. 36 to 42).

These features can be combined with other features disclosed herein.

1. Piece of jewelry, comprising
a body, and
an RFID tag,
wherein the RFID tag comprises a first contact and a second contact, and
wherein the first contact and/or the second contact are electrically connected to the body.

2. Piece of jewelry according to item 1,
wherein the RFID tag is mechanically connected to the body.

3. Piece of jewelry according to one of the preceding items,
wherein the body forms an antenna for the RFID tag.

4. Piece of jewelry according to one of the preceding items,
wherein a slot is formed in the body, and
wherein the first contact and the second contact are electrically connected to the body at opposite sides of the slot, so that the body electrically connects the first contact with the second contact around the slot.

5. Piece of jewelry according to item 4,
wherein the body is embodied as a ring.
6. Piece of jewelry according to one of items 1 to 3,
wherein the body is embodied as a ring, and
wherein the RFID tag is partly or fully comprised in the ring.
7. Piece of jewelry according to item 6,
wherein only one of the contacts is electrically connected to the body.
8. Piece of jewelry according to one of items 1 to 3,
wherein the body comprises a first ring and a second ring,
wherein the RFID tag is fastened between the first ring and the second ring,
wherein the first contact is electrically connected to the first ring and the second contact is electrically connected to the second ring, and
wherein the first ring and the second ring are electrically and/or mechanically connected to each other at a connection apart from the RFID tag.
9. Piece of jewelry according to item 8,
wherein the first ring and the second ring are connected to each other such that they both extend in the same plane.
10. Piece of jewelry according to one of items 8 or 9,
wherein the second ring has a larger diameter compared to the first ring.
11. Piece of jewelry according to item 10,
wherein the first ring is positioned inside the second ring.
12. Piece of jewelry according to item 11,
wherein the RFID tag is positioned at maximum distance between the first ring and the second ring.
13. Piece of jewelry according to item 8,
wherein the first ring and the second ring are oriented in different planes.
14. Piece of jewelry according to item 13,
wherein the first ring and the second ring are oriented parallel to each other.
15. Piece of jewelry according to one of items 13 or 14,
wherein the RFID tag is positioned at a first circumferential position between the first ring and the second ring.
16. Piece of jewelry according to item 15,
wherein a connecting rod between the first ring and the second ring is positioned at a second circumferential position.
17. Piece of jewelry according to item 16,
wherein the first circumferential position is opposite to the second circumferential position.
18. Piece of jewelry according to one of items 13 to 17,
wherein the first ring has an identical diameter compared with the second ring, and/or
wherein the first ring is coaxially arranged to the second ring.
19. Piece of jewelry according to one of items 1 to 3,
wherein the body is embodied as a ring, and
wherein the ring has a discontinuity with a first end and a second end,
wherein the RFID tag is positioned between the first end and the second end.
20. Piece of jewelry according to item 19,
wherein the first contact is mechanically and electrically connected with the first end, and
wherein the second contact is mechanically and electrically connected with the second end.

21. Piece of jewelry according to one of items 19 or 20,
wherein an imaginary line between the first contact and the second contact is oriented at least approximately perpendicular to a plane of the ring.
22. Piece of jewelry according to one of items 19 to 21,
wherein an imaginary line between the first contact and the second contact is oriented at least approximately parallel to a central axis of the ring.
23. Piece of jewelry according to one of items 19 to 21,
wherein an imaginary line between the first contact and the second contact is oriented at least approximately perpendicular to a central axis of the ring and/or is oriented radially.
24. Piece of jewelry according to one of items 19 to 21,
wherein an imaginary line between the first contact and the second contact is oriented at least approximately along a circumference of the ring.
25. Piece of jewelry, comprising
a body, and
an RFID tag,
wherein the RFID tag comprises a first contact and a second contact,
wherein the first contact and/or the second contact are electrically connected to the body,
wherein the RFID tag is mechanically connected to the body,
wherein the body forms an antenna for the RFID tag,
wherein a slot is formed in the body,
wherein the first contact and the second contact are electrically connected to the body at opposite sides of the slot, so that the body electrically connects the first contact with the second contact around the slot, and
wherein the body is embodied as a ring.
26. Method for fabricating a piece of jewelry, the method comprising the following steps:
providing a body,
providing an RFID tag, the RFID tag comprising a first contact and a second contact,
fastening the RFID tag to the body, and
electrically connecting the first contact and/or the second contact to the body.
27. Method according to item 26,
wherein the first contact and/or the second contact are connected mechanically and electrically to the body.
28. Method according to one of items 26 or 27,
wherein the piece of jewelry is fabricated according to one of items 1 to 25.
29. Method for fabricating a piece of jewelry, the method comprising the following steps:
providing a body, being embodied as a ring,
providing an RFID tag, the RFID tag comprising a first contact and a second contact,
forming a slot in the body, leaving a first end and a second end of the body,
fastening the RFID tag to the body, and
electrically and mechanically connecting the first contact to the first end and the second contact to the second end.
30. Piece of jewelry, comprising
a device for forming a substantial part, and
a passive wireless communication device,
wherein the passive wireless communication device comprises a first contact and a second contact, and
wherein the first contact and/or the second contact are electrically connected to the device for forming a substantial part.

31. Piece of jewelry according to item 30,
wherein the passive wireless communication device is mechanically connected to the device for forming a substantial part.
32. Piece of jewelry according to one of the preceding items,
wherein the device for forming a substantial part forms an antenna for the passive wireless communication device.
33. Piece of jewelry according to one of the preceding items,
wherein a slot is formed in the device for forming a substantial part, and
wherein the first contact and the second contact are electrically connected to the device for forming a substantial part at opposite sides of the slot, so that the device for forming a substantial part electrically connects the first contact with the second contact around the slot.
34. Piece of jewelry according to item 33
wherein the device for forming a substantial part is embodied as a ring.
35. Piece of jewelry according to one of items 30 to 32,
wherein the device for forming a substantial part is embodied as a ring, and
wherein the passive wireless communication device is partly or fully comprised in the ring.
36. Piece of jewelry according to item 35,
wherein only one of the contacts is electrically connected to the device for forming a substantial part.
37. Piece of jewelry according to one of items 30 to 32,
wherein the device for forming a substantial part comprises a first ring and a second ring,
wherein the passive wireless communication device is fastened between the first ring and the second ring,
wherein the first contact is electrically connected to the first ring and the second contact is electrically connected to the second ring, and
wherein the first ring and the second ring are electrically and/or mechanically connected to each other at a connection apart from the passive wireless communication device.
38. Piece of jewelry according to item 37,
wherein the first ring and the second ring are connected to each other such that they both extend in the same plane.
39. Piece of jewelry according to one of items 37 or 38,
wherein the second ring has a larger diameter compared to the first ring.
40. Piece of jewelry according to item 39,
wherein the first ring is positioned inside the second ring.
41. Piece of jewelry according to item 40,
wherein the passive wireless communication device is positioned at maximum distance between the first ring and the second ring.
42. Piece of jewelry according to item 37,
wherein the first ring and the second ring are oriented in different planes.
43. Piece of jewelry according to item 42,
wherein the first ring and the second ring are oriented parallel to each other.
44. Piece of jewelry according to one of items 42 or 43,
wherein the passive wireless communication device is positioned at a first circumferential position between the first ring and the second ring.
45. Piece of jewelry according to item 44,
wherein a connecting rod between the first ring and the second ring is positioned at a second circumferential position.
46. Piece of jewelry according to item 45,
wherein the first circumferential position is opposite to the second circumferential position.
47. Piece of jewelry according to one of items 42 to 46,
wherein the first ring has an identical diameter compared with the second ring, and/or
wherein the first ring is coaxially arranged to the second ring.
48. Piece of jewelry according to one of items 30 to 32,
wherein the device for forming a substantial part is embodied as a ring, and
wherein the ring has a discontinuity with a first end and a second end,
wherein the passive wireless communication device is positioned between the first end and the second end.
49. Piece of jewelry according to item 48,
wherein the first contact is mechanically and electrically connected with the first end, and
wherein the second contact is mechanically and electrically connected with the second end.
50. Piece of jewelry according to one of items 48 or 49,
wherein an imaginary line between the first contact and the second contact is oriented at least approximately perpendicular to a plane of the ring.
51. Piece of jewelry according to one of items 48 to 50,
wherein an imaginary line between the first contact and the second contact is oriented at least approximately parallel to a central axis of the ring.
52. Piece of jewelry according to one of items 48 to 50,
wherein an imaginary line between the first contact and the second contact is oriented at least approximately perpendicular to a central axis of the ring and/or is oriented radially.
53. Piece of jewelry according to one of items 48 to 50,
wherein an imaginary line between the first contact and the second contact is oriented at least approximately along a circumference of the ring.
54. Piece of jewelry, comprising
a device for forming a substantial part, and
a passive wireless communication device,
wherein the passive wireless communication device comprises a first contact and a second contact,
wherein the first contact and/or the second contact are electrically connected to the device for forming a substantial part,
wherein the passive wireless communication device is mechanically connected to the device for forming a substantial part,
wherein the device for forming a substantial part forms an antenna for the passive wireless communication device,
wherein a slot is formed in the device for forming a substantial part,
wherein the first contact and the second contact are electrically connected to the device for forming a substantial part at opposite sides of the slot, so that the device for forming a substantial part electrically connects the first contact with the second contact around the slot, and
wherein the device for forming a substantial part is embodied as a ring.

In the following, certain features are provided in a structured form (see especially FIGS. 43 to 45).

These features can be combined with other features disclosed herein.

1. Buckle, comprising
   a frame,
   a prong, being swivel-mounted with respect to the frame,
   an RFID tag with a first contact and a second contact,
   wherein the RFID tag is mounted on the frame with the first contact being permanently electrically connected to the frame and the second contact facing away from the frame, and
   wherein the prong contacts the second contact when it is in one end state, and does otherwise not contact the second contact.
2. Buckle according to item 1,
   wherein the frame and/or the prong are made of metal, or steel.
3. Buckle according to one of the preceding items,
   wherein the frame and the prong form an antenna for the RFID tag, when the prong contacts the second contact.
4. Buckle according to one of the preceding items,
   wherein the RFID tag is positioned in a recess of the frame, the recess laterally securing the prong when it is in the end state.
5. Piece of jewelry, comprising
   a bracelet, and
   a buckle according to one of the preceding items, the buckle being connected to the bracelet.
6. Piece of jewelry according to item 5,
   further comprising a watch connected to the bracelet.
7. Buckle, comprising
   a frame,
   a prong, being swivel-mounted with respect to the frame,
   an RFID tag with a first contact and a second contact,
   wherein the RFID tag is mounted on the frame with the first contact being permanently electrically connected to the frame and the second contact facing away from the frame,
   wherein the prong contacts the second contact when it is in one end state, and does otherwise not contact the second contact,
   wherein the frame and/or the prong are made of metal, or steel,
   wherein the frame and the prong form an antenna for the RFID tag, when the prong contacts the second contact, and
   wherein the RFID tag is positioned in a recess of the frame, the recess laterally securing the prong when it is in the end state.
8. Method for fabricating a buckle, the method comprising the following steps:
   providing a frame,
   swivel-mounting a prong with respect to the frame,
   mounting an RFID tag with a first contact and a second contact to the frame,
   wherein the RFID tag is mounted on the frame with the first contact being permanently electrically connected to the frame and the second contact facing away from the frame, and
   wherein the prong contacts the second contact when it is on one end state, and does otherwise not contact the second contact.
9. Method for fabricating a buckle, the method comprising the following steps:
   providing a frame,
   swivel-mounting a prong with respect to the frame,
   mounting an RFID tag with a first contact and a second contact to the frame,
   wherein the RFID tag is mounted on the frame with the first contact being permanently electrically connected to the frame and the second contact facing away from the frame,
   wherein the prong contacts the second contact when it is on one end state, and does otherwise not contact the second contact, and
   wherein the RFID tag is mounted in a recess of the frame, the recess laterally securing the prong when it is in the end state.
10. Device for connecting two ends of a belt, comprising
    a device for forming an outer structure,
    a fastening device, being swivel-mounted with respect to the device for forming an outer structure,
    a passive wireless communication device with a first contact and a second contact,
    wherein the passive wireless communication device is mounted on the device for forming an outer structure with the first contact being permanently electrically connected to the device for forming an outer structure and the second contact facing away from the device for forming an outer structure, and
    wherein the fastening device contacts the second contact when it is in one end state, and does otherwise not contact the second contact.
11. Device for connecting two ends of a belt according to item 10,
    wherein the device for forming an outer structure and/or the fastening device are made of metal, or steel.
12. Device for connecting two ends of a belt according to one of the preceding items,
    wherein the device for forming an outer structure and the fastening device form an antenna for the passive wireless communication device, when the fastening device contacts the second contact.
13. Device for connecting two ends of a belt according to one of the preceding items,
    wherein the passive wireless communication device is positioned in a recess of the device for forming an outer structure, the recess laterally securing the fastening device when it is in the end state.
14. Piece of jewelry, comprising
    a bracelet, and
    a device for connecting two ends of a belt according to one of the preceding items, the device for connecting two ends of a belt being connected to the bracelet.
15. Piece of jewelry according to item 14,
    further comprising a watch connected to the bracelet.
16. Device for connecting two ends of a belt, comprising
    a device for forming an outer structure,
    a fastening device, being swivel-mounted with respect to the device for forming an outer structure,
    a passive wireless communication device with a first contact and a second contact,
    wherein the passive wireless communication device is mounted on the device for forming an outer structure with the first contact being permanently electrically connected to the device for forming an outer structure and the second contact facing away from the device for forming an outer structure, wherein the fastening device contacts the second contact when it is in one end state, and does otherwise not contact the second contact,
wherein the device for forming an outer structure and/or the fastening device are made of metal, or steel,
wherein the device for forming an outer structure and the fastening device form an antenna for the passive wireless communication device, when the fastening device contact the second contact, and
wherein the passive wireless communication device is positioned in a recess of the device for forming an outer structure, the recess laterally securing the fastening device when it is in the end state.

In the following, certain features are provided in a structured form (see especially FIGS. 46 to 48).

These features can be combined with other features disclosed herein.

1. An RFID arrangement, comprising
   an RFID tag,
   an antenna, being electrically connected to the RFID tag,
   a solid layer, the RFID tag and the antenna being positioned on the solid layer,
   a cover layer covering the solid layer, the RFID tag and the antenna, and
   a glue layer for fixing the RFID arrangement to an external device, the glue layer being positioned on a side of the solid layer opposite to the cover layer.
2. RFID arrangement according to item 1,
   wherein the solid layer is parallel to the cover layer.
3. RFID arrangement according to one of the preceding items,
   wherein the solid layer is parallel to the glue layer.
4. RFID arrangement according to one of the preceding items,
   wherein the solid layer has a uniform thickness.
5. RFID arrangement according to one of the preceding items,
   wherein the cover layer has a uniform thickness.
6. RFID arrangement according to one of the preceding items,
   wherein the glue layer has a uniform thickness.
7. RFID arrangement according to one of the preceding items,
   wherein the cover layer is made of electrically insulating material, of plastic or acrylic.
8. RFID arrangement according to one of the preceding items,
   wherein the cover layer comprises an outside structure indicating an intended position of a finger tip, or a design pattern indicating a fingerprint.
9. RFID arrangement according to one of the preceding items,
   wherein the solid layer is made of electrically insulating material.
10. RFID arrangement according to one of the preceding items,
    wherein the RFID tag and the antenna are arranged so that the RFID tag can only be read out when a finger tip or another part of a human body is placed on the cover layer.
11. RFID arrangement according to one of the preceding items,
    wherein the antenna is structured to extend in a plane.
12. RFID arrangement according to one of the preceding items,
    wherein the RFID tag is a passive RFID tag.
13. An RFID arrangement, comprising
    an RFID tag,
    an antenna, being electrically connected to the RFID tag,
    a solid layer, the RFID tag and the antenna being positioned on the solid layer,
    a cover layer covering the solid layer, the RFID tag and the antenna, and
    a glue layer for fixing the RFID arrangement to an external device, the glue layer being positioned on a side of the solid layer opposite to the cover layer,
    wherein the solid layer has a uniform thickness,
    wherein the cover layer has a uniform thickness, and
    wherein the solid layer, the cover layer and the glue layer are parallel to each other.
14. A local sending arrangement, comprising
    a passive wireless communication device for exchanging information with an external readout device,
    an antenna, being electrically connected to the passive wireless communication device,
    a solid layer, the passive wireless communication device and the antenna being positioned on the solid layer,
    a protective layer covering the solid layer, the passive wireless communication device and the antenna, the protective layer protecting the passive wireless communication device and the antenna, and
    a fixation layer for fixing the local sending arrangement to an external device, the fixation layer being positioned on a side of the solid layer opposite to the protective layer.
15. Local sending arrangement according to item 14,
    wherein the solid layer is parallel to the protective layer.
16. Local sending arrangement according to one of items 14 or 15,
    wherein the solid layer is parallel to the fixation layer.
17. Local sending arrangement according to one of items 14 to 16,
    wherein the solid layer has a uniform thickness.
18. Local sending arrangement according to one of items 14 to 17,
    wherein the protective layer has a uniform thickness.
19. Local sending arrangement according to one of items 14 to 18,
    wherein the fixation layer has a uniform thickness.
20. Local sending arrangement according to one of items 14 to 19,
    wherein the protective layer is made of electrically insulating material, of plastic or acrylic.
21. Local sending arrangement according to one of items 14 to 20,
    wherein the protective layer comprises an outside structure indicating an intended position of a finger tip, or a design pattern indicating a fingerprint.
22. Local sending arrangement according to one of items 14 to 21,
    wherein the solid layer is made of electrically insulating material.
23. Local sending arrangement according to one of the preceding items 14 to 22,
    wherein the passive wireless communication device and the antenna are arranged so that the passive wireless communication device can only be read out when a finger tip or another part of a human body is placed on the protective layer.

24. Local sending arrangement according to one of the preceding items 14 to 23,
    wherein the antenna is structured to extend in a plane.
25. Local sending arrangement according to one of the preceding items 14 to 24,
    wherein the passive wireless communication device is a passive RFID tag.
26. A local sending arrangement, comprising
    a passive wireless communication device,
    an antenna, being electrically connected to the passive wireless communication device,
    a solid layer, the passive wireless communication device and the antenna being positioned on the solid layer,
    a protective layer covering the solid layer, the passive wireless communication device and the antenna, and
    a fixation layer for fixing the local sending arrangement to an external device, the fixation layer being positioned on a side of the solid layer opposite to the protective layer,
    wherein the solid layer has a uniform thickness,
    wherein the protective layer has a uniform thickness, and
    wherein the solid layer, the protective layer and the fixation layer are parallel to each other.
27. Method for retrieving information, the method comprising the following steps:
    providing an RFID arrangement according to any of items 1 to 13, wherein the information is stored on the RFID tag of the RFID arrangement,
    providing a readout device,
    sending radio frequency waves from the readout device to the RFID arrangement, and
    retrieving the information from a change in the radio frequency waves.
28. Method according to item 27,
    further comprising, while sending radio frequency waves, putting an object on the cover layer.
29. Method according to item 28,
    wherein the object is a human finger or another part of a human body.
30. Method according to one of items 27 to 29,
    wherein the RFID arrangement is secured to an item with the glue layer.
31. Method for retrieving information, the method comprising the following steps:
    providing an RFID arrangement according to any of item 1 to 13, wherein the information is stored on the RFID tag of the RFID arrangement,
    providing a readout device,
    sending radio frequency waves from the readout device to the RFID arrangement, and
    retrieving the information from a change in the radio frequency waves,
    further comprising, while sending radio frequency waves, putting a human finger on the cover layer.

LIST OF REFERENCE SIGNS 1 piece of jewelry
2 chain
5 clasp
6 chain connector
10 first element
12 main part
14 protrusion
15 first magnetic element
16 arm
18 loop
19 hole
20 second element
21 wall
22 main part
23 cantilever
24 clearance
25 second magnetic element
26 gap
27 retaining element/sphere
28 loop
29 hole
30 user
40 wearable device
50 tablet
55 RFID reader
57 wireless communication device
60 store
65 readout device
70 RFID tag
71 first contact
72 second contact
73 conductive strip
75 antenna
76 loop antenna
77 contact pad
78 conductive glue
80 chain element
82 rings
90 package
95 ring
96 conductive stripe
97 conductive stripe
98 face
100 arrangement
102 server
104 database
106 network
108 readout device
200 arrangement
202, 204, 206 record-keeping unit
210, 212, 214 processor
216 communications component
218 processing unit
220 RFID reader
300 method
302-310 steps
400 RFID arrangement
405 piece of jewelry
410 housing
415 socket
420 RFID tag
421 first contact
422 second contact
425 connecting rod
430 dummy electrode
432 slot
440 bottom plate
442 bar
444 sidewall
450 body
451 first end
452 second end
453 discontinuity
455 slot
460 first ring 465 second ring
500 gemstone
600 buckle
610 frame
615 recess
620 prong
630 bracelet
700 RFID arrangement
705 item
710 solid layer
712 RFID tag
714 antenna
720 cover layer
722 outside structure
730 glue layer

The invention claimed is:

1. An RFID arrangement comprising:
an RFID tag having a first contact and a second contact;
a housing having an opening at one side and at least partially enclosing the RFID tag, the first contact of the RFID tag being electrically connected to the housing; and
a dummy electrode electrically connected to the second contact;
wherein the RFID arrangement is characterized by one or more of the housing having a form of a hollow cylinder with a bottom, the RFID tag having a cylindrical form, the RFID tag having a rectangular form, and the RFID tag being circular surrounded by a wall of the housing; and
wherein the RFID arrangement is further characterized by one or more of the dummy electrode being positioned inside the opening and the dummy electrode being positioned such that the dummy electrode together with the housing have a cylindrical shape, at least disregarding a slot between the dummy electrode and the housing.

2. The RFID arrangement according to claim 1, characterized by one or more of the housing forming an antenna for the RFID tag and the housing being fully or partly made of an electrically conductive material and/or of metal.

3. A piece of jewelry comprising the RFID arrangement according to claim 1.

* * * * *